(12) United States Patent
Higashino

(10) Patent No.: US 10,546,606 B2
(45) Date of Patent: Jan. 28, 2020

(54) HIGH DENSITY RECORDING MEDIUM, RECORDING APPARATUS, RECORDING METHOD, REPRODUCING APPARATUS, AND REPRODUCING METHOD IN WHICH SYNCHRONIZATION PATTERNS ARE RECORDED WITH A SHIFT SO THAT POSITIONS IN A TRACK DIRECTION DO NOT OVERLAP

(71) Applicant: SONY CORPORATION, Tokyo (JP)

(72) Inventor: Satoru Higashino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/093,862

(22) PCT Filed: May 12, 2017

(86) PCT No.: PCT/JP2017/017964
§ 371 (c)(1),
(2) Date: Oct. 15, 2018

(87) PCT Pub. No.: WO2017/204001
PCT Pub. Date: Nov. 30, 2017

(65) Prior Publication Data
US 2019/0108855 A1    Apr. 11, 2019

(30) Foreign Application Priority Data

May 27, 2016 (JP) .................................. 2016-106613
Dec. 14, 2016 (JP) .................................. 2016-241919

(51) Int. Cl.
*G11B 7/007* (2006.01)
*G11B 7/0045* (2006.01)
*G11B 7/005* (2006.01)

(52) U.S. Cl.
CPC .............. *G11B 7/007* (2013.01); *G11B 7/005* (2013.01); *G11B 7/0045* (2013.01); *G11B 2007/00754* (2013.01)

(58) Field of Classification Search
None
See application file for complete search history.

(56) References Cited

U.S. PATENT DOCUMENTS

| | | | |
|---|---|---|---|
| 6,622,280 B1 * | 9/2003 | Higashino | ........ G11B 20/10009 714/789 |
| 2005/0111317 A1 * | 5/2005 | Muramatsu | ........ G11B 20/1217 369/47.27 |

(Continued)

FOREIGN PATENT DOCUMENTS

| | | |
|---|---|---|
| JP | H02-263328 A | 10/1990 |
| JP | 2000-311399 A | 11/2000 |

(Continued)

OTHER PUBLICATIONS

Jun. 13, 2019, European Search Report issued for related EP Application No. 17802595.3.

*Primary Examiner* — Tan X Dinh
(74) *Attorney, Agent, or Firm* — Paratus Law Group, PLLC

(57) ABSTRACT

There is provided a disk-type recording medium, a recording apparatus, a recording method, a reproducing apparatus, and a reproducing method, which are capable of recording, for example, data with high density and reproducing data recorded with high density robustly. In the disk-type recording medium, synchronization patterns for synchronization are recorded in two adjacent tracks with a shift in a track direction so that positions in the track direction do not (Continued)

overlap. The present technology can be applied to, for example, optical discs, other disk-type recording mediums, and the like.

16 Claims, 49 Drawing Sheets

(56) References Cited

U.S. PATENT DOCUMENTS

| | | | | |
|---|---|---|---|---|
| 2006/0056098 A1* | 3/2006 | Hashimoto | ........ | G11B 5/59633 360/75 |
| 2006/0056099 A1* | 3/2006 | Hashimoto | ........ | G11B 5/59633 360/75 |
| 2009/0168218 A1* | 7/2009 | Mizukoshi | ......... | G11B 5/59633 360/51 |
| 2011/0276990 A1* | 11/2011 | Higashino | ......... | G11B 20/10111 720/718 |
| 2013/0250744 A1* | 9/2013 | Higashino | ............ | G11B 7/0045 369/47.17 |
| 2013/0322222 A1* | 12/2013 | Horigome | .......... | G11B 7/00718 369/47.1 |
| 2014/0219073 A1* | 8/2014 | Higashino | .......... | G11B 7/00745 369/275.3 |
| 2015/0207615 A1* | 7/2015 | Higashino | ............. | H04L 7/0029 375/355 |
| 2017/0133050 A1* | 5/2017 | Horigome | .......... | G11B 20/1217 |
| 2017/0330593 A1* | 11/2017 | Higashino | ........ | G11B 20/10009 |
| 2019/0130940 A1* | 5/2019 | Higashino | ........ | G11B 20/10009 |

FOREIGN PATENT DOCUMENTS

| | | |
|---|---|---|
| JP | 2002-183976 A | 6/2002 |
| JP | 2002-319242 A | 10/2002 |
| JP | 2006-505886 A | 2/2006 |
| JP | 2007-133979 A | 5/2007 |
| JP | 2010-102766 A | 5/2010 |
| JP | 5089781 B2 | 12/2012 |
| WO | WO 2016/031106 A1 | 3/2016 |

* cited by examiner

FIG. 10

CODE TABLE

| | S1 | S2 | S3 | S4 | S5 |
|---|---|---|---|---|---|
| 00 (0) | 000 S3 | 001 S1 | 010 S3 | 100 S3 | 100 S1 |
| 01 (1) | 000 S4 | 001 S2 | 010 S4 | 100 S4 | 100 S2 |
| 10 (2) | 000 S1 | 001 S3 | 010 S1 | 010 S5 | 101 S1 |
| 11 (3) | 000 S2 | 000 S5 | 010 S2 | 100 S5 | 101 S2 |

REPLACEMENT TABLE

| DEPARTURE STATE | INFORMATION BIT SEQUENCE | REPLACEMENT SIGNAL SEQUENCE | ARRIVAL STATE |
|---|---|---|---|
| S1 | 10 10 10 (**) | 000 000 000 $\Rightarrow$ 000 101 010 | S1 |
| S1 | 10 10 11 (**) | 000 000 000 $\Rightarrow$ 000 101 010 | S2 |
| S1 | 10 10 00 (**) | 000 000 000 $\Rightarrow$ 000 101 010 | S3 |
| S1 | 10 10 01 (10) | 000 000 000 $\Rightarrow$ 000 101 010 | S4 |
| S5 | 00 10 10 (**) | 100 000 000 $\Rightarrow$ 100 101 010 | S1 |
| S5 | 00 10 11 (**) | 100 000 000 $\Rightarrow$ 100 101 010 | S2 |
| S5 | 00 10 00 (**) | 100 000 000 $\Rightarrow$ 100 101 010 | S3 |
| S5 | 00 10 01 (10) | 100 000 000 $\Rightarrow$ 100 101 010 | S4 |

EXTENDED FS CODE STRING HAVING
CLOCK SHIFT OF −1 (NRZI EXPRESSION)

FSC0 = [000 010 000 100000000000 100000000000 100 001**]
FSC1 = [010 010 000 100000000000 100000000000 100 001**]
FSC2 = [001 010 000 100000000000 100000000000 100 001**]
FSC3 = [010 010 000 100000000000 100000000000 100 001**]
FSC4 = [100 010 000 100000000000 100000000000 100 001**]
FSC5 = [100 001 000 100000000000 100000000000 100 001**]

EXTENDED FS CODE STRING HAVING
NO CLOCK SHIFT (NRZI EXPRESSION)

FSB0 = [*000 010 000 100000000000 100000000000 100 001*]
FSB1 = [*010 010 000 100000000000 100000000000 100 001*]
FSB2 = [*001 010 000 100000000000 100000000000 100 001*]
FSB3 = [*010 010 000 100000000000 100000000000 100 001*]
FSB4 = [*100 010 000 100000000000 100000000000 100 001*]
FSB5 = [*100 001 000 100000000000 100000000000 100 001*]

EXTENDED FS CODE STRING HAVING
CLOCK SHIFT OF +1 (NRZI EXPRESSION)

FSA0 = [**000 010 000 100000000000 100000000000 100 001]
FSA1 = [**010 010 000 100000000000 100000000000 100 001]
FSA2 = [**001 010 000 100000000000 100000000000 100 001]
FSA3 = [**010 010 000 100000000000 100000000000 100 001]
FSA4 = [**100 010 000 100000000000 100000000000 100 001]
FSA5 = [**100 001 000 100000000000 100000000000 100 001]

FIG. 30

FS CANDIDATE BIT STRING IN
CASE IN WHICH t = 7 (NRZI EXPRESSION)

BIT OF t=7
BIT OF t=5 ↓
↓ ↓
FSA0[0:4] = [**000]
FSA1[0:4] = [**010]
FSA2[0:4] = [**001]
FSA3[0:4] = [**010]
FSA4[0:4] = [**100]
FSA5[0:4] = [**100]

BIT OF t=7
BIT OF t=5 ↓
↓ ↓
FSB0[0:4] = [*000 0]
FSB1[0:4] = [*010 0]
FSB2[0:4] = [*001 0]
FSB3[0:4] = [*010 0]
FSB4[0:4] = [*100 0]
FSB5[0:4] = [*100 0]

BIT OF t=7
BIT OF t=5 ↓
↓ ↓
FSC0[0:4] = [000 01]
FSC1[0:4] = [010 01]
FSC2[0:4] = [001 01]
FSC3[0:4] = [010 01]
FSC4[0:4] = [100 01]
FSC5[0:4] = [100 00]

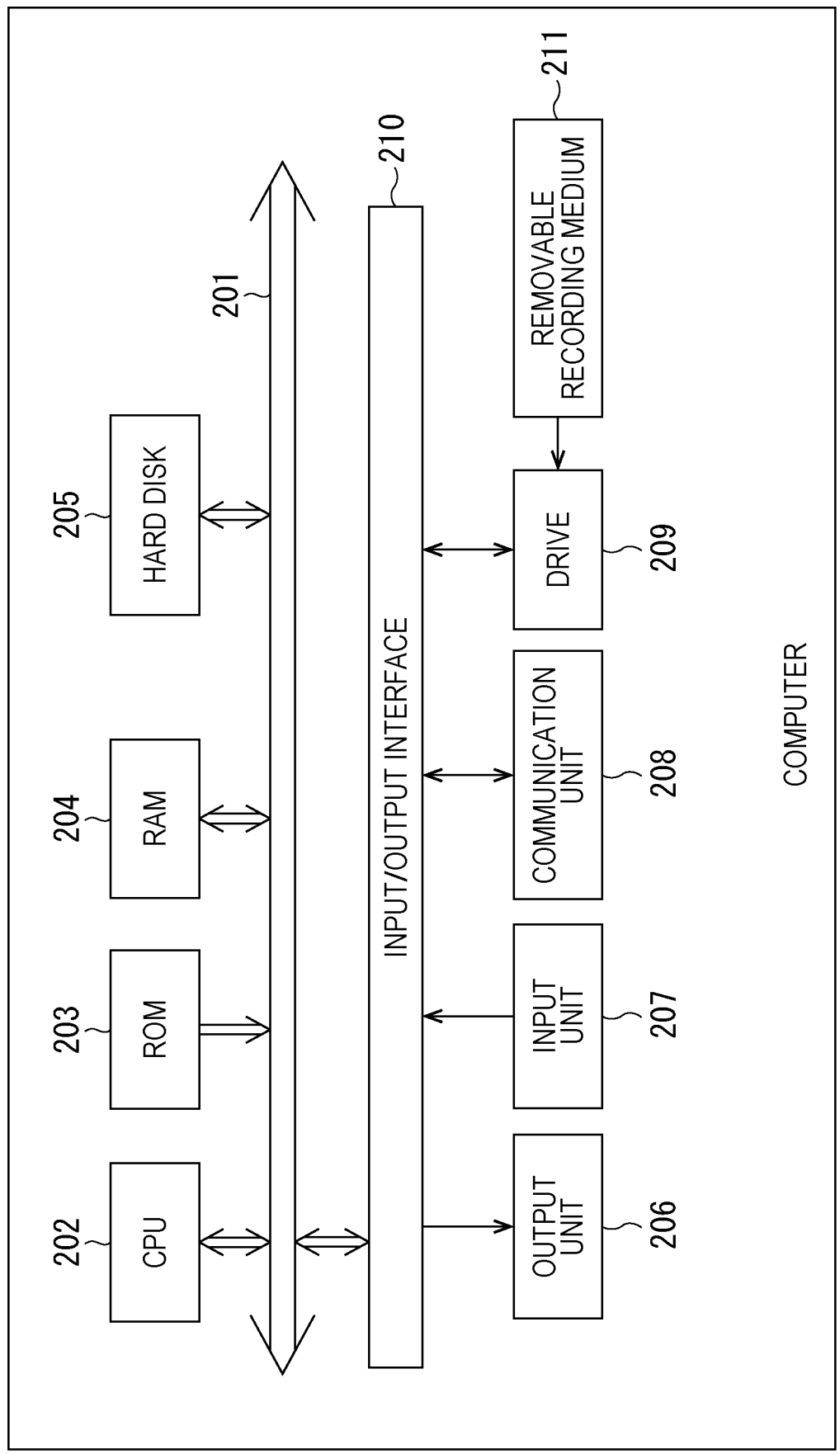

HIGH DENSITY RECORDING MEDIUM, RECORDING APPARATUS, RECORDING METHOD, REPRODUCING APPARATUS, AND REPRODUCING METHOD IN WHICH SYNCHRONIZATION PATTERNS ARE RECORDED WITH A SHIFT SO THAT POSITIONS IN A TRACK DIRECTION DO NOT OVERLAP

CROSS REFERENCE TO PRIOR APPLICATION

This application is a National Stage Patent Application of PCT International Patent Application No. PCT/JP2017/017964 (filed on May 12, 2017) under 35 U.S.C. § 371, which claims priority to Japanese Patent Application Nos. 2016-106613 (filed on May 27, 2016) and 2016-241919 (filed on Dec. 14, 2016), which are all hereby incorporated by reference in their entirety.

TECHNICAL FIELD

The present technology relates to a disk-type recording medium, a recording apparatus, a recording method, a reproducing apparatus, and a reproducing method, and more particularly, to a disk-type recording medium, a recording apparatus, a recording method, a reproducing apparatus, and a reproducing method, which are capable of recording, for example, data with high density and reproducing data recorded with high density robustly.

BACKGROUND ART

A technique of recording a mark of identification information serving as an address at an intermediate position between a land (track) and a groove (track) which are adjacent to each other, and recording a mark of identification information recorded at an intermediate position adjacent thereto in a radial direction with a shift in a track direction is disclosed in Patent Document 1.

CITATION LIST

Patent Document

Patent Document 1: Japanese Patent No. 5089781

SUMMARY OF THE INVENTION

Problems to be Solved by the Invention

In recent years, there have been high demands for a technique of recording data with high density and reproducing the data recorded with high density robustly.

The present technology was made in light of the foregoing, and it is desirable to provide a technique capable of recording data with high density and reproducing the data recorded with high density robustly.

Solutions to Problems

A disk-type recording medium of the present technology is a disk-type recording medium including synchronization patterns for synchronization being recorded in two adjacent tracks with a shift in a track direction so that positions in the track direction do not overlap.

In the disk-type recording medium of the present technology, synchronization patterns for synchronization are recorded in two adjacent tracks with a shift in a track direction so that positions in the track direction do not overlap.

A recording apparatus of the present technology is a recording apparatus including a recording unit that records synchronization patterns for synchronization in two adjacent tracks of a disk-type recording medium with a shift in a track direction so that positions in the track direction do not overlap.

A recording method of the present technology is a recording method including recording synchronization patterns for synchronization in two adjacent tracks of a disk-type recording medium with a shift in a track direction so that positions in the track direction do not overlap.

In the recording method of the present technology, synchronization patterns for synchronization are recorded in two adjacent tracks of a disk-type recording medium with a shift in a track direction so that positions in the track direction do not overlap.

A reproducing apparatus of the present technology is a reproducing apparatus including a reproducing unit that reproduces a reproduction signal from a disk-type recording medium in which synchronization patterns for synchronization are recorded in two adjacent tracks with a shift in a track direction so that positions in the track direction do not overlap.

A reproducing method of the present technology is a reproducing method including reproducing a reproduction signal from a disk-type recording medium in which synchronization patterns for synchronization are recorded in two adjacent tracks with a shift in a track direction so that positions in the track direction do not overlap.

In the reproducing method of the present technology, a reproduction signal is reproduced from a disk-type recording medium in which synchronization patterns for synchronization are recorded in two adjacent tracks with a shift in a track direction so that positions in the track direction do not overlap.

Further, the recording apparatus or the reproducing apparatus may be an independent apparatus or may be an internal block constituting one apparatus.

Further, the recording apparatus or the reproducing apparatus can be realized by causing a computer to execute a program. The program can be provided in a form in which it is transmitted via a transmission medium or recorded in a recording medium.

Effects of the Invention

According to the present technology, it is possible to record data with high density and reproduce the data recorded with high density robustly.

Note that the effects described here are not necessarily limited, and any effect described in the present disclosure may be included.

BRIEF DESCRIPTION OF DRAWINGS

FIG. 10 is a diagram for describing an overview of a PCWA 110 code.

FIG. 27 is a diagram illustrating an example of an FS.

FIG. 28 is a diagram illustrating an example of an FS in a case where there is no clock shift for FSs of 6 patterns and an FS in a case where there is a clock shift.

FIG. 30 is a diagram illustrating FS candidate bit strings FSA #i[0:4], FSB #i[0:4], and FSC #i[0:4] in a case where a time t=7.

FIG. 44 is a diagram illustrating an example of a nc0 pattern and terminal patterns tp1 and tp2.

FIG. 46 is a diagram illustrating an example of a nc 1 pattern and a nc 2 pattern of 60T arranged at a head of an auxiliary control pattern APCSY.

FIG. 49 is a block diagram illustrating a configuration example of one embodiment of a computer to which the present technology is applied.

MODE FOR CARRYING OUT THE INVENTION

<One Embodiment of Recording/Reproducing Apparatus to which Present Technology is Applied>

Figure 1:
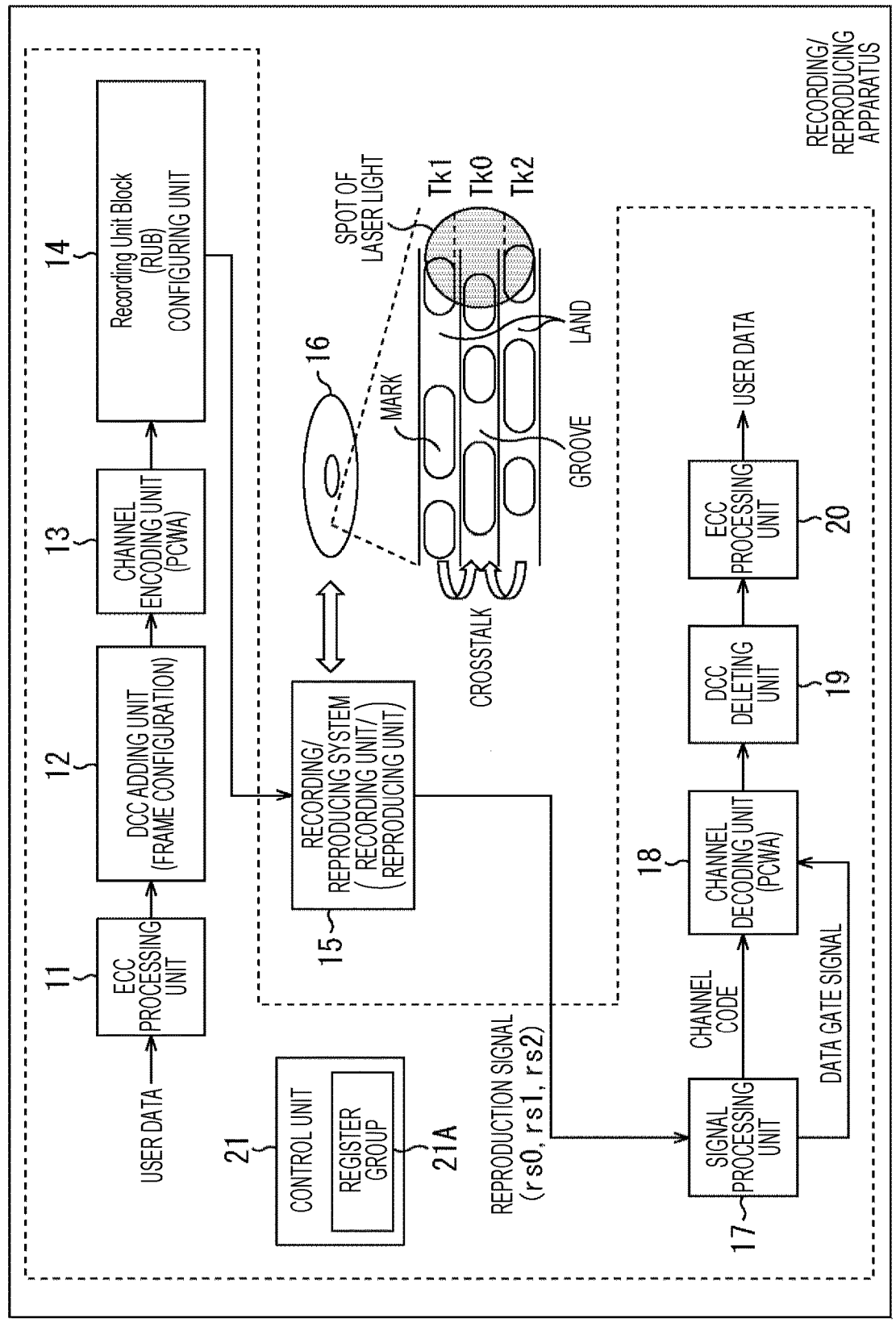
FIG. 1 is a block diagram illustrating a configuration example of one embodiment of a recording/reproducing apparatus to which the present technology is applied.

FIG. 1 is a block diagram illustrating a configuration example of one embodiment of a recording/reproducing apparatus to which the present technology is applied.

In FIG. 1, the recording/reproducing apparatus includes an Error Correction Coding (ECC) processing unit 11, a Direct Current Control (DCC) adding unit 12, a channel coding unit 13, a Recording Unit Block (RUB) constructing unit 14, a recording/reproducing system 15, an optical disc 16, a signal processing unit 17, a channel decoding unit 18, a DCC deleting unit 19, an ECC processing unit 20, and a control unit 21.

User data (content such as images or sounds, a computer programs, and other various kinds of data) to be recorded on the optical disc 16 is supplied to the ECC processing unit 11.

The ECC processing unit 11 constructs ECC target data including user data of a predetermined unit which is a target of an ECC process for each predetermined unit of user data.

Further, the ECC processing unit 11 constructs an ECC block by executing the ECC process for adding a parity to the ECC target data, and supplies the ECC block to the DCC adding unit 12.

The DCC adding unit 12 divides the ECC block from the ECC processing unit 11 into row data serving as data of a predetermined unit and adds (inserts) a DCC bit for direct current (DC) control to each piece of row data.

Further, the DCC adding unit 12 constructs a frame by adding necessary data such as a frame sync (FS) indicating a head (or an end) of a frame to the row data to which the DCC bit is added, and supplies the frame to the channel coding unit 13.

The channel coding unit 13 encodes the frame from the DCC adding unit 12 into a predetermined channel code and supplies the encoded frame to the RUB constructing unit 14.

Here, as the channel code, for example, a parity-complementary word assignment (PCWA) code, in particular, for example, a PCWA 110 code, an arbitrary run-length limited (RLL) code, or the like can be employed. Further, the PCWA 110 code is a binary code, but a multi-valued code of three or more values can be employed as the channel code.

Further, an RLL code in which a minimum run is d, and a maximum run is k is referred to as a (d,k) RLL code. The PCWA 110 code is a code having a code rate of ⅔ at which 2-bit information is encoded into a 3-bit code and is a (1,10) RLL code in which the minimum run d is 1, and the maximum run k is 10 in a non return to zero inversion (NRZI) expression. The PCWA 110 code is described, for example, in Japanese Patent No. 4998472.

Further, if a period of a channel clock of the recording/reproducing apparatus is indicated by T, and in a Non Return to Zero (NRZ) expression, the minimum run d and the maximum run k of the PCWA 110 are 2T and 11T, respectively.

Hereinafter, for runs such as the minimum run d and the maximum run k, runs by the NRZI expression are indicated without T, and runs (and sizes) by the NRZ expression are indicated with T.

Further, in the NRZI expression in this specification, for example, it is assumed that 1 means inversion of an immediately previous bit, and 0 means keeping an immediately previous bit without change.

The RUB constructing unit 14 constructs a RUB by adding Run_in and Run_out indicating the head and the end of the ECC block, respectively, to a set of frames (frames encoded into a channel code) (a frame cluster to be described later) from the channel coding unit 13, and supplies the RUB to the recording/reproducing system 15.

The recording/reproducing system 15 is constructed by a pickup or the like (not illustrated). The recording/reproducing system 15 functions as a recording unit that irradiates the optical disc 16 with light such as laser light, forms a mark, and records data in the optical disc 16. Further, the recording/reproducing system 15 functions as a reproducing unit that irradiates the optical disc 16 with the laser light, receives reflected light from the optical disc 16 against the laser light, outputs a reproduction signal corresponding to the reflected light, and reproduces data recorded in the optical disc 16.

The recording/reproducing system 15 irradiates the optical disc 16 with laser light in accordance with the RUB from the RUB constructing unit 14, and records the RUB in the optical disc 16. Further, the recording/reproducing system 15 irradiates the optical disc 16 with the laser light, reproduces the reproduction signal (a radio frequency (RF) signal) corresponding to the RUB or the like recorded in the optical disc 16, and supplies the reproduction signal to the signal processing unit 17.

The optical disc 16 is a sort of disk-type recording medium, and a land (track) and a groove (track) are formed as tracks at adjacent positions.

The groove is a groove-like track and wobbles for addressing. The land is a track sandwiched between two (adjacent) grooves.

In the optical disc 16, in order to record data with high density, data is recorded in both the land and the groove (marks are formed).

As described above, in the optical disc 16, since data is recorded in both the land and the groove, in a case where a certain track TK0 (the groove in FIG. 1) is a track of a reproduction target, in addition to the track TK0, tracks TK1 and TK2 adjacent to the track TK0 (further, tracks which are not adjacent to the track TK0 but adjacent to the tracks TK1 and TK2) are irradiated with the laser light (spot) with which the recording/reproducing system 15 irradiates the track TK0 of the reproduction target.

As a result, when the track TK0 of the reproduction target is reproduced, crosstalk from the tracks TK1 and TK2 adjacent to the track TK0 occur, and the reproduction signal having the track TK0 as the reproduction target deteriorates due to the crosstalk from the tracks TK1 and TK2 adjacent to the track TK0. In other words, the reproduction signal having the track TK0 as the reproduction target includes a crosstalk component caused by the crosstalk from the tracks TK1 and TK2 adjacent to the track TK0, and the reproduction signal having the track TK0 as the reproduction target is deformed from an original waveform (a waveform with no crosstalk).

The signal processing unit 17 to be described later performs crosstalk cancellation (hereinafter also referred to as cross talk cancel (XTC)) of canceling the crosstalk (component) of the reproduction signal as one of signal processing, and obtains the reproduction signal of the original waveform.

Here, in the recording/reproducing system 15, a light receiving surface of a light receiving element (not illustrated) that receives the reflected light from the optical disc 16 is divided into, for example, three regions in (a direction corresponding to) the radial direction of the optical disc 16. In the three regions, the reflected light from the optical disc 16 entering the regions are received, and signal components rs0, rs1, and rs2 corresponding to the reflected light are obtained. As a result, the recording/reproducing system 15 outputs the signal components rs0, rs1, and rs2 as the reproduction signals.

The signal component rs0 is a signal component mainly corresponding to the reflected light from the track TK0 of the reproduction target. Further, the signal component rs1 is a signal component mainly corresponding to the reflected light from (at least a part of) the track TK1 adjacent to one of an inner circumference and an outer circumference of the track TK0, and the signal component rs2 is a signal component mainly corresponding to the reflected light from (at least a part of) the track TK2 adjacent to the other of the inner circumference and the outer circumference of the track TK0.

As described above, the reproduction signal obtained by the recording/reproducing system 15 includes, for example, the signal components rs0, rs1, and rs2 serving as a plurality of signal components corresponding to a plurality of regions (for example, the tracks TK0, TK1, and TK2) which differ in the radial direction of the optical disc 16.

Further, here, the light receiving surface of the light receiving element of the recording/reproducing system 15 is divided into three regions in the radial direction of the optical disc 16, but the method of dividing the light receiving surface of the light receiving element is not limited thereto. In other words, the light receiving surface of the light receiving element can be divided into, for example, 4 or more regions in the radial direction of the optical disc 16. Further, the light receiving surface of the light receiving element can be divided into an arbitrary number of regions (a plurality of regions) by dividing it in the radial direction and the track direction of the optical disc 16. The recording/reproducing system 15 can obtain signal components which are equal in number to a division number of the light receiving surface of the light receiving element as the reproduction signal.

Further, when a plurality of signal components such as the signal components rs0, rs1, and rs2 are obtained as the reproduction signal, instead of dividing the light receiving surface of the light receiving element, the reflected light from the optical disc 16 may be received by a plurality of light receiving elements.

Further, instead of employing a plurality of signal components as the reproduction signal as described above, a signal obtained by receiving the reflected light from the optical disc 16 through one light receiving element in which the light receiving surface is not divided can be employed.

By performing the signal processing on the reproduction signal from the recording/reproducing system 15, ideally, the signal processing unit 17 restores the frame of the channel code similar to that output from the channel coding unit 13, and supplies the restored frame to the channel decoding unit 18.

Further, by performing the signal processing of the reproduction signal, the signal processing unit 17 generates frame data which is data of a portion of the frame of the channel code other than the FS, that is, a data gate signal indicating an interval of the row data to which the DCC bit is added, and supplies the frame data to the channel decoding unit 18.

The channel decoding unit 18 extracts, for example, the PCWA 110 code serving as the channel code which is the frame data of the interval indicated by the data gate signal similarly output from the signal processing unit 17 from the frame of the channel code output from the signal processing unit 17. Further, the channel decoding unit 18 performs decoding (channel decoding) on the PCWA 110 code which is the frame data extracted from the frame, and supplies the frame data obtained by the decoding, that is, the row data to which the DCC bit is added to the DCC deleting unit 19.

The DCC deleting unit 19 deletes the DCC bit from the frame data from the channel decoding unit 18 and supplies the resulting row data to the ECC processing unit 20.

The ECC processing unit 20 collects the row data from the DCC deleting unit 19 and constructs an ECC block. Further, the ECC processing unit 20 executes the ECC process on the ECC block, corrects an error occurring in the ECC target data included in the ECC block, and outputs the user data included in the ECC target data.

The control unit 21 controls the respective blocks constituting the recording/reproducing apparatus. In other words, the control unit 21 includes a register group 21A therein. The register group 21A stores (sets) various kinds of information such as command and the like in response to, for example, a manipulation of a manipulating unit (not illustrated) or the like. The control unit 21 controls the respective blocks constituting the recording/reproducing apparatus in accordance with a storage value (a setting value) of the register group 21A.

Further, in FIG. 1, the recording/reproducing apparatus is configured as an apparatus that performs both reproduction and recording but may be configured as a dedicated reproducing apparatus that performs only reproduction or a dedicated recording apparatus that performs only recording.

Further, in FIG. 1, the recording/reproducing apparatus may be configured such that the optical disc 16 is installed in advance or may be configured such that the optical disc 16 is removably attached.

Further, the ECC processing unit 11 to the RUB constructing unit 14 and the signal processing unit 17 to the control unit 21 constituting the recording/reproducing apparatus of FIG. 1 can be constituted by one chip.

<Recording Process>

Figure 2:
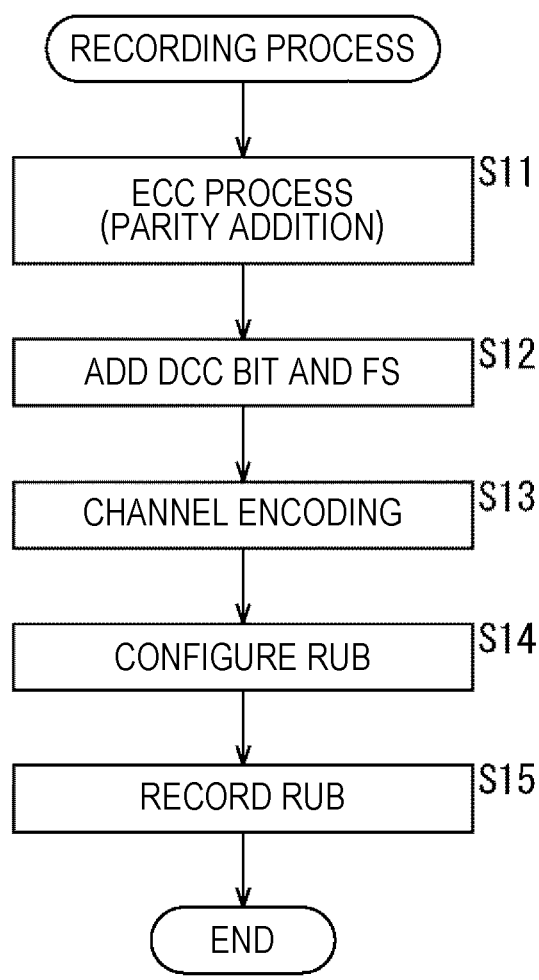
FIG. 2 is a flowchart illustrating an example of a recording process in which a recording/reproducing apparatus records user data in an optical disc 16.

FIG. 2 is a flowchart illustrating an example of a recording process in which the recording/reproducing apparatus of FIG. 1 records the user data in the optical disc 16.

In step S11, the ECC processing unit 11 constructs ECC target data including the user data using the user data supplied thereto. Further, the ECC processing unit 11 executes the ECC process to ECC target data, constructs an ECC block in which a parity is added to the ECC target data, and supplies the ECC block to the DCC adding unit 12, and the process proceeds from step S11 to step S12.

In step S12, the DCC adding unit 12 divides the ECC block from the ECC processing unit 11 into row data, and constructs a frame by adding the DCC bit to each piece of row data and adding necessary data such as an FS.

The DCC adding unit 12 supplies the frame to the channel coding unit 13, and the process proceeds from step S12 to step S13.

In step S13, the channel coding unit 13 encodes the frame from the DCC adding unit 12 into a channel code such as the PCWA 110 code and supplies the encoded frame to the RUB constructing unit 14, and the process proceeds to step S14.

In step S14, the RUB constructing unit 14 receives the frames from the channel coding unit 13, collects the frames obtained from one ECC block, and adds Run_in and Run_out to a set of frames. The RUB constructing unit 14 supplies the RUB to the recording/reproducing system 15, and the process proceeds from step S14 to step S15.

In step S15, the recording/reproducing system 15 records the RUB in the optical disc 16 by irradiating the optical disc 16 with the laser light in accordance with the RUB from the RUB constructing unit 14.

Thereafter, a similar process is performed, so that the user data is recorded in the optical disc 16 in units of RUBs. In other words, recording on optical disc 16 is performed using the RUB as a unit of recording.

<Reproducing Process>

Figure 3:
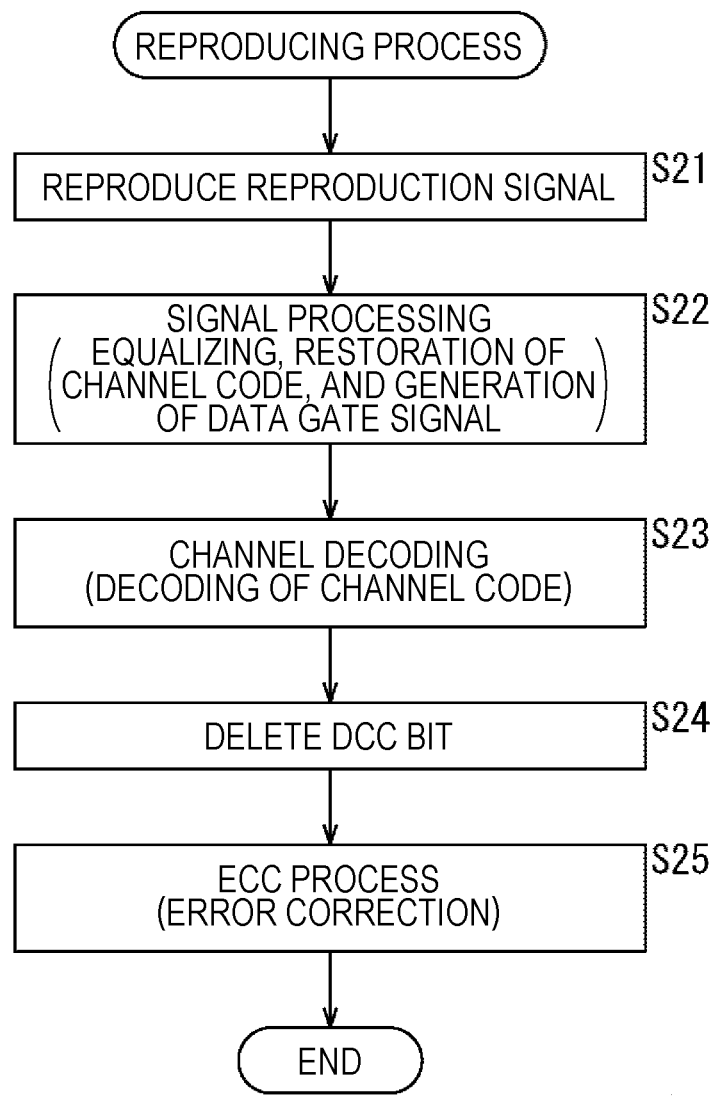
FIG. 3 is a flowchart illustrating an example of a reproducing process in which a recording/reproducing apparatus reproduces user data recorded in an optical disc 16.

FIG. 3 is a flowchart illustrating an example of a reproducing process in which the recording/reproducing apparatus of FIG. 1 reproduces the user data recorded in the optical disc 16.

In step S21, the recording/reproducing system 15 reproduces the reproduction signal corresponding to the RUB recorded in the optical disc 16 by irradiating the optical disc 16 with the laser light, and supplies the reproduction signal to the signal processing unit 17, and the process proceeds to step S22.

In step S22, the signal processing unit 17 performs signal processing on the reproduction signal from the recording/reproducing system 15.

In the signal processing on the reproduction signal, equalization of the reproduction signal, restoration of the frame of the channel code such as the PCWA 110 code, generation of the data gate signal, and the like are performed.

The frame of the channel code and the data gate signal obtained by the signal processing on the reproduction signal are supplied from the signal processing unit 17 to the channel decoding unit 18, and the process proceeds from step S22 to step S23.

In step S23, the channel decoding unit 18 extracts, for example, the PCWA 110 code serving as the channel code which is the frame data of the interval indicated by the data gate signal from the signal processing unit 17 from the frame of the channel code from the signal processing unit 17. Further, the channel decoding unit 18 performs the channel decoding on the channel code which is the frame data extracted from the frame. Then, the channel decoding unit 18 supplies the frame data (the row data to which the DCC bit is added) obtained by the channel decoding to the DCC deleting unit 19, and the process proceeds from step S23 to step S24.

In step S24, the DCC deleting unit 19 deletes the DCC bit from the frame data from the channel decoding unit 18, supplies the resulting row data to the ECC processing unit 20, and the process proceeds to step S25.

In step S25, the ECC processing unit 20 collects the row data from the DCC deleting unit 19 and constructs the ECC block. Further, the ECC processing unit 20 executes the ECC process on the ECC block using the parity included in the ECC block, corrects the error of the ECC block, and outputs the user data included in the ECC target data of the ECC block.

Thereafter, a similar process is performed, so that the user data is reproduced from the optical disc 16 in units of RUBs.

<Configuration Example of Signal Processing Unit 17>

Figure 4:
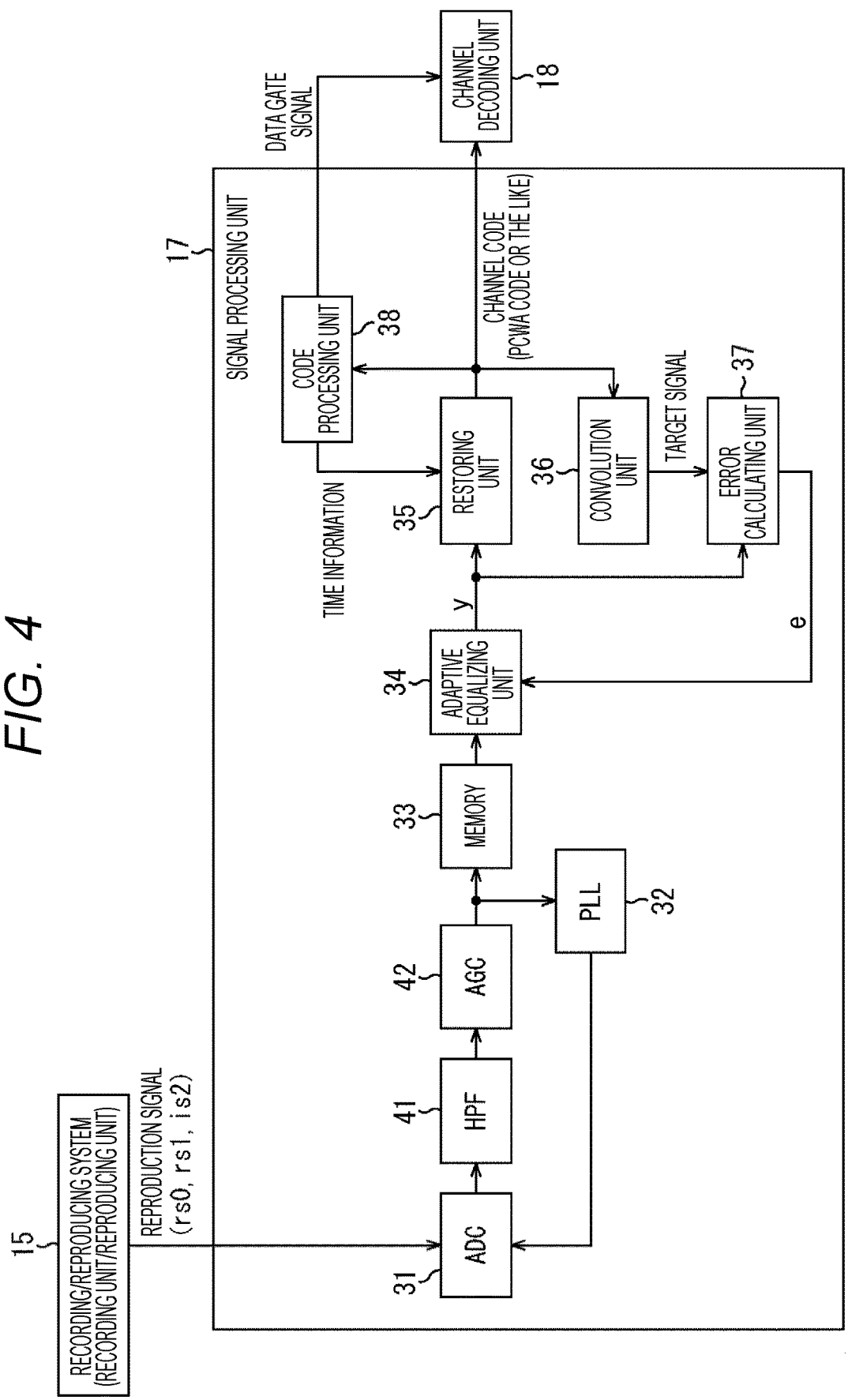
FIG. 4 is a block diagram illustrating a configuration example of a signal processing unit 17.

FIG. 4 is a block diagram illustrating a configuration example of the signal processing unit 17 of FIG. 1.

In FIG. 4, the signal processing unit 17 includes an analog to digital converter (ADC) 31, a phase lock loop (PLL) 32, a memory 33, an adaptive equalizing unit 34, a restoring unit 35, a convolution unit 36, an error calculating unit 37, a code processing unit 38, a high pass filter (HPF) 41, and an auto gain controller (AGC) 42.

The reproduction signal is supplied from the recording/reproducing system 15 to the ADC 31. The ADC 31 performs AD conversion on an analog reproduction signal from the recording/reproducing system 15 in synchronization with a channel clock supplied from the PLL 32, and outputs a resulting digital reproduction signal. The reproduction signal output from the ADC 31 is supplied to the PLL 32 and the memory 33 via the HPF 41 and the AGC 42.

The PLL 32 generates a clock synchronized with the reproduction signal supplied from the ADC 31 via the HPF 41 and the AGC 42 as the channel clock and supplies the generated clock to the ADC 31 and other necessary blocks constituting the recording/reproducing apparatus.

The memory 33 temporarily stores, for example, the signal components rs0, rs1, and rs2 serving as the reproduction signals supplied from the ADC 31 via the HPF 41 and the AGC 42.

Here, as described above with reference to FIG. 1, the signal component rs0 is a signal component mainly corresponding to the reflected light from the track TK0 of the reproduction target. Further, the signal component rs1 is a signal component mainly corresponding to the reflected light from the track TK1 adjacent to one of an inner circumference and an outer circumference of the track TK0, and the signal component rs2 is a signal component mainly corresponding to the reflected light from the track TK2 adjacent to the other of the inner circumference and the outer circumference of the track TK0.

The adaptive equalizing unit 34 adaptively equalizes the reproduction signal stored in the memory 33, and supplies an equalized signal y obtained by equalizing the reproduction signal such as a partial response (PR) signal obtained from a desired PR channel to the restoring unit 35 and the error calculating unit 37.

Here, an error e of the equalized signal y is supplied from the error calculating unit 37 to the adaptive equalizing unit 34. The equalization of the reproduction signal by the adaptive equalizing unit 34 is adaptively performed to reduce the error e from the error calculating unit 37.

Further, in the adaptive equalizing unit 34, for example, the signal components rs0, rs1, and rs2 serving as the reproduction signals stored in the memory 33 are independently equalized, and the equalized signal y is obtained by adding the equalization results of the signal components rs0, rs1, and rs2.

Further, in the equalization of the reproduction signal by the adaptive equalizing unit 34, it is possible to equalize a signal obtained by synthesizing (adding) the signal components rs0, rs1, and rs2 serving as the reproduction signals without independently equalizing the signal components rs0, rs1, and rs2.

The restoring unit 35 restores the PCWA 110 code (frame) or the like which is the channel code from the equalized signal y by performing the maximum likelihood decoding or the like on the equalized signal y from the adaptive equalizing unit 34, and supplies the restoration result to the channel decoding unit 18, the convolution unit 36, and the code processing unit 38.

Here, the restoring unit 35 restores the FS by performing the maximum likelihood decoding only on the FS at the head of the frame in the maximum likelihood decoding on the equalized signal y in accordance with a time-variant trellis for the FS in which a state and state transition are limited in accordance with a time.

Further, the maximum likelihood decoding for a portion other than the FS can be performed in accordance with the time-variant trellis prepared for the portion.

Further, the restoration of the PCWA 110 code other than the FS in the restoring unit 35 can be performed in accordance with a method other than the maximum likelihood decoding, that is, for example, binarization according to a threshold value process or the like.

The convolution unit 36 convolutes the restoration result from the restoring unit 35 and an impulse response of a desired PR channel, generates a target signal serving as a target of the equalized signal y which is the equalization result of the adaptive equalizing unit 34, and supplies the target signal to the error calculating unit 37.

The error calculating unit 37 obtains the error e of the equalized signal y from the adaptive equalizing unit 34 with respect to the target signal from the convolution unit 36 and supplies the error e to the adaptive equalizing unit 34.

Here, for example, Run_in included in the RUB recorded in the optical disc 16 is a known pattern. The target signal of the equalized signal y obtained by equalizing the reproduction signal of the known pattern is obtained by the convolution of the restoration result restored from the equalized signal y and the impulse response of the desired PR channel and can be obtained by convolution of the known pattern and an impulse response of a desired PR channel as well.

By processing the restoration result from the restoring unit 35, the code processing unit 38 generates time information used for the maximum likelihood decoding according to the time-variant trellis in the restoring unit 35, and supplies the time information to the restoring unit 35. In there storing unit 35, the maximum likelihood decoding for the FS is performed using the time information from the code processing unit 38.

Further, in response to the restoration result from the restoring unit 35, the code processing unit 38 generates the data gate signal and supplies the data gate signal to the channel decoding unit 18.

The HPF 41 filters the reproduction signal output from the ADC 31, cuts off a direct current (DC) component of the reproduction signal, and supplies the resulting signal to the AGC 42.

The AGC 42 performs an auto gain control (AGC) process of adjusting a gain of the reproduction signal from the HPF 41, and supplies the resulting signal to the PLL 32 and the memory 33.

<Configuration Example of Adaptive Equalizing Unit 34>

Figure 5:
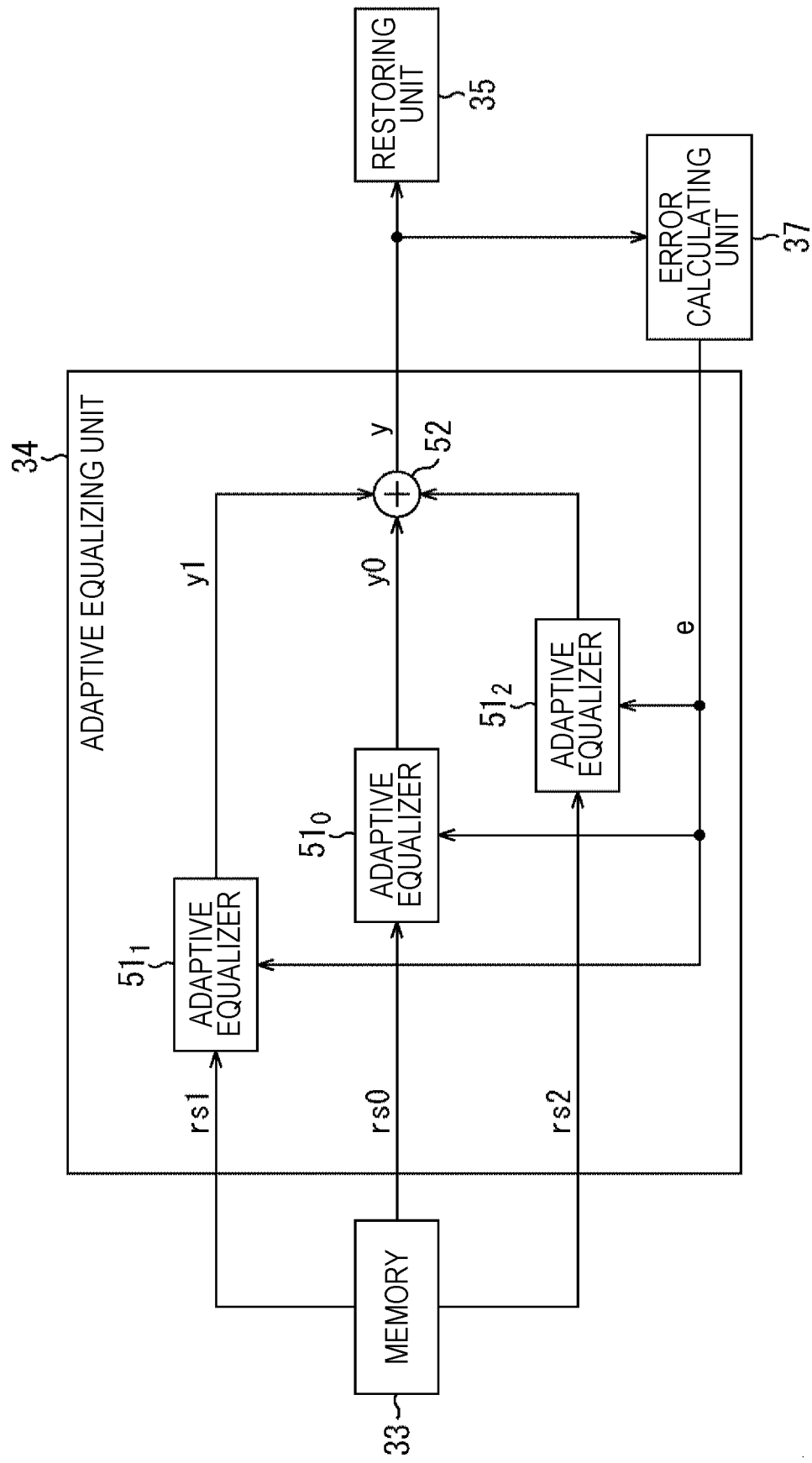
FIG. 5 is a block diagram illustrating a configuration example of an adaptive equalizing unit 34.

FIG. 5 is a block diagram illustrating a configuration example of the adaptive equalizing unit 34 of FIG. 4.

In FIG. 5, the adaptive equalizing unit 34 has three adaptive equalizers $51_0$, $51_1$, and $51_2$ which are equal in number to the signal components rs0, rs1, and rs2 serving as the reproduction signals output by the recording/reproducing system 15 and an adding unit 52.

The signal component rs #i is supplied from the memory 33 to the adaptive equalizer $51_i$ (i=0, 1, and 2 in FIG. 5). The adaptive equalizer $51_i$ includes, for example, a finite impulse response (FIR) filter, and performs equalization by filtering the signal component rs #i from the memory 33 through the FIR filter. The adaptive equalizer $51_i$ supplies an equalization component y #i which is the equalization result of the signaling component rs #i to the adding unit 52.

Further, the error e of the equalized signal y with respect to the target signal is supplied from the error calculating unit 37 to the adaptive equalizer $51_i$. The adaptive equalizer $51_i$ adaptively equalizes the signal component rs #i by adjusting a tap coefficient of the FIR filter that performs the equalization by, for example, −exa ("a" is a predetermined coefficient) in accordance with the error e from the error calculating unit 37.

In other words, as the tap coefficient of the FIR filter is adjusted by −exa, the adjusted tap coefficient is set to reduce a square error of the equalized signal y with respect to the target signal.

Therefore, the adaptive equalizer $51_i$ performs the equalization of the signal component rs #i using the tap coefficient that reduces the error e between the equalized signal y and the target signal.

The adaptive equalizing unit 34 having the above configuration performs the crosstalk cancellation (XTC) as follows.

In other words, the adaptive equalizer $51_i$ sets the tap coefficient of the FIR filter in accordance with the error e from the error calculating unit 37. Further, in the adaptive equalizer $51_i$, the signal component rs #i is filtered by the FIR filter and equalized independently.

Then, the adding unit 52 adds the equalization components y #0 to y #2 which are equalization results of the signal components rs #0 to rs #2 obtained by the adaptive equalizer $51_0$ to $51_2$, removes the crosstalk component from the reproduction signal from the optical disc 16, and obtains the equalized signal y as if it passed through the desired PR channel.

Here, the process of adjusting the tap coefficient of the FIR filter to reduce the error e of the equalized signal y in the adaptive equalizer $51_i$ as described above is also referred to as XTC learning. Since the tap coefficient is adjusted to reduce the square error of the equalized signal y with respect to the target signal in the XTC learning as described above, the XTC learning is least mean square (LMS) learning.

<Configuration Example of Code Processing Unit 38>

Figure 6:
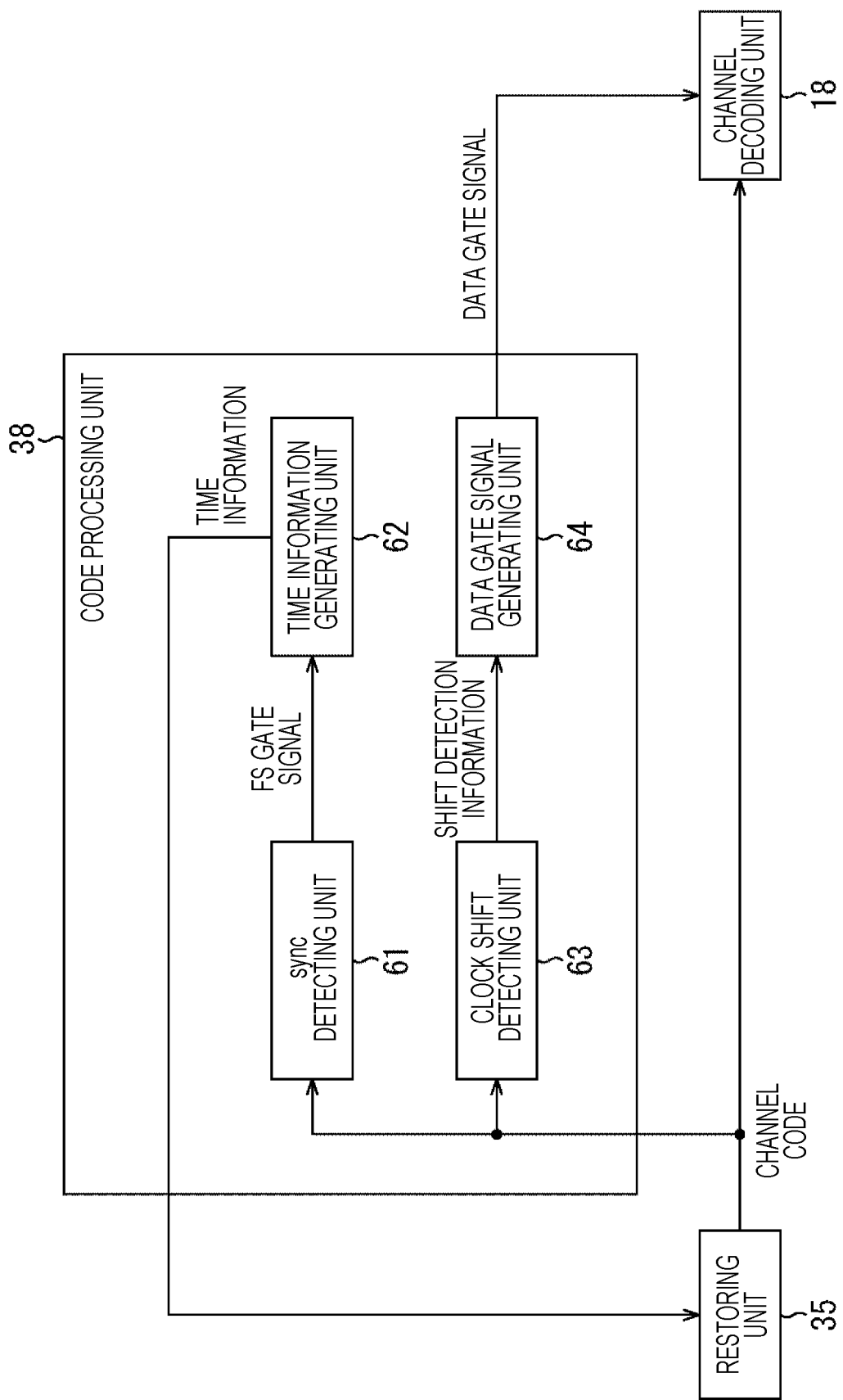
FIG. 6 is a block diagram illustrating a configuration example of a code processing unit 38.

FIG. 6 is a block diagram illustrating a configuration example of the code processing unit 38 of FIG. 4.

In FIG. 6, the code processing unit 38 has a sync detecting unit 61, a time information generating unit 62, a clock shift detecting unit 63, and a data gate signal generating unit 64.

The PCWA 110 code or the like serving as the restoration result is supplied from the restoring unit 35 to the sync detecting unit 61.

The sync detecting unit 61 detects a predetermined pattern such as a synchronization pattern syn0 for synchronization from the restoration result from the restoring unit 35 and generates an FS gate signal indicating the interval of the FS at the head of the frame included in equalized signal y supplied from the adaptive equalizing unit 34 to the restoring unit 35 in accordance with the detection result. The sync detecting unit 61 then supplies the FS gate signal to the time information generating unit 62.

The time information generating unit 62 recognizes a position (a timing and an interval) of the FS from the FS gate signal from the sync detecting unit 61. Further, the time information generating unit 62 counts a time based on the position of the FS in synchronization with the channel clock generated by the PLL 32, and supplies counting information to the restoring unit 35 as time information.

The restoration result is supplied from the restoring unit 35 to the clock shift detecting unit 63.

The clock shift detecting unit 63 detects (a position shift of data reproduced from the optical disc 16 which is caused by) the clock shift of the channel clock in accordance with (the restoration result of) the FS among the restoration results from the restoring unit 35. Further, the clock shift detecting unit 63 supplies shift detection information indicating the detection result of the clock shift to the data gate signal generating unit 64.

The data gate signal generating unit 64 generates the data gate signal indicating the interval of the frame data subsequent to the FS at the head of the frame in accordance with the shift detection information from the clock shift detecting unit 63 and supplies the data gate signal to the channel decoding unit 18.

<ECC Block>

Figure 7:
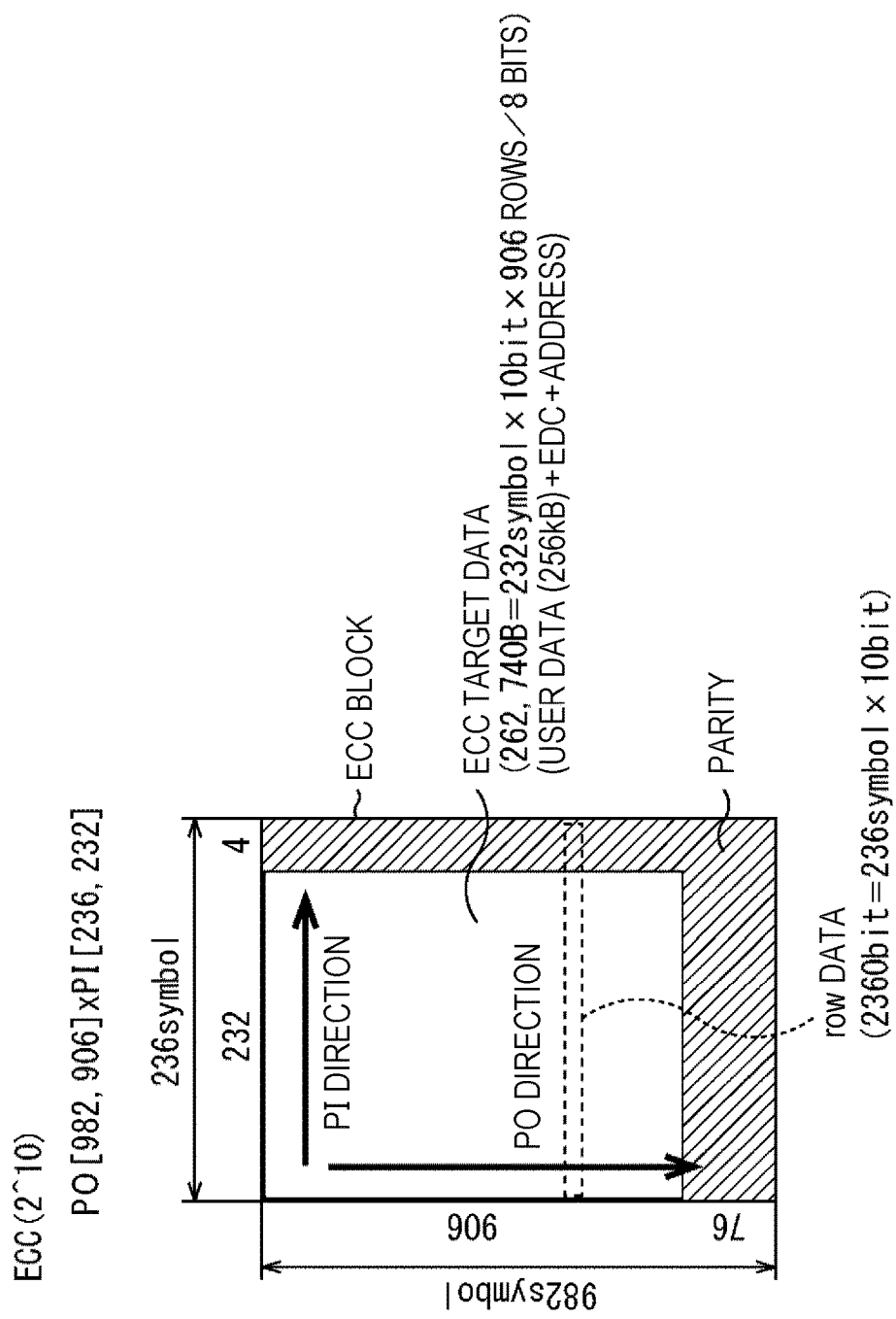
FIG. 7 is a diagram for describing an example of an ECC block configured with an ECC processing unit 11.

FIG. 7 is a diagram for describing an example of the ECC block constructed by the ECC processing unit 11 of FIG. 1.

For example, the ECC processing unit 11 scrambles user data of 256 kilo byte (kB) including an error detection code (EDC), adds an address to the scrambling result, and constructs data of 262,740 byte (B) as ECC target data.

Here, for example, if 1 symbol is assumed to be 10 bits, the ECC processing unit 11 forms ECC target data of 232×906 (horizontal×vertical) symbols. In a case where 1 symbol is 10 bits, the ECC target data of 232×906 symbols is data of 262,740 B (=232 symbols×10 bits×906 rows/8 bits) as described above.

The ECC processing unit 11 constructs an ECC block of 236×982 symbols, for example, by adding a parity (parity inner (PI)) of 4 symbols to each row of the ECC target data of 232×906 symbols and adding a parity (parity outer (PO)) of 76 symbols to each column of the ECC target data. The ECC block constructed by the ECC processing unit 11 is a product code of a 10-bit symbol (a Galois field of 2^10).

A symbol sequence of one row of the ECC block is data of 2,360 data bits (dbits) (=236 symbols×10 bits), and if data of 2,360 dbits in one row is assumed to be row data, the ECC block is divided into row data and recorded in the optical disc 16.

<Frame>

Figure 8:
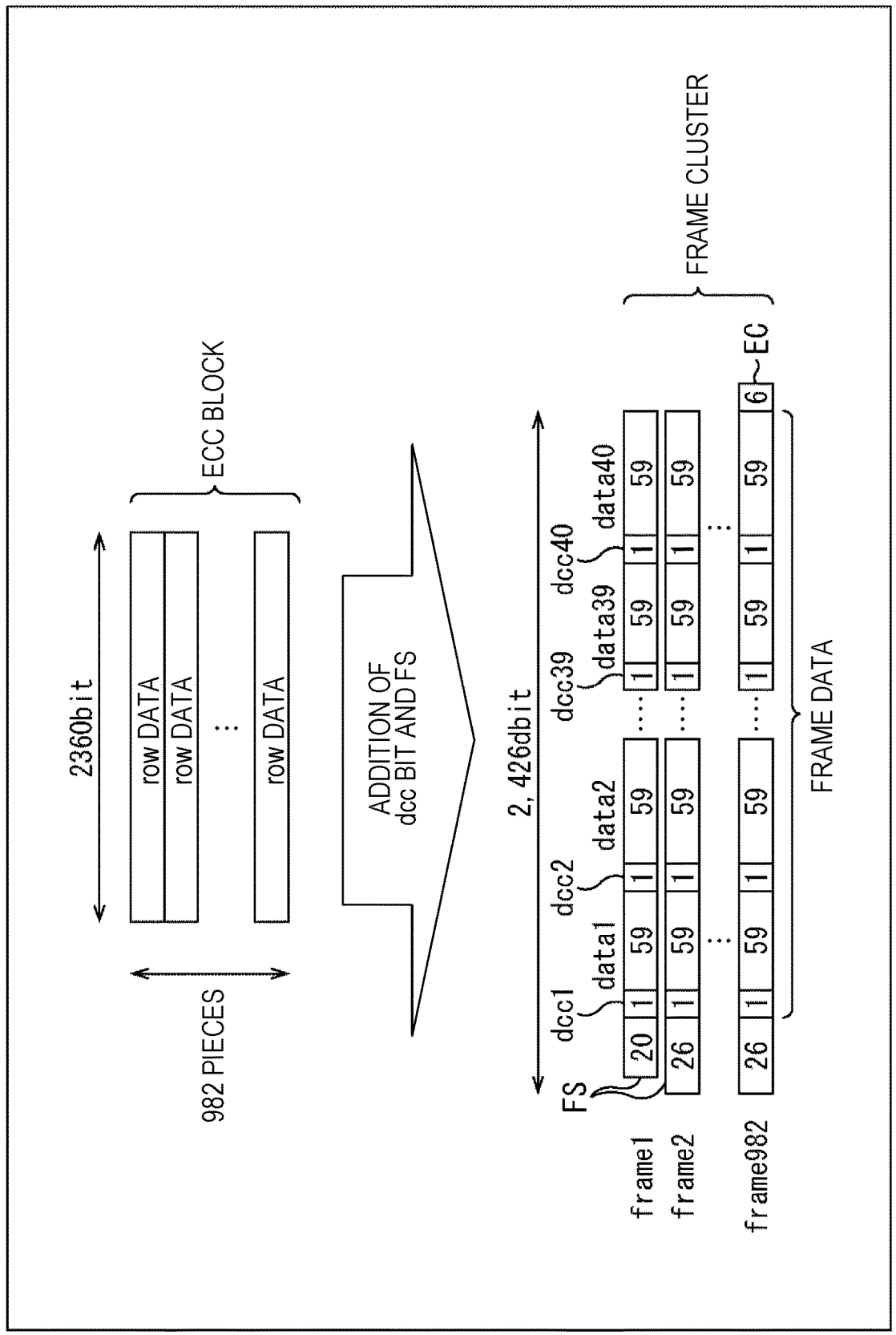
FIG. 8 is a diagram for describing an example of a frame constructed by a DCC adding unit 12.

FIG. 8 is a diagram for describing an example of a frame constructed by the DCC adding unit 12 in FIG. 1.

The DCC adding unit 12 divides the ECC block into row data which is data of 2,360 dbits in one row.

Further, the DCC adding unit 12 divides each piece of row data divided from the ECC block into 40 pieces of data data1 to data40 of 59 dbits. Then, the DCC adding unit 12 adds a 1-bit DCC bit dcc #i to the head of each piece of data data #i (i=1, 2, . . . , and 40 in FIG. 8), and constructs frame data of 2,400 dbits from the row data of 2,360 dbits accordingly.

The frame data of 2,400 dbits includes 40 sets of data data #i and a DCC bit dcc #i.

The DCC adding unit 12 adds the FS to the head of frame data, so that a frame frame #i in which the FS is arranged at the head, and the frame data is arranged following the FS is constructed.

Since one ECC block includes 982 pieces (rows) of row data, 982 frames frame1 to frame982 are constructed from one ECC block.

The FS is a pattern of 26 dbits, and thus one frame frame #i is data of 2,426 dbits including the FS of 26 dbits and the frame data of 2,400 dbits.

Here, as an FS of a first frame frame1 among the 982 frames frame1 to frame982 obtained from one ECC block, an FS of 20 dbits in which 6 dbits at the head of the FS of 26 dbits are omitted is employed.

Therefore, only the first frame frame1 among the 982 frames frame1 to frame982 obtained from one ECC block is data of 2,420 dbits.

The DCC adding unit 12 adds an end code (EC) of data of 6 dbits (to be described later) constituting the FS to the end of the last frame frame982 among the 982 frames frame1 to frame982 obtained from one ECC block.

Accordingly, the DCC adding unit 12 constitutes a frame cluster including the 982 frames frame1 to frame982 and the EC, and supplies the frame cluster to the channel coding unit 13 (FIG. 1).

<RUB>

Figure 9:
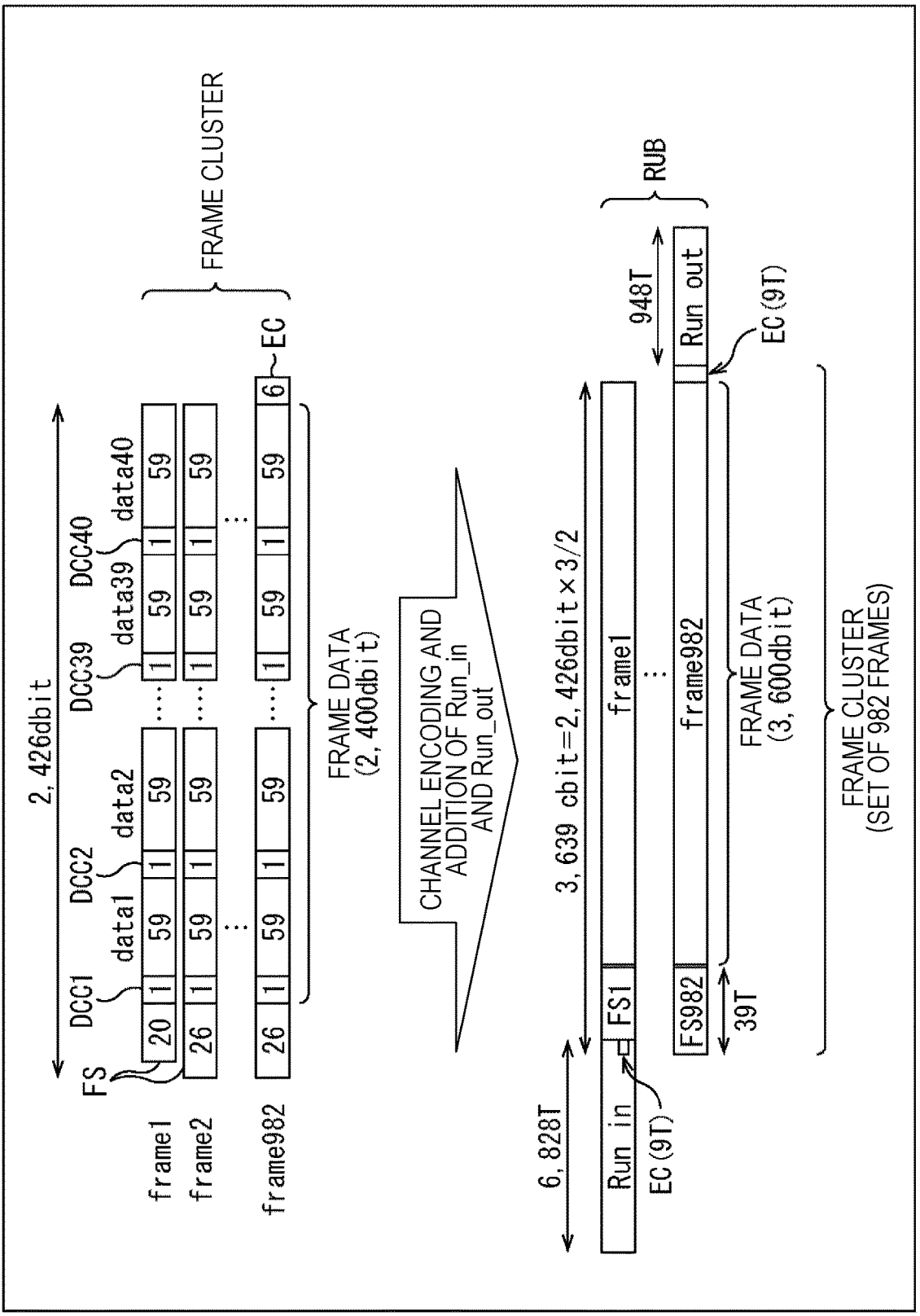
FIG. 9 is a diagram for describing an example of a RUB constructed by a RUB constructing unit 14.

FIG. 9 is a diagram for describing an example of the RUB constructed by the RUB constructing unit 14 in FIG. 1.

The channel coding unit 13 performs the channel coding of encoding the frame cluster supplied from the DCC adding unit 12 into, for example, the PCWA 110 code or the like. Since the PCWA 110 code is a code with a coding rate of 2/3 as described above with reference to FIG. 1, the size (the number of bits) of the frame cluster after the channel coding is 3/2 times as large as that before the channel coding.

In other words, the size of each of the frames frame2 to frame982 other than the first frame frame1 constituting the frame cluster is 3,639 channel bits (cbits) which is 3/2 times of 2,426 dbits. Note that the size of the FS at the head of each of the frame frame2 to frame982 is 39T (39 cbits) which is 3/2 times of 26 dbits.

The size of the first frame frame1 constituting the frame cluster is 3,630 cbits which is 3/2 times of 2,420 dbits. Further, the size of the FS at the head of the frame frame1 is 30T (30 cbits) which is 3/2 times of 20 dbits.

The size of the EC constituting the frame cluster is 9T (9 cbits) which is 3/2 times of 6 dbits.

Here, the size of the first frame frame1 constituting the frame cluster is 3,630 cbits which is smaller than the size 3,639 cbits of the other frames by the EC of 9 dbits, but since the EC of 9 dbits is arranged at the end of the frame cluster, after all, the size of the frame cluster including the 982 frames frame1 to frame982 and the EC is 3,573,498 cbits (=3,639 cbits×982 pieces) which is the size corresponding to the 982 frames each having 3,639 cbits.

The frame cluster encoded into the PCWA 110 code by the channel coding unit 13 is supplied to the RUB constructing unit 14.

The RUB constructing unit 14 constructs the RUB by adding Run_in indicating the head of the RUB and Run_out indicating the end of the RUB to the head and the end of the frame cluster from the channel coding unit 13.

In FIG. 9, the size of Run_in is, for example, 6,828T, and the size of Run_out is, for example, 450T. Here, a total size 6,828T+450T of Run_in and Run_out is equal to 3,639 cbits×2 corresponding to the two frames each having 3,639 cbits.

Further, the end of Run_in is the EC of (the size of) 9T.

Further, the head of the FS of 39T at the head of each of the frames frame2 to frame982 is the EC of 9T as described later.

Since the RUB is constructed by adding Run_in to the head of frame cluster, the first frame frame1 of the frame cluster is arranged in the RUB following Run_in.

The FS of 30T of the frame frame1 includes no EC of 9T arranged at the head of the FS of 39T of the other frames (frame2 to frame982), but since the EC is arranged at the end of Run_in, if the last EC of Run_in is considered, the FS of 39T is arranged at the head of the frame frame1, similarly to the other frames.

<PCWA 110 Code>

FIG. 10 is a diagram for describing an overview of the PCWA 110 code.

In other words, FIG. 10 is a diagram illustrating a code table and a replacement table used for encoding into the PCWA 110 code (PCWA 110 encoding).

In the PCWA 110 encoding, there are five encoding states S1, S2, S3, S4, and S5, and in addition to information bits to be encoded, the PCWA 110 code is decided in accordance with the current encoding state.

The PCWA 110 code is decided in accordance with the code table.

In the code table of FIG. 10, a leftmost column indicates 2-bit information bits 00, 01, 10, and 11 which are to undergo the PCWA 110 encoding. A number in brackets subsequent to the 2-bit information bits is a decimal notation of the 2-bit information bit.

In the code table of FIG. 10, an uppermost row indicates (states which can be taken as) the current encoding states S1, S2, S3, S4, and S5.

Here, in the code table, a field at a C-th column from the left and an R-th row from the top is also referred to as a field (C,R).

Further, the PCWA 110 code is indicated by the NRZI expression unless otherwise set forth herein.

For example, in a case where the current encoding state is S1, if the PCWA 110 encoding is performed on the information bits 00, the information bits 00 is encoded into a PCWA 110 code 000 described in the field (2,2) in accordance with the field (2,2) corresponding to the column (second column) in which the encoding state of the code table is the current state S1 and the row (second row) in which the information bits are 00.

Further, the encoding state transitions from the current state S1 to the state S3 described in the field (2,2)

In a case where the information bits which is a next target of the PCWA 110 encoding is, for example, 00 which is similar to the previous time, the information bits 00 is encoded -into a PCWA 110 code 010 described in the field (4,2) in accordance with the field (4,2) corresponding to the column (fourth column) in which the encoding state of the code table is the current state S3 and the row (second row) in which the information bits are 00.

Further, the encoding state transitions from the current state S3 to the state S3 described in the column (4,2).

Similarly, the PCWA 110 encoding is performed in accordance with the code table on the basis of the current encoding state.

Here, in the PCWA 110 encoding, in a case where a specific condition is satisfied, code sequence replacement of replacing a code sequence of the PCWA 110 code decided in accordance with the code table is performed.

The code sequence replacement is performed in accordance with the replacement table.

In the replacement table of FIG. 10, a departure state indicates a state in which the PCWA 110 encoding of (a sequence of) 6-bit information bits starts, and an arrival state indicates a state reached after the PCWA 110 encoding of the 6-bit information bits.

In a case where the departure state is the (encoded) state S1, according to the code table, the 6-bit information bits 10 10 10, 10 10 11, 10 10 00, and 10 10 01 are all encoded into a PCWA 110 code 000 000 000. Further, the arrival states after the PCWA 110 encoding of the 6-bit information bits 10 10 10, 10 10 11, 10 10 00, and 10 10 01 are the states S1, S2, S3, and S4 respectively.

In this case, the PCWA 110 code 000 000 000 of each of the 6-bit information bits 10 10 10, 10 10 11, 10 10 00, and -10 10 01 is all replaced with a replacement code sequence 000 101 010 in accordance with the replacement table.

Further, in a case where the departure state is the state S5, according to the code table, the 6-bit information bits 00 10 10, 00 10 11, 00 10 00, and 00 10 01 are all encoded into a PCWA 110 code 100 000 000. Further, the arrival states after the PCWA 110 encoding of the 6-bit information bits 00 10 10, 00 10 11, 00 10 00, and 00 10 01 are the states S1, S2, S3, and S4, respectively.

In this case, the PCWA 110 code 100 000 000 of each of the 6-bit information bits 00 10 10, 00 10 11, 00 10 00, and 00 10 01 is replaced with a replacement code sequence 100 101 010 in accordance with the replacement table.

<FS>

Figure 11:
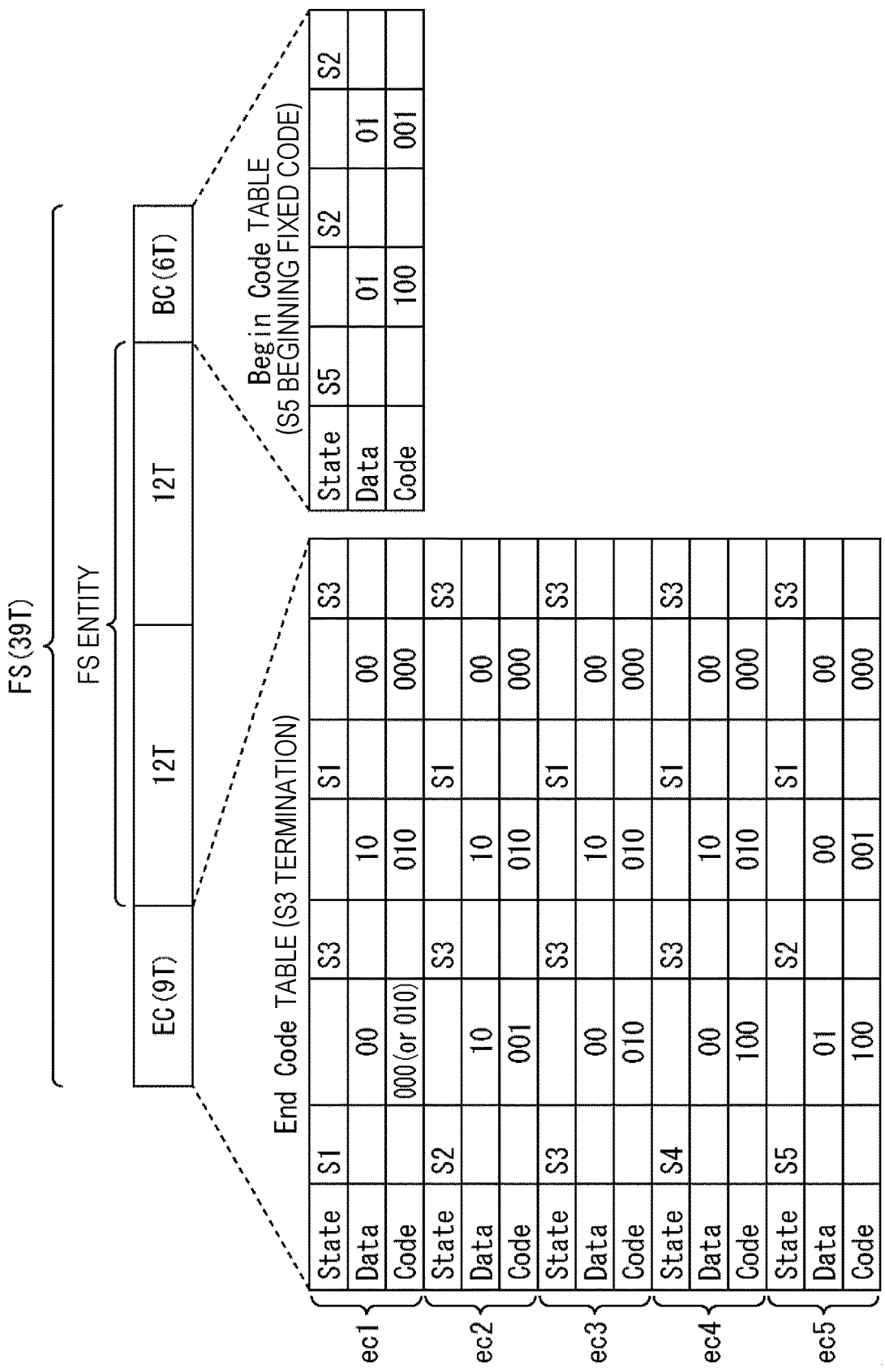
FIG. 11 is a diagram illustrating a configuration example of an FS of 39T.

FIG. 11 is a diagram illustrating a configuration example of the FS of 39T of FIG. 9.

The FS of 39T (the FS after the PCWA encoding of the frames frame2 to frame982 or the like) is configured such that an EC of 9T, an FS entity including data of 2 pieces of data of 12T, and a begin code (BC) of 6T are arranged in the described order.

Further, the FS of 30T of the frame frame1 (FIG. 9) is configured such that there is no EC of 9T at the head of the FS of 39T.

In FIG. 11, an end code (EC) table indicates a pattern serving as an EC, and a begin code (BC) table indicates a pattern serving as a BC. The EC and the BC are patterns having runs satisfying a code rule of the PCWA 110 code (a kind of (d,k) RLL code) serving as the channel code.

In other words, the EC is a pattern of 9T in which the encoding state of the PCWA 110 encoding starts from each of the possible states S1 to S5 (FIG. 10) and terminates in a specific one state.

In FIG. 11, the state S3 is employed as the specific one state. Note that the specific one state is not limited to the state S3.

In the PCWA 110 encoding of data immediately before the EC, in a case where the encoding state is the state S1, 000 010 000 is employed as the EC of 9T (the EC (Code) after the PCWA 110 encoding) as indicated by ec1 in the EC table.

In a case where the encoding state departs from the state S1, 000 010 000 which is the EC after the PCWA 110 encoding is obtained by the PCWA 110 encoding of the 6-bit information bits (Data) 00 10 00. In the PCWA 110 encoding, the encoding state (State) transitions from the state S1 to the states S3, S1, and S3 in the described order and terminates (ends) in the state S3.

In the PCWA 110 encoding of data immediately before the EC, in a case where the encoding state is the state S2, 001 010 000 is employed as the EC of 9T (Code) as indicated by ec2 in the EC table.

In a case where the encoding state departs from state S2, 001 010 000, which is the EC after PCWA 110 encoding is obtained by the PCWA 110 encoding of the 6-bit information bits (Data) 10 10 00. In the PCWA 110 encoding, the encoding state (State) transitions from the state S2 to the states S3, S1, and S3 in the described order and terminates in the state S3.

In the PCWA 110 encoding of data immediately before the EC, in a case where the encoding state is the state S3, 010 010 000 is employed as the EC of 9T (Code) as indicated by ec3 in the EC table.

In a case where the encoding state departs from the state S3, 010 010 000 which is the EC after PCWA 110 encoding is obtained by the PCWA 110 encoding of the 6-bit information bits (Data) 00 10 00. In the PCWA 110 encoding, the encoding state (State) transitions from the state S3 to the states S3, S1, and S3 in the described order and terminates in the state S3.

In the PCWA 110 encoding of data immediately before the EC, in a case where the encoding state is the state S4, 100 010 000 is employed as the EC of 9T (Code) as indicated by ec4 in the EC table.

In a case where the encoding state departs from the state S4, 100 010 000 which is the EC after PCWA 110 encoding is obtained by the PCWA 110 encoding of the 6-bit information bits (Data) 00 10 00. In the PCWA 110 encoding, the encoding state (State) transitions from the state S4 to the states S3, S1, and S3 in the described order and terminates in the state S3.

In the PCWA 110 encoding of data immediately before the EC, in a case where the encoding state is the state S5, 100 001 000 is employed as the EC of 9T (code) as indicated by ec5 in the EC table.

In a case where the encoding state departs from the state S5, 100 001 000 which is the EC after PCWA 110 encoding is obtained by the PCWA 110 encoding of the 6-bit information bits (Data) 01 00 00. In the PCWA 110 encoding, the encoding state (State) transitions from the state S5 to the states S2, S1, and S3 in the described order and terminates in the state S3.

Note that, in the PCWA 110 encoding of data immediately before the EC, in a case where the encoding state is the state S1, the encoding state transitions from the state S1 to the state S3 in accordance with the code table (FIG. 10) through the PCWA 110 encoding of the first 2-bit information bits 00 among the 6 bits information bits (Data) 00 10 00 indicated by ec1 in the EC table.

In this case, in the PCWA 110 encoding of data immediately before the EC, when the encoding state transitions to the states S1, S3, and S1 in the described order, the encoding state transitions to the state S3 after the PCWA 110 encoding of the first 2-bit information bits 00 of the EC.

In a case where such transition of the encoding state occurs, since the departure state is the state S1, and the arrival state is the state S3, the PCWA 110 code 000 000 000 is obtained in the PCWA 110 encoding in which the transition from the departure state S1 to the arrival state S3 (the transition in the order of the states S1, S3, S1, and S3).

In this case, the PCWA 110 code 000 000 000 is replaced with the replacement code sequence 000 101 010 as illustrated in (a fourth row from the top of) the replacement table of FIG. 10.

According to the replacement with the replacement code sequence 000 101 010, the PCWA 110 code 000 obtained by the PCWA 110 encoding of the first 2-bit information bits 00 of the EC (the first PCWA 110 code 000 indicated by ec 1 in the EC table) is replaced with last 3 bits 010 of the replacement code sequence 000 101 010.

Therefore, in the PCWA 110 encoding of data immediately before the EC, in a case where the encoding state is the state S1, in a case where the replacement with the replacement code sequence 000 101 010 is not performed, the EC of 9T (Code) is 000 010 000 as described above, but in a case where the replacement with the replacement code sequence 000 101 010 is performed, the EC (Code) of 9T is 010 010 000 in which the first 3 bits 000 of 000 010 000 are replaced with the last 3 bits 010 of the replacement code sequence 000 101 010.

Therefore, in the PCWA 110 encoding of data immediately before the EC, in a case where the encoding state is the state S1, the EC may be 000 010 000 or may be 010 010 000.

The EC described above is a pattern in which the last run is 4 or 3 in the NRZI expression (5T or 4T in the NRZ expression).

In other words, in the EC table, the ECs indicated by ec1 to ec4 are patterns having the last run of 4 (5T in the NRZ expression), and the EC indicated by ec5 is a pattern having the last run of 3 (4T in the NRZ expression).

The BC is a pattern of 6T in which the encoding state of the PCWA 110 encoding starts from a predetermined one state among the possible states S1 to S5 (FIG. 10).

In FIG. 11, the state S5 is employed as the predetermined one state. Note that the predetermined one state is not limited to the state S5.

Then, 100 001 is employed as the BC of 6T ((Code) after the PCWA 110 encoding).

The PCWA 110 code 100 001 serving as BC is a pattern in which a first run is 4 (5T in the NRZ expression).

In a case where the encoding state departs from the state S5, 100 001 which is the BC after the PCWA 110 encoding is obtained by the PCWA 110 encoding of the 4-bit information bits (Data) 01 01. In the PCWA 110 encoding, the encoding state (State) transitions from the state S5 to the states S2 and S2 in the described order.

Note that, according to the BC described above, since the encoding state becomes the state S2 when the PCWA 110 encoding of data immediately after the BC is performed, the data immediately after the BC is encoded into the PCWA 110 code 001 or 000 in accordance with the encoding table (FIG. 10).

Thus, the BC is followed by a pattern in which the run is at least 2 or 3 (3T or 4T in the NRZ expression).

As illustrated in FIG. 9, the FS is arranged at the head of the frame, and the EC is arranged after the last frame frame982. Therefore, the last BC of the FS is arranged immediately before the frame data subsequent to the FS of the frame, and the first EC of the FS of the next frame or the EC arranged after the last frame frame982 is arranged immediately after the frame data.

Therefore, the frame data is sandwiched between the BC and the EC, and the RUB has a data structure in which the BC, the frame data, and the EC are arranged in the described order. In the data structure in which the BC, the frame data, and the EC are arranged in the described order, the encoding state starts from the state S5 and terminates in the state S3.

As described above, in frame data constituting a data structure starting from a fixed state (for example, the state S5) and terminating in a fixed state (for example, the state S3), a relation between whether the number of edges of the frame data before the PCWA 110 encoding, that is, the number of 1s in the NRZI expression is an odd number or an even number and whether the number of edges of the frame data after the PCWA 110 encoding is an odd number or an even number is constant.

In other words, in a case where the number of edges of the frame data before PCWA 110 encoding is an odd number, the number of edges of the frame data after PCWA 110 encoding is an even number. Further, in a case where the number of edges of the frame data before PCWA 110 encoding is an even number, the number of edges of the frame data after PCWA 110 encoding is an odd number.

Therefore, DC control can be performed by adding the DCC bit to the frame data (row data) before the PCWA 110 encoding.

The FS entity is a pattern in which a run larger than the maximum run k (=10 (11T in the NRZ expression)) of the PCWA 110 code is repeated, and in FIG. 11, for example, a pattern in which a pattern of a run of 12T which is 1T larger than the maximum run k (=11T) of the PCWA 110 code is repeated twice is employed as the FS entity.

Further, for example, a pattern in which a pattern of a run of 12T is repeated three times or more or a pattern in which a pattern of a run larger than 12T is repeated twice or more can be employed as the FS entity.

The FS has a data structure in which the FS entity with the run of 12T is sandwiched between the EC with the run of 4T or 5T which is about half 12T and the BC with the run of 5T. According to such data structure, detection performance of the FS entity and eventually the FS can be improved by controlling turbulence of the waveform of the reproduction signal caused by influence of intersymbol interference (ISI) from the EC before the FS entity or data before the EC and the BC after the FS entity or data after the BC.

<Run_In>

Figure 12:
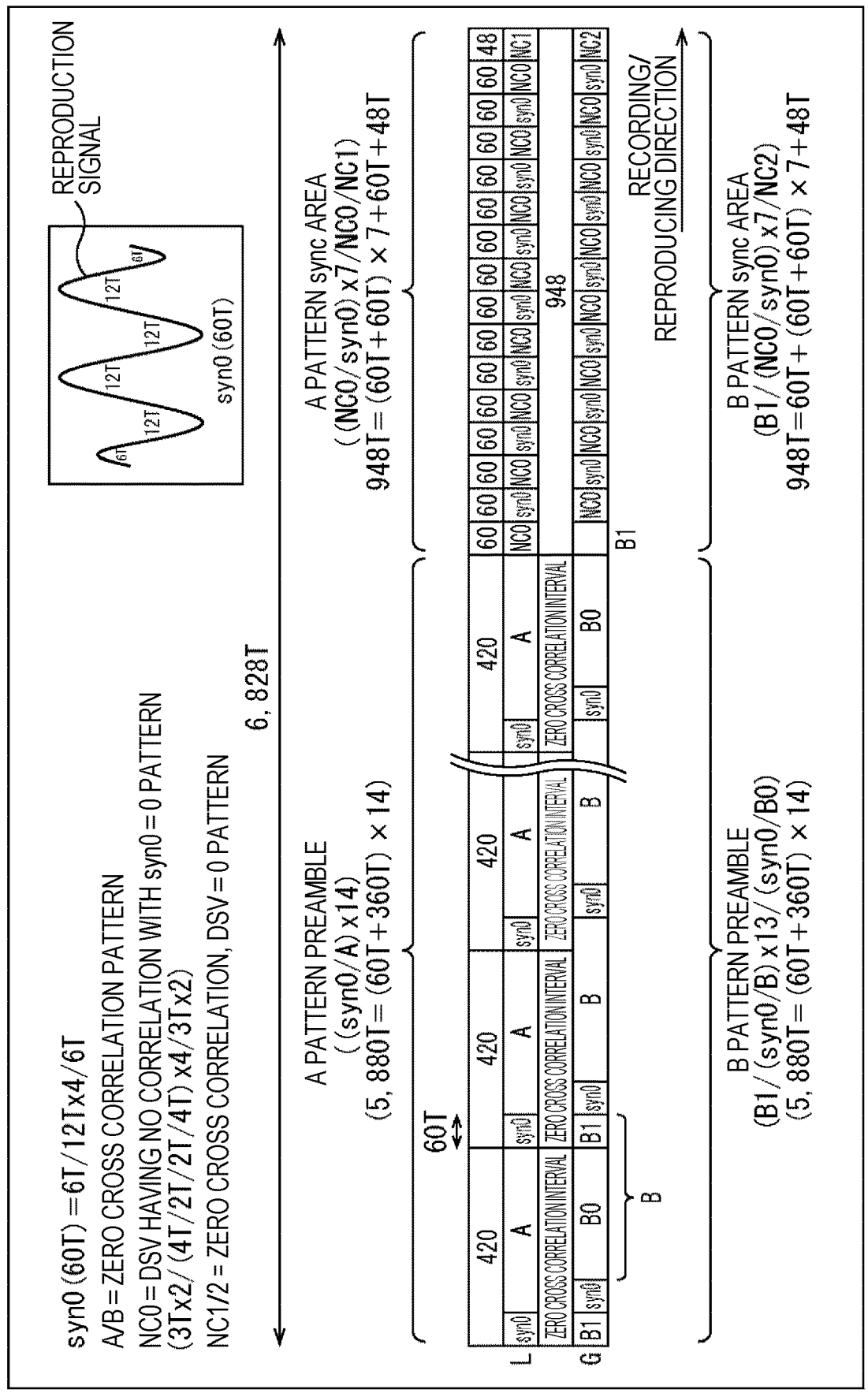
FIG. 12 is a diagram illustrating a configuration example of Run_in of 6,828T.

FIG. 12 is a diagram illustrating a configuration example of Run_in of 6,828T in FIG. 9.

Here, an archival disc (AD) 1 is proposed as an optical disc capable of recording data with high density.

In the AD 1, if Run_ins of the same pattern are recorded in an adjacent form in a land and a groove which are two adjacent tracks, the reproduction signal of Run_in is attenuated or enhanced due to the polarity of Run_ins of the same pattern recorded in the land and the groove which are adjacent. Therefore, in the AD 1, in order to prevent the reproduction signal of Run_in from being attenuated or enhanced, Run_ins of different patterns are recorded in the land and the groove which are adjacent.

However, in the AD 1, since Run_ins recorded in the land and the groove which are adjacent are not patterns in which a cross correlation is zero but small patterns with a size of 60 cbits, it is difficult to perform the XTC learning sufficiently through such Run_ins.

Further, in such an AD 1, in a case where data is recorded with higher density, and the data recorded with high density is reproduced, it is difficult to detect a synchronization pattern robustly.

Further, in the AD 1, the XTC learning, gain recovery, and timing recovery are performed using the reproduction signal of Run_in or the reproduction signal of the user data.

Even in the recording/reproducing apparatus of FIG. 1, similarly to the case of the AD 1, the XTC learning, the gain recovery (a gain adjustment in the AGC 42 (FIG. 4)), and the timing recovery (an adjustment of the channel clock in the PLL 32 (FIG. 4) can be performed using the reproduction signal of Run_in and the reproduction signal of the frame.

In a case where the XTC learning, the gain recovery, the timing recovery, or the like is performed using the reproduction signal of Run_in and the reproduction signal of the frame, it is preferable that the reproduction signal of Run_in be a signal having a characteristic similar to that of the reproduction signal of the frame. It is because, in a case where the characteristic of the reproduction signal of Run_in is significantly different from the characteristic of the reproduction signal of the frame, processes having significantly different tendencies are performed in the XTC learning or the like using the reproduction signal of Run_in and the XTC learning or the like performed using the reproduction signal of the frame, for example, significantly different tap coefficients are obtained in the XTC learning or the like using the reproduction signal of Run_in and the XTC learning or the like performed using the reproduction signal of the frame as the tap coefficient of the FIR filter performing the XTC, and it is difficult to appropriately perform the XTC immediately after the reproduction of the frame data is started using the tap coefficient obtained by the XTC learning performed using the reproduction signal of Run_in.

Here, since the frame, particularly, the frame data includes relatively random user data, the cross correlation between frame data of the two adjacent tracks tends to be zero or a small value close to zero.

Therefore, it is desirable to employ patterns in which the cross correlation is zero or patterns in which the cross correlation is close to zero as Run_in of the two adjacent tracks, similarly to the frame data of the two adjacent tracks.

Therefore, Run_in of the optical disc 16 is configured such that the synchronization patterns are recorded in two adjacent tracks with a predetermined amount of shift in the track direction.

In other words, FIG. 12 illustrates an example of Run_ins recorded in the two adjacent tracks of the optical disc 16.

FIG. 12 illustrates Run_in recorded in a land L (hereinafter also referred to as land Run_in) and Run_in recorded in a groove G (hereinafter also referred to as groove Run_in) in one of the inner circumference side and the outer circumference side of the land L.

In the optical disc 16, the land L and the groove G in at least one of the inner circumference side or the outer circumference side of the land L are paired. Run_ins (eventually the RUBs) are recorded in a pair of land L and groove G side by side at the same position in the track direction. FIG. 12 illustrates Run_in of a pair of land L and of groove G.

As described above with reference to FIG. 9, Run_in is a pattern of 6,828T, and is configured such that a preamble of 5,880T and a sync area of 948T are arranged from the head.

Here, in FIG. 12, the preamble and the sync area of land Run_in are also referred to as an A pattern preamble and an A pattern sync area, respectively. In addition, the preamble and the sync area of groove Run_in are also referred to as a B pattern preamble and a B pattern sync area, respectively. Further, the configurations of land Run_in and groove Run_in may be reversed. In other words, land Run_in can include the B pattern preamble and the B pattern sync area, and groove Run_in can include the A pattern preamble and the A pattern sync area.

Run_in has the synchronization pattern syn0. The synchronization pattern syn0 has a pattern of 60T of 6T/12T×4/6T.

Here, hereinafter, the pattern is appropriately indicated by a notation such as "6T/12T×4/6T" or the like. "6T/12T×4/6T" indicates a pattern in which a run of 6T is arranged, then 4 runs of 12T are arranged, and then a run of 6T is arranged.

In Run_in, the preamble is configured by alternately arranging the synchronization pattern syn0 of (the size of) 60T and the A pattern or the B pattern serving as a predetermined pattern of 360T.

In other words, the A pattern preamble of land Run_in is constructed by alternately arranging the synchronization pattern syn0 and the A pattern. The B pattern preamble of groove Run_in is constructed by alternately arranging the synchronization pattern syn0 and the B pattern.

Further, in the A pattern preamble and the B pattern preamble, the synchronization pattern syn0 is arranged with a shift of 60T which is the length (size) of the synchronization pattern syn0.

In other words, for example, the A pattern preamble is configured such that 14 sets each including the synchronization pattern syn0 of 60T and the A pattern of 360T are arranged from the head. Therefore, the A pattern preamble is a pattern of 5,880T (=(60T+360T)×14).

In the B pattern preamble, for example, only 13 sets each including the synchronization pattern syn0 of 60T and the B pattern of 360T are arranged from a position shifted from the head by 60T which is the length of the synchronization pattern syn0 are arranged.

Further, if a pattern of 60T which is the same length as the synchronization pattern syn0 at the end of the B pattern is referred to as a B1 pattern, and patterns of portions excluding the B1 pattern on the head side of the B pattern is referred to as a B0 pattern, the B1 pattern is arranged at the head of the B pattern preamble.

Then, in the B pattern preamble, the synchronization pattern syn0 and a B0 pattern are arranged after the 13 sets each including the synchronization pattern syn0 and the B pattern.

In other words, the B pattern preamble has a data structure in which the arrangement of the 14 sets each including the synchronization pattern syn0 and the B pattern is rotated in the right direction by 60T which is the length of the synchronization pattern syn0.

Therefore, the B pattern preamble is a pattern of 5,880T (=(60T+360T)×14), similarly to the A pattern preamble.

As described above, in the B pattern preamble, the synchronization pattern syn0 is arranged at a position shifted from the position of the synchronization pattern syn0 of the A pattern preamble by 60T which is the length of the synchronization pattern syn0.

Therefore, similarly to the synchronization pattern syn0, the B pattern arranged in the B pattern preamble is also arranged at a position shifted from the position of the A pattern arranged in the A pattern preamble by 60T which is the length of the synchronization pattern syn0.

The A pattern and the B pattern are, for example, the PCWA 110 codes serving as the channel code of 360 cbits (360T) in which the DC control is performed with a period of 90 cbits, for example.

Further, the A pattern and the B pattern are patterns in which the number of edges (the number of 1s in the NRZI expression) is an odd number, and a terminal digital sum value (DSV) is zero.

Here, the terminal DSV of the pattern is a sum of all bits constituting the pattern which are obtained by converting 1 among bits constituting the pattern of the NRZ expression into +1 and converting 0 into −1.

The B pattern is a pattern in which a cross correlation between the synchronization pattern syn0 and the A pattern and a corresponding interval of the B pattern preamble is zero in the interval of 420T of the synchronization pattern syn0 and the A pattern. In this case, the cross correlation between the A pattern preamble and the B pattern preamble is zero in the interval of 420T at an arbitrary position.

As described above, in a case where the cross correlation between the A pattern preamble and the B pattern preamble is zero in the interval of 420T of the synchronization pattern syn0 and the A pattern, the tendency of the DC component occurring in the reproduction signal of the preamble, an offset, a gain, or the like is similar to the tendency of the DC component or the like occurring in the reproduction signal of the frame data in which the cross correlation in the adjacent tracks tends to be zero or a small value close to zero.

In other words, the reproduction signal of the preamble is a signal having a similar characteristic to that of the reproduction signal of the frame data.

In Run_in, the sync area is configured by alternately arranging the synchronization pattern syn0 of 60T and a zero correlation pattern NC0 of 60T in which the cross correlation with the synchronization pattern syn0 is zero.

In other words, the A pattern sync area of land Run_in is configured by alternately arranging the synchronization pattern syn0 and the zero correlation pattern NC0. The B pattern sync area of groove Run_in is configured by alternately arranging the synchronization pattern syn0 and the zero correlation pattern NC0.

Further, in the A pattern sync area and the B pattern sync area, the synchronization pattern syn0 is arranged with a shift of 60T which is the length of the synchronization pattern syn0.

In other words, in the A pattern sync area, for example, only seven sets each including the zero correlation pattern NC0 of 60T and the synchronization pattern syn0 of 60T are arranged from the head. Further, the zero correlation pattern NC0 of 60T and a first pattern NC1 of 48T are arranged at the end of the A pattern sync area. Therefore, the A pattern sync area is a pattern of 948T (=(60T+60T)×7+60T+48T).

In the B pattern sync area, for example, only seven sets each including the zero correlation pattern NC0 of 60T and the synchronization pattern syn0 of 60T are arranged from the position shifted from the head by 60T which is the length of the synchronization pattern syn0 or the zero correlation pattern NC0.

Further, in the B pattern sync area, the B1 pattern of 60T is arranged at the head thereof, and a second pattern NC2 of 48T is arranged at the end thereof.

Therefore, the B pattern sync area is a pattern of 948T (=60T+(60T+60T)×7+48T), similarly to the A pattern sync area.

The first pattern NC1 and the second pattern NC2 are the PCWA 110 codes of 48 cbits (48T) in which the cross correlation is zero and are patterns in which the terminal DSV is zero.

Further, the EC is arranged at the ends of the first pattern NC1 and the second pattern NC2. Therefore, Run_in terminates with the EC.

Note that, as described above, the B1 pattern is arranged at the head of the B pattern sync area. Since the synchronization pattern syn0 and the B0 pattern are arranged at the end of the B pattern preamble before the B pattern sync area, if seen from the last synchronization pattern syn0 of the B pattern preamble, the B0 pattern and the B1 pattern, that is, the B patterns are arranged after the synchronization pattern syn0.

As described above, in the A pattern sync area and the B pattern sync area, the synchronization pattern syn0 is arranged at a position shifted by 60T which is the length of the synchronization pattern syn0, similarly to the A pattern preamble and the B pattern preamble.

As a result, the synchronization pattern syn0 of one sync area out of the A pattern sync area and the B pattern sync area is adjacent to the zero correlation pattern NC0 in which the cross correlation of the other sync area with the synchronization pattern syn0 is zero.

Therefore, the reproduction signal of the sync area becomes a signal having a similar characteristic to that of the reproduction signal of the frame data, similarly the reproduction signal of the preamble.

Accordingly, the reproduction signals of all Run_ins become a signal having a similar characteristic to that of the reproduction signal of the frame data.

As a result, a process with the same tendency is performed in the XTC learning or the like performed using the reproduction signal of Run_in and the XTC learning or the like performed using the reproduction signal of the frame data, and thus it is possible to prevent significantly different tap coefficients from being obtained. Accordingly, for example, it is possible to appropriately perform the XTC or the like immediately after the reproduction of the frame data is started using the tap coefficient obtained by the XTC learning performed using the reproduction signal of Run_in. The same applies to the cutting-off of the DC component in the HPF 41 (FIG. 4) (the offset of the reproduction signal) and the learning, adjustment, and the like of the gain of the reproduction signal in the AGC 42 (FIG. 4).

Further, the shift amount of the synchronization pattern syn0 of a pair of land L and groove G is not limited to the length of the synchronization pattern syn0 and may be shorter than the length of the synchronization pattern syn0 or larger than the length of the synchronization pattern syn0.

Further, the synchronization patterns syn0 of the land L and the groove G of the pair may be shifted to partially overlaps (be adjacent). Here, from the viewpoint of reducing the cross correlation between the A pattern preamble and the B pattern preamble, similarly to the cross correlation between the frame data recorded in a pair of land L and groove G, it is preferable for the synchronization patterns syn0 of a pair of land L and groove G to be shifted not to overlap.

Here, an n-th track from the inner circumference side of the optical disc 16 is referred to as a track TK(n). As a case where the synchronization pattern is shifted in the track direction with a certain amount of shift in (a pair of) two adjacent tracks, there area case where the synchronization pattern is shifted by a certain amount of shift in an arbitrary -track TK(n) of the optical disc 16, a track TK(n−1) on the inner circumference side adjacent to the track TK(n), and a track TK(n+1) on the outer circumference side and a case where the synchronization pattern is shifted by a certain amount of shift in an odd-numbered track TK(2n'−1) of the optical disc 16 and an even-numbered track TK(2n') on the outer circumference side of the track TK(2n'−1). In a case where the synchronization pattern is shifted by a certain amount of shift in the odd-numbered track TK(2n'−1) and the even-numbered track TK(2n'), it does not matter whether or not the synchronization pattern is shifted by a certain amount of shift in the even-numbered track TK(2n') and an odd-numbered track TK(2n'+1) on the outer circumference side of the track TK(2n').

<Synchronization Pattern Syn0 and Zero Correlation Pattern NC0>

Figure 13:
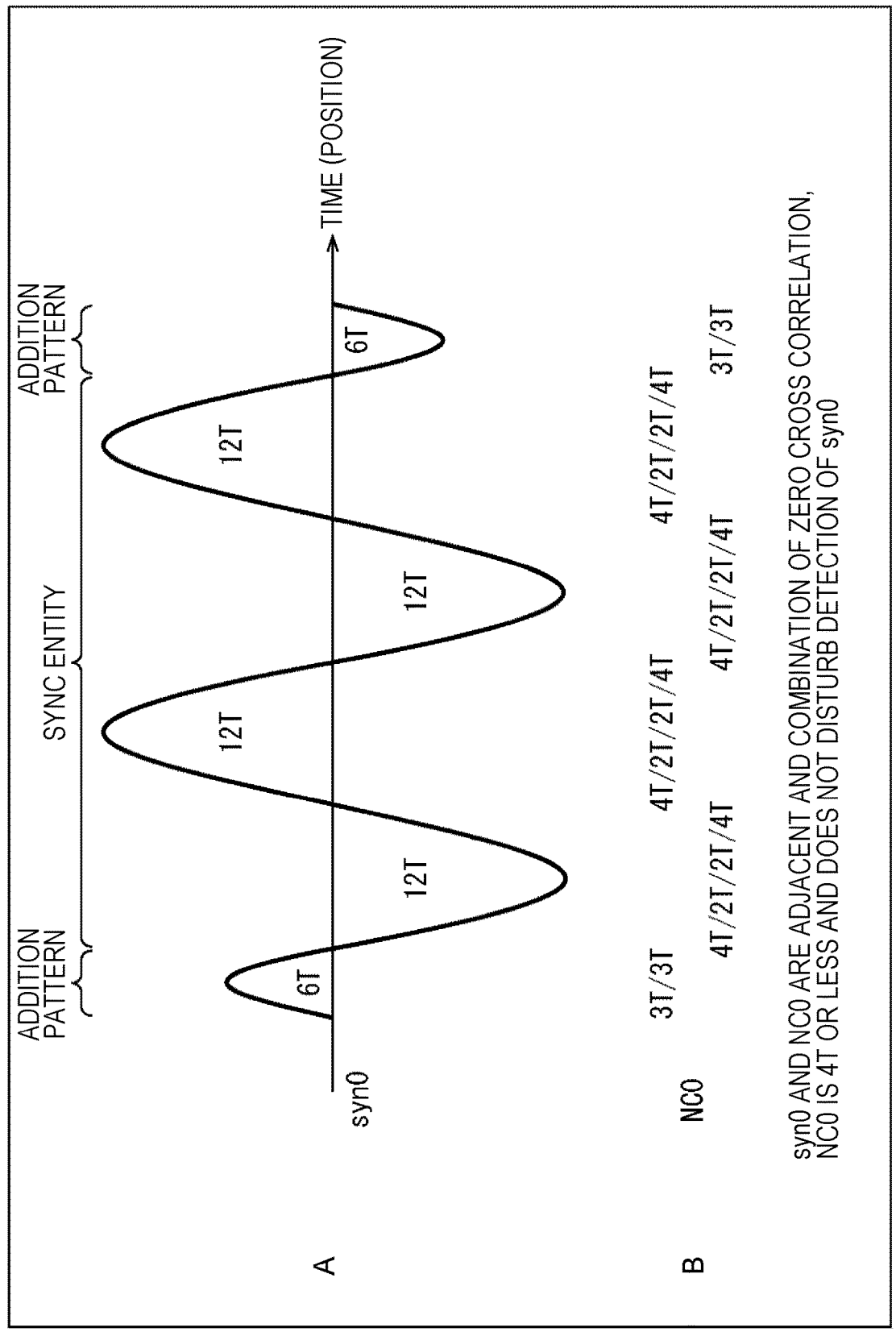
FIG. 13 is a diagram for describing an example of a synchronization pattern syn0 and a zero correlation pattern NC0.

FIG. 13 is a diagram for describing an example of the synchronization pattern syn0 and the zero correlation pattern NC0.

A of FIG. 13 illustrates an example (of the reproduction signal) of the synchronization pattern syn0.

As described above with reference to FIG. 12, the synchronization pattern syn0 has the pattern of 60T of 6T/12T×4/6T.

In other words, the synchronization pattern syn0 is a pattern of 60T in which the sync entity of the pattern of 12T×4 is sandwiched between additional patterns of 6T arranged before and after the sync entity of the pattern of 12T×4.

As described above with reference to FIG. 12, the synchronization pattern syn0 is recorded in (a pair of) two adjacent tracks with a shift of the length of the synchronization pattern syn0, but the additional patterns of 6T are arranged before and after the sync entity of the synchronization pattern syn0, a certain distance is secured between the sync entities of the synchronization pattern syn0 recorded in the two adjacent tracks with a shift by the additional patterns.

As a result, it is possible to suppress a RF fluctuation of the reproduction signal caused because one sync entity of the sync entities of the synchronization pattern syn0 recorded in the two adjacent tracks with a shift interferes with the other sync entities.

B in FIG. 13 illustrates an example of the zero correlation pattern NC0.

The zero correlation pattern NC0 is, for example, a pattern of 60T of 3T×2/(4T/2T/2T/4T)×4/3T×2, and is a pattern in which the cross correlation with the synchronization pattern syn0 is zero.

Further, the zero correlation pattern NC0 is a pattern in which the number of edges (number of 1 in the NRZI expression) is an even number, and the terminal DSV is zero.

<A Pattern and B Pattern>

Figure 14:
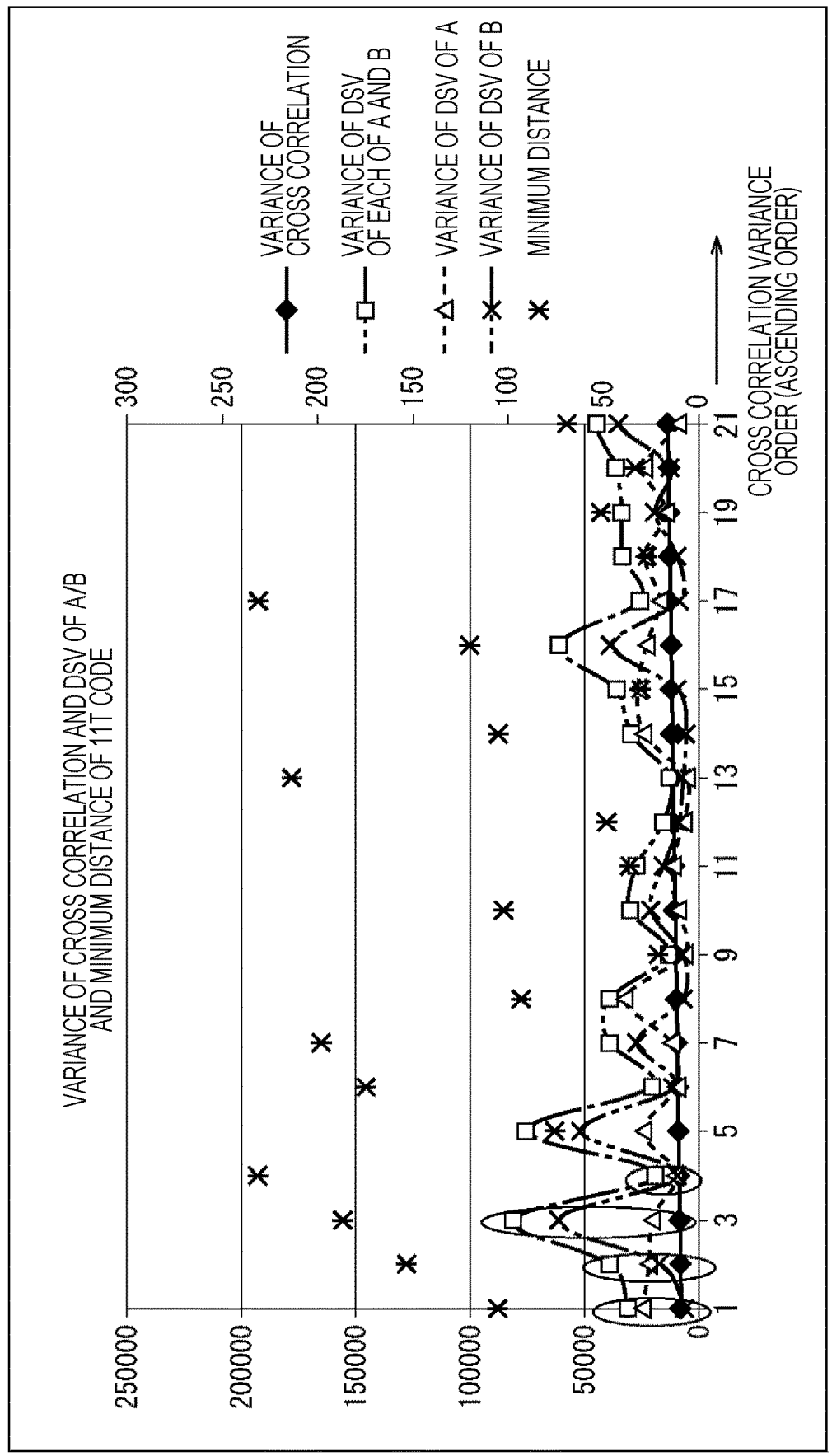
FIG. 14 is a diagram for describing an A pattern and a B pattern arranged in Run_in.

FIG. 14 is a diagram for describing the A pattern and the B pattern arranged in Run_in of FIG. 12.

Here, the RUB constructed by the RUB constructing unit 14 of FIG. 1 can be indicated by the NRZI expression in which an inversion of data (bit) is indicated by i, and a non-inversion is indicated by 0. In the recording/reproducing system 15, the RUB is recorded in the optical disc 16 as data of ±1 of the NRZ expression which has an initial value starting with +1 or −1 and is inverted in a case where data of the RUB of the NRZI expression is 1.

The DSV is an integrated value of data of ±1 of the NRZ expression and can be obtained, for example, in accordance with Formula (1)

$$DSV(K)=\Sigma NRZ(k) \quad (1)$$

In Formula (1), DSV(K) indicates a DSV from a 1-st bit to a K-th bit of the pattern in which the DSV is obtained. Σ indicates a summation obtained by replacing k with an integer ranging from 1 to K. NRZ(k) indicates a value (+1 or −1) of the k-th bit of the pattern in which the DSV is obtained.

Further, the cross correlation of the two patterns P1 and P2 can be obtained, for example, in accordance with Formula (2)

$$XC(K)=\Sigma P1(k)P2(k) \quad (2)$$

In Formula (2), XC(K) indicates the cross correlation from the 1-st bit to the k-th bit of the patterns P1 and P2. Σ indicates a summation obtained by replacing k with an integer ranging from 1 to K. P1(k) and P2(k) indicate values of the k-th bit (+1 or −1) of the patterns P1 and P2, respectively.

For example, as the A pattern and the B pattern to be arranged in Run_in, appropriate patterns can be obtained as follows.

First, data of 230 dbits is obtained using a uniform random number, and the DCC bit is added to the data of 230 dbits with the period of 59 dbits (FIG. 8) which is the same period (DCC period) as the period with which the DCC bit is added to the frame. The addition of the DCC bit is performed so that an absolute value of the DSV is minimum (preferably, 0).

Note that in a case where the DCC bit is added to the data of 230 dbits at the period of 59 dbits, the DCC bits of 4 bits in total are added, and the data of 230 dbits is the data of 234 dbits.

The PCWA 110 encoding into the PCWA 110 code which is the channel code is performed on the data of 234 dbits to which the DCC bit is added. For example, the PCWA 110 encoding starts from the state S5, similarly to the BC (FIG. 11) arranged immediately before the frame data.

According to the PCWA 110 encoding of the data of 234 dbits, the PCWA 110 code of the 351 cbits is obtained.

The PCWA 110 code of 9 cbits serving as the termination code is finally added to the PCWA 110 code of 351 cbits, so that the encoding state terminates in the state S5.

As the state transition of the encoding state by which the termination code of 9 cbits causing the encoding state to terminate in the state S5 is obtained by adding it to the PCWA 110 code of 351 cbits, for example, the following five transitions are obtained from the code table of FIG. 10.

S1→11/000→S2→01/001→S2→11/000→S5
S2→01/001→S2→01/001→S2→11/000→S5
S3→11/010→S2→01/001→S2→11/000→S5
S4→00/100→S3→11/010→S2→11/000→S5
S5→11/101→S2→01/001→S2→11/000→S5 . . . (ST)

Here, for example, the first transition S1→11/000→S2→01/001→S2→11/000→S5 among the state transitions (ST) indicates that, in a case where the encoding state is the state S1, the information bit 11 is encoded into the PCWA 110 code 000, transition to the state S2 is performed, the information bits 01 is encoded into the PCWA 110 code 001 in the state S2, transition to the state S2 is performed, the information bits 11 is encoded into the PCWA 110 code 000 in the state S2, and transition to the state S5 is performed.

In this case, the termination code causing the encoding state to terminate in the state S5 is 000 001 000.

According to the above-described five state transitions (ST), the termination code of 9 cbits causing the encoding state to terminate in the state S5 is 000 001 000 in a case where the encoding state is the state S1, the termination code of 9 cbits causing the encoding state to terminate in the state S5 is 001 001 000 in a case where the encoding state is the state S2, the termination code of 9 cbits causing the encoding state to terminate in the state S5 is 010 001 000 in a case where the encoding state is the state S3, the termination code of 9 cbits causing the encoding state to terminate in the state S5 is 100 010 000 in a case where the encoding state is the state S4, and the termination code of 9 cbits causing the encoding state to terminate in the state S5 is 101 001 000 in a case where the encoding state is the state S5.

In a case where the last encoding state of the PCWA 110 code of 351 cbits is, for example, the state S1, the termination code 000 001 000 in a case where the encoding state is the state S1 is added to the PCWA 110 code of 351 cbits, and the PCWA 110 code of 360 cbits obtained by the addition is caused to terminate in the state S5.

Among the PCWA 110 codes of 360 cbits obtained as described above, for example, an integer number of PCWA 110 codes, or the like, as a predetermined number, 100 PCWA 110 codes in each which the DSV(360) of Formula (1) serving as the terminal DSV is 0, the number of edges (the number of is in the NRZI expression) is an odd number, and one or more of runs of 11T which is the maximum run k of the PCWA 110 code are included are generated as candidates of the A pattern and the B pattern (hereinafter also referred to as A/B candidate codes).

A combination of two A/B candidate codes is selected from the 100 A/B candidate codes, and the synchronization pattern syn0 and the A pattern and the synchronization pattern syn0 and the B pattern are constructed using one A/B candidate code out of the two A/B candidate codes as the A pattern and using the other A/B candidate code as the B pattern.

Further, the pattern in which the synchronization pattern syn0 and the A pattern are repeatedly arranged and the pattern in which the synchronization pattern syn0 and the B pattern are repeatedly arranged are arranged with a shift of the length of the synchronization pattern syn0, similarly to Run_in of FIG. 12, and a combination of two A/B candidate codes in which XC(420) of Formula (2) which is the cross correlation between the synchronization pattern syn0 and the A pattern and the synchronization pattern syn0 and the B pattern is zero in the interval of the synchronization pattern syn0 and the A pattern is obtained.

According to a simulation conducted by the inventors of the present application, 256 sets of combinations of the A/B candidate codes were obtained as the combination of the two A/B candidate codes described above.

Here, in the 256 sets of combinations of the A/B candidate codes described above, in the calculation of XC(420) of Formula (2), the A/B candidate code used as the A pattern in is also referred to as an A candidate code, and the A/B candidate code used as the B pattern is also referred to as a B candidate code.

FIG. 14 illustrates information related to (some of) the 256 sets of combinations of the A candidate code and the B candidate code.

In FIG. 14, information is illustrated in the ascending order of variance rankings of the cross correlations XC(1), XC(2), . . . , and XC(420) (the cross correlation variance rankings) at respective times (positions) k=1, 2, . . . , and 420 in the interval of the synchronization pattern syn0 and the A pattern in the 256 sets of combinations of the A candidate code and the B candidate code.

In other words, in FIG. 14, a variance of the cross correlations XC(1) to XC(420) are illustrated as "variance of cross correlation" in the ascending order of the variances of the cross correlations XC(1) to XC(420) for (some of) the 256 sets of combinations of the A candidate code and the B candidate code.

Further, in FIG. 14, a variance of DSV(1), DSV(2), . . . , and DSV(360) at respective times k=1, 2, . . . , and 360 of the A candidate code and a variance of DSV(1), DSV(2), . . . , and DSV(360) at respective times k=1, 2, . . . , and 360 of the B candidate code are illustrated as "variance of DSV of A" and "variance of DSV of B", respectively, in the ascending order of the variances of the cross correlations XC(1) to XC(420) for the 256 sets of combinations of the A candidate code and the B candidate code.

Further, in FIG. 14, a variance of DSVs in which DSV(1) to DSV(360) of the A candidate code and DSV(1), DSV(2), . . . , and DSV(360) of the B candidate code are combined is illustrated as "variance of DSV of each of A and B" in the ascending order of the variances of the cross correlations XC(1) to XC(420) for the 256 sets of combinations of the A candidate code and the B candidate code.

Further, in FIG. 14, a minimum value among distances between a pattern of a run of 11T included in the A candidate code and a pattern of a run of 11T included in the B candidate code (a shift amount of the pattern of 11T in the track direction is illustrated as "minimum distance" for the 256 sets of combinations of the A candidate code and the B candidate code.

Figure 15:
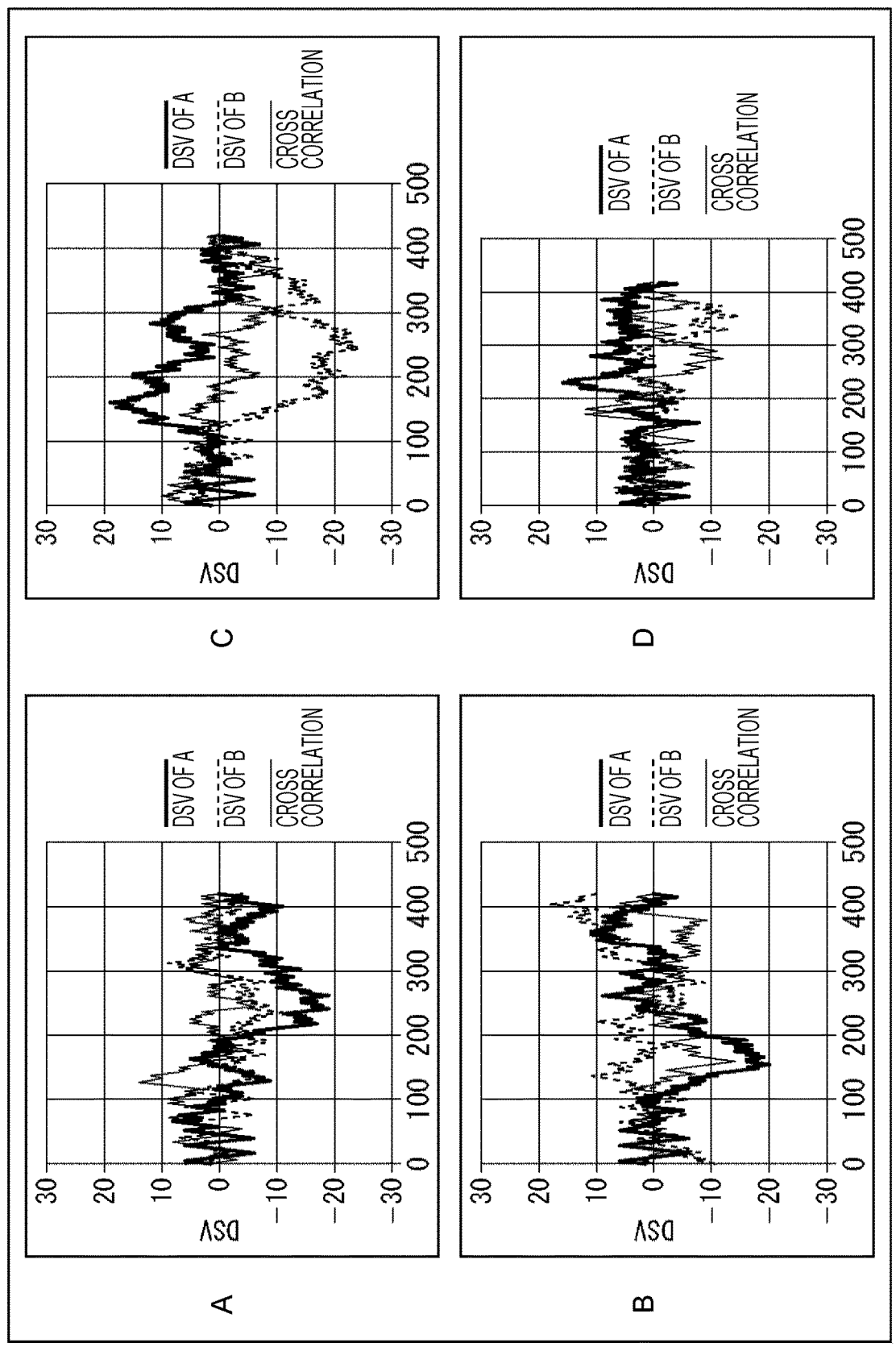
FIG. 15 is a diagram illustrating information related to a combination of an A candidate code and a B candidate code in which rankings of variances of cross correlations XC(1) to XC(420) in an ascending order come in first to fourth in an ascending order.

FIG. 15 is a diagram illustrating information related to the combinations of the A candidate code and the B candidate code in which the rankings of the variances of the cross correlations XC(1) to XC(420) in the ascending order come in first to fourth among the 256 sets of combinations of the A candidate code and the B candidate code described above with reference to FIG. 14.

In other words, A, B, C, and D of FIG. 15 indicate information related to combinations of the A candidate code and the B candidate code in the first place, the second place, the third place, and the fourth place, respectively.

In FIG. 15, the A candidate code and the B candidate code are arranged as the A pattern and the B pattern together with the synchronization pattern syn0 similarly to a case where arranged in Run_in, DSV(1), DSV(2), . . . , and DSV(420) of the synchronization pattern syn0 and the A candidate code at respective times k=1, 2, . . . , and 420 in a case where the head of Run_in is assumed to be the time k=1 are illustrated as "DSV of A", and DSV(1), DSV(2), . . . , and DSV(420) of the synchronization pattern syn0 and the B candidate code at respective times k=1, 2, . . . , and 420 are illustrated as "DSV of B".

Further, in FIG. 15, the A candidate code and the B candidate code are arranged as the A pattern and the B pattern together with the synchronization pattern syn0 similarly to a case where arranged in Run_in, and the cross correlations XC(1), XC(2), . . . , and XC(420) between the synchronization pattern syn0 and the A candidate code and the synchronization pattern syn0 and the B candidate code at respective times k=1, 2, . . . , and 420 in the interval of the synchronization pattern syn0 and the A candidate code in a case where the head of Run_in is assumed to be the time k=1 are illustrated as "cross correlation".

Here, in order to perform a process of a similar tendency as learning of the offset, the gain, and the XTC of the reproduction signal between a case where Run_in is being reproduced and a case where the frame data is being reproduced, it is preferable that the DC component of the reproduction signal of Run_in have a similar characteristic to that of the DC component of the reproduction signal of the frame data, that is, for example, be small on the average.

In this regard, as the A pattern and the B pattern, a combination of the A candidate code and the B candidate code in which DSV(1) to DSV(420) and the cross correlations XC(1) to XC(420) are small on the average can be employed among the combinations of the A candidate code and the B candidate code in which the variance of DSV(1) to DSV(420) is a threshold value TH1 or less, and the variance of the cross correlations XC(1) to XC(420) is a threshold value TH2 or less.

According to FIG. 15, among the combinations of the A candidate code and the B candidate code ranked first to fourth, the combination of the A candidate code and the B candidate code ranked fourth in D of FIG. 15 is a combination in which DSV(1) to DSV(420) of the synchronization pattern syn0 and the A candidate code, DSV(1) to DSV(420) of the synchronization pattern syn0 and the B candidate code, and the cross correlations XC(1) to XC(420) are small on the average.

In this regard, the combination of the A candidate code and the B candidate code at the fourth place in D of FIG. 15 can be employed as the A pattern and the B pattern.

Figure 16:
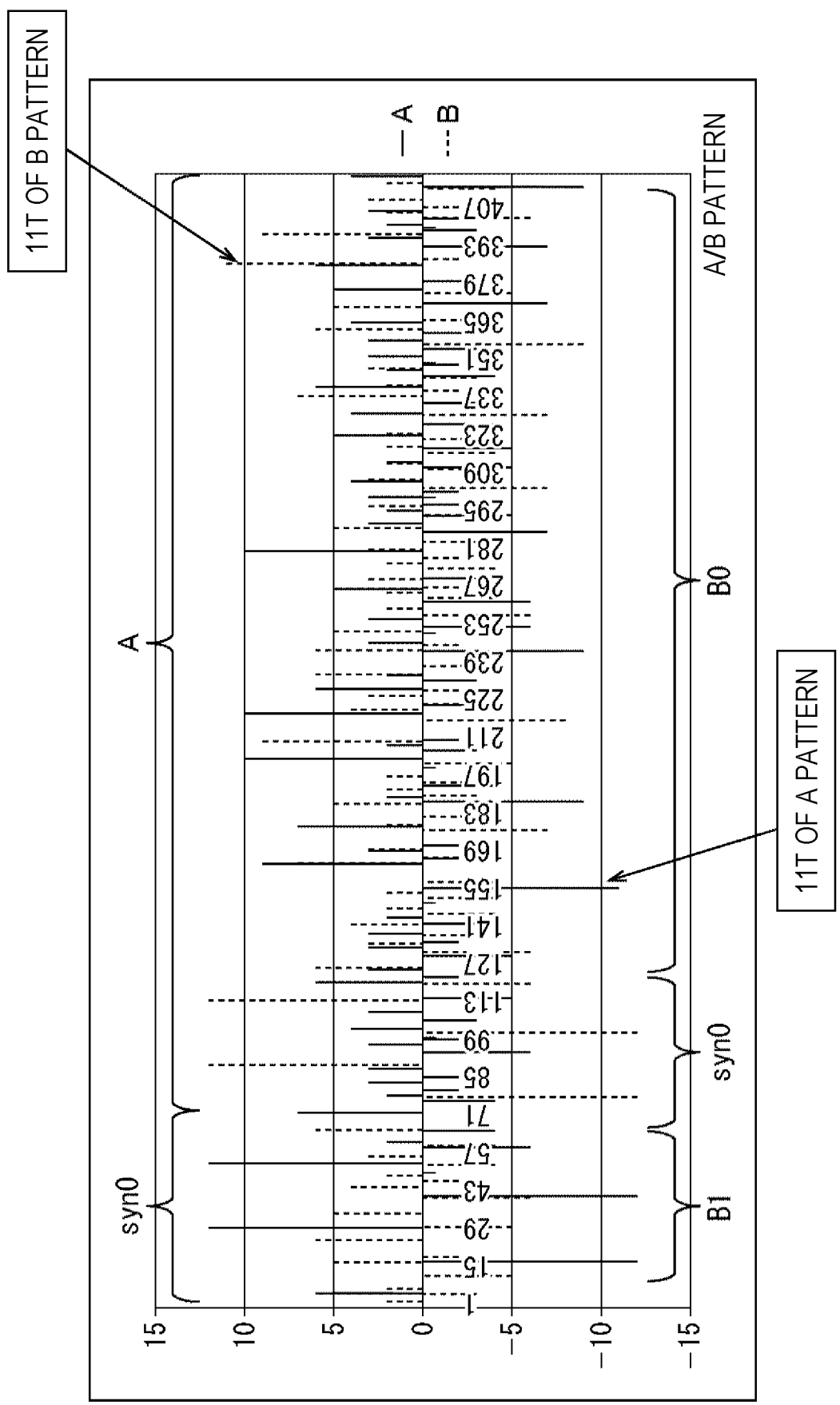
FIG. 16 is a diagram illustrating an example of an A pattern and a B pattern.

FIG. 16 is a diagram illustrating an example of the A pattern and the B pattern.

In other words, FIG. 16 illustrates the combination of the A candidate code and the B candidate code ranked fourth in D of FIG. 15.

In FIG. 16, the A pattern and the B pattern are arranged with the synchronization pattern syn0 similarly to a case where arranged in Run_in together.

In other words, for the A pattern, the synchronization pattern syn0 and the A pattern are arranged in the described order, and for the B pattern, it is divided into the B0 pattern and the B1 pattern, and the B1 pattern, the synchronization pattern syn0, and the B0 pattern are arranged in the described order.

In FIG. 16, a horizontal axis indicates a position (time) from the head of Run_in, and a vertical axis indicates a run length of data of ±1 of the NRZ expression that terminates at the position indicated by the horizontal axis.

According to FIG. 16, it can be confirmed that both the A pattern and the B pattern include one run of 11T, and the run of 11T included in the A pattern and the run of 11T included in the B pattern are relatively far away, for example.

Figure 17:
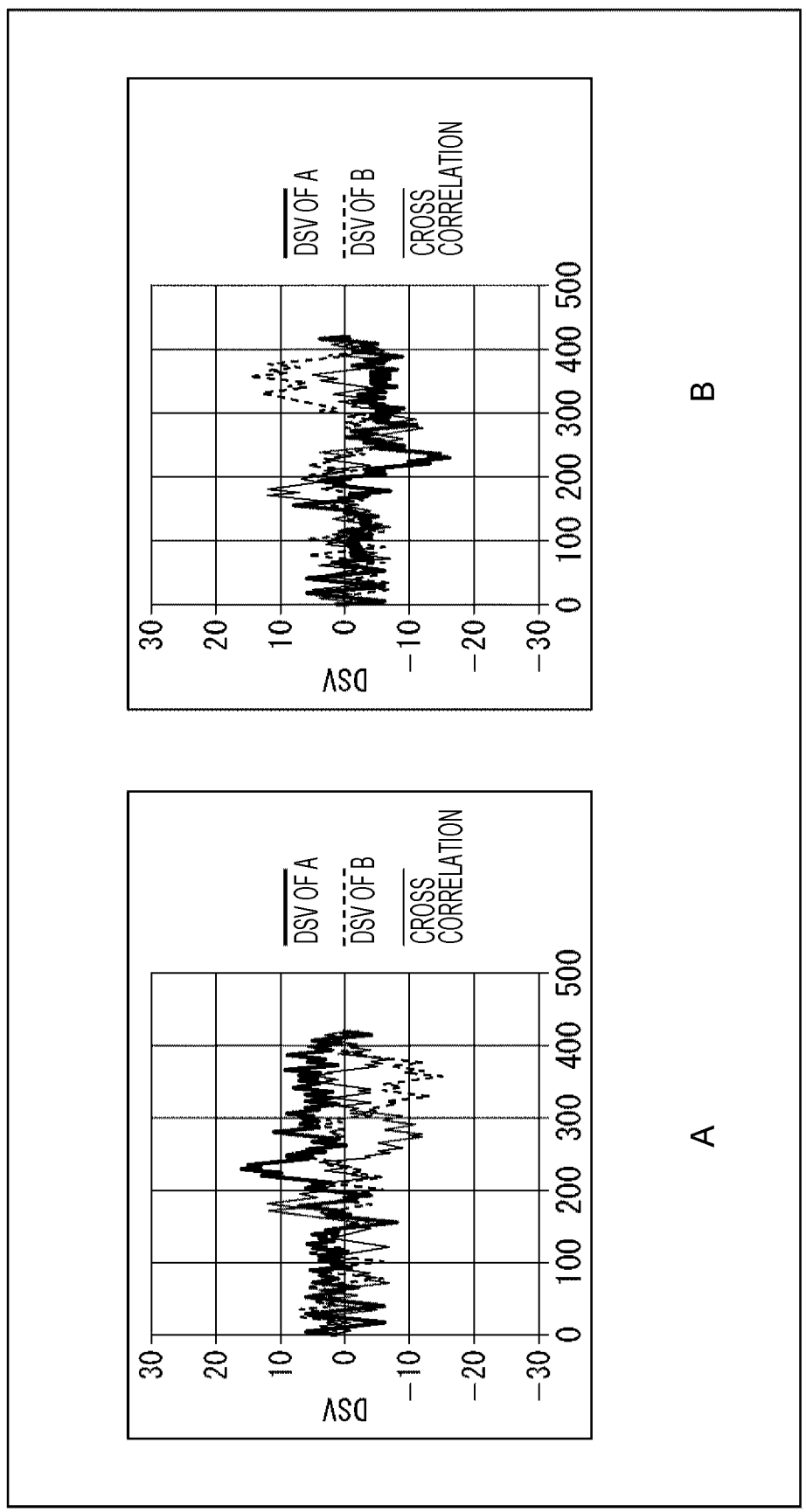
FIG. 17 is a diagram illustrating information related to an A pattern and a B pattern.

FIG. 17 is a diagram illustrating information related to the A pattern and the B pattern in FIG. 16.

In FIG. 17, the A pattern and the B pattern are arranged together with synchronization pattern syn0 similarly to a case where arranged in Run_in, and DSV(1) to DSV(420) of the synchronization pattern syn0 and the A pattern in a case where the head of Run_in is assumed to be the time k=1 are illustrated as "DSV of A", and DSV(1) to DSV(420) of the synchronization pattern syn0 and the B pattern are illustrated as "DSV of B".

Further, in FIG. 17, the A pattern and the B pattern are arranged together with synchronization pattern syn0 similarly to a case where arranged in Run_in, and the cross correlations XC(1) to XC(420) between the synchronization pattern syn0 and the A pattern and the synchronization pattern syn0 and the B pattern in the interval of the synchronization pattern syn0 and the A pattern in a case where the head of Run_in is assumed to be the time k=1 are illustrated as "cross correlation".

As described above with reference to FIG. 12, in the A pattern and the B pattern, the number of edges (the number of 1s in the NRZI expression) is an odd number.

The synchronization pattern syn0 and the A pattern are repeatedly arranged in the preamble of Run_in, but since the number of edges of the A pattern is an odd number, the polarity of DSV(1) to DSV(420) of the A pattern is reversed between an interval pd of 420T with the synchronization pattern syn0 and the A pattern and a next interval pd+1 of 420T with the synchronization pattern syn0 and the A pattern. The same applies to DSV(1) to DSV(420) of the B pattern.

A of FIG. 17 illustrates "DSV of A", "DSV of B", and "cross correlation" in the interval pd of 420T with the synchronization pattern syn0 and the A pattern, and B of FIG. 17 illustrates "DSV of A", "DSV of B", and "cross correlation" in the next interval pd+1 of 420T with the synchronization pattern syn0 and the A pattern.

According to FIG. 17, it can be confirmed that the polarities of "DSV of A" and "DSV of B" are reversed between the interval pd (A in FIG. 17) and the next interval pd+1 (B in FIG. 17).

In this case, it is possible to effectively perform offset learning (for canceling the offset of the reproduction signal).

<First Pattern NC1 and Second Pattern NC2>

Figure 18:
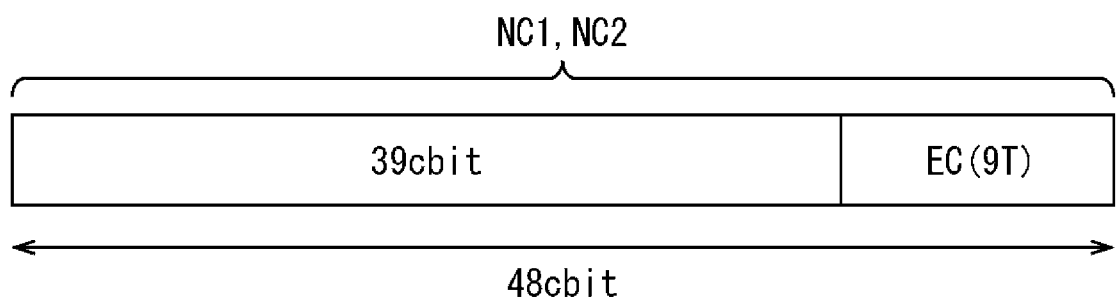
FIG. 18 is a diagram illustrating an example of a first pattern NC1 and a second pattern NC2 arranged at the end of Run_in.

FIG. 18 is a diagram illustrating an example of the first pattern NC1 and the second pattern NC2 arranged at the end of Run_in of FIG. 12.

The first pattern NC1 and the second pattern NC2 are the PCWA 110 codes of 48 cbits (48T) in which the cross correlation is zero and are pattern in which the terminal DSV is zero.

Further, ECs of 9T (9 cbits) are arranged at the ends of the first pattern NC1 and the second pattern NC2.

As illustrated in FIG. 12, since the first pattern NC1 and the second pattern NC2 are arranged at the end of Run_in, Run_in terminates at the EC arranged at the ends of the first pattern NC1 and the second pattern NC2.

The first pattern NC1 and the second pattern NC2 can be obtained, for example, as follows.

First of all, data of 26 dbits is obtained using a uniform random number, and the data of 26 dbits is encoded into the PCWA 110 code which is the channel code (the PCWA 110 encoding). The PCWA 110 encoding starts from the state S5, similarly to, for example, a case where the A pattern and the B pattern are obtained.

According to the PCWA 110 encoding of the data of 26 dbits, the PCWA 110 code of 39 cbits is obtained.

The EC of 9 cbits is added to the end of the PCWA 110 code of 39 cbits, so that the PCWA 110 code of 48 cbits is completed.

For the PCWA 110 code of 48 cbits to which the EC is added, a run of 4T or 5T is guaranteed by the EC.

Here, as described with reference to FIG. 9, an FS including no EC at the head of the frame frame1, that is, an FS in which only the FS entity and the BC are arranged in the described order (hereinafter also referred to as a shortened FS) is arranged after the first pattern NC1 and the second pattern NC2 arranged at the end of Run_in.

Depending on data arranged immediately before the shortened FS, the influence of the ISI on the FS entity of the shortened FS is large, but the EC is arranged at the end of Run_in before the shortened FS is arranged (at the end of the first pattern NC1 or the second pattern NC2), and the run of 4T or 5T is guaranteed as described above. In this case, the influence of the ISI on the FS entity of the shortened FS can be reduced.

Among the PCWA 110 codes of 48 cbits to which the EC is added which are obtained as described above, an integer number of PCWA 110 codes, for example, as a predetermined number, 100 PCWA 110 codes in which the DSV(48) of Formula (1) which is the terminal DSV is 0, and the run of 11T which is the maximum run k of the PCWA 110 code is not included are generated candidates of the first pattern NC1 and the second pattern NC2 (hereinafter also referred to as NC1/2 candidate codes).

Here, from the viewpoint of performing the learning of the offset, the gain, and the XTC of the reproduction signal using the reproduction signal of Run_in, it is preferable that each of runs of 2T, 3T, . . . , and 11T which can occur in the PCWA 110 code serving as the channel code appear in Run_in.

Here, since the first pattern NC1 and the second pattern NC2 are patterns arranged at the end of Run_in, when the first pattern NC1 or the second pattern NC2 is reproduced, the learning of the offset, the gain, and the XTC of the reproduction signal is sufficiently performed by the reproduction signals of the runs of 2T, 3T, . . . , and 11T appearing in Run_in until that time.

On the other hand, since the shortened FS is arranged immediately after Run_in, if there is a long run in the first pattern NC1 or the second pattern NC2 at the end of Run_in, the level of the reproduction signal increases, and the detection of the FS entity of the shortened FS may be greatly affected.

In this regard, the PCWA 110 code having no run of 11T which is the maximum run k of the PCWA 110 code (the PCWA 110 code having a run of less than 11T) can be employed as the NC1/2 candidate code as described above.

Note that, as the NC1/2 candidate code, for example, the PCWA 110 code including a run of 11T which is the maximum run k of the PCWA 110 code can be employed, and the PCWA 110 code including neither a run of 11T which is the maximum run k of the PCWA 110 code or a run of 10T which is next large (the PCWA 110 code including a run of less than 10T) or the like can be employed.

Further, for the NC1/2 candidate code, the number of edges (the number of is in the NRZI expression) may be either an odd number or an even number, but here, the PCWA 110 code in which the number of edges is an even number is assumed to be employed as the NC1/2 candidate code.

A combination of two NC1/2 candidate codes is selected from the 100 NC1/2 candidate codes, and a combination of two NC1/2 candidate codes in which a cross correlation XC(48) of the two NC1/2 candidate codes is zero is obtained.

According to a simulation conducted by the inventors of the present application, 309 sets of combinations of NC1/2 candidate codes were obtained as the combinations of the two NC1/2 candidate codes described above.

Here, in the 309 sets of combinations of NC1/2 candidate codes described above, one NC1/2 candidate code of the two NC1/2 candidate codes of each combination is also referred to as an NC1 candidate code, and the other NC1/2 candidate code is also referred to as an N2 candidate code.

Figure 19:
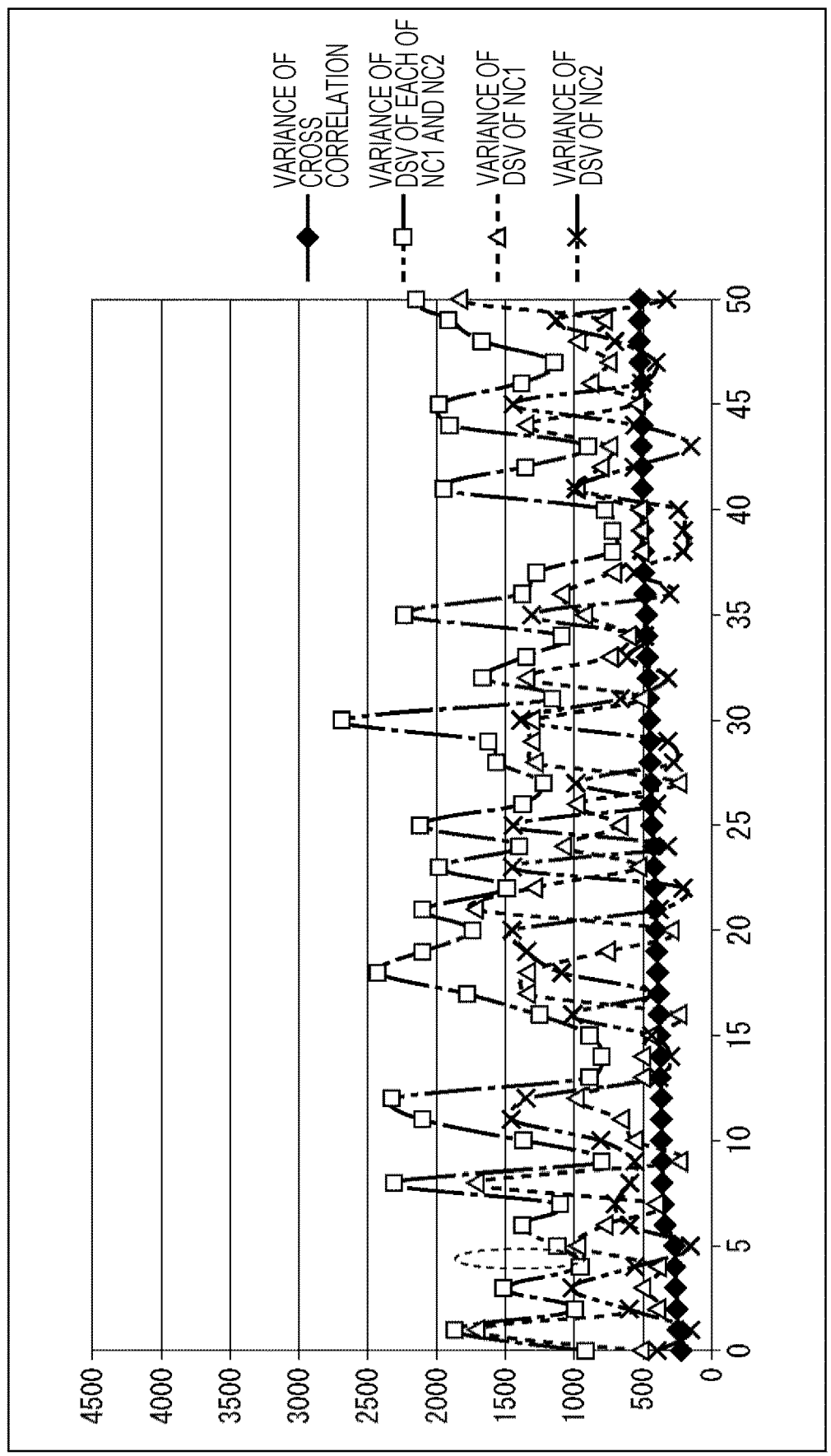
FIG. 19 is a diagram illustrating information related to (a part of) a combination of 309 sets of NC1 candidate code and NC2 candidate code.

FIG. 19 is a diagram illustrating information related to (some of) the 309 sets of combinations of the NC1 candidate code and the NC2 candidate code.

In FIG. 19, information is illustrated in the ascending order of rankings of the variances of the cross correlations XC(1), XC(2), . . . , and XC(48) between the NC1 candidate code and the NC2 candidate code for (the cross correlation variance rankings) for the 309 sets of combinations of the NC1 candidate code and the NC2 candidate code.

In other words, in FIG. 19, the variance of the cross correlations XC(1) to XC(48) is illustrated as "variance of cross correlation" in the ascending order of the variances of the cross correlations XC(1) to XC(48) for (some of) the 309 sets of combinations of the NC1 candidate code and the NC2 candidate code.

Further, in FIG. 19, the variance of DSV(1), DSV(2), . . . , and DSV(48) of the NC1 candidate code and the variance of DSV(1), DSV(2), . . . , and DSV(48) of the NC2 candidate code are illustrated as "variance of DSV of NC1" and "variance of DSV of NC2" in the ascending order of the variances of the cross correlations XC(1) to XC(48) for the 309 sets of combinations of the NC1 candidate code and the NC2 candidate code.

Further, in FIG. 19, a variance of the DSVs in which both DSV(1) to DSV(48) of the NC1 candidate code and DSV(1), DSV(2), . . . , and DSV(48) of the NC2 candidate code are combined is illustrated as "variance of DSV of each of NC1 and NC2" in the ascending order of the variances of the cross correlations XC(1) to XC(48) for the 309 sets of combinations of the NC1 candidate code and the NC2 candidate code.

The selection of the first pattern NC1 and the second pattern NC2 from among the combinations of the NC1 candidate code and the NC2 candidate code can be performed similarly to the selection of the A pattern and the B pattern described above in FIGS. 14 to 17, for example.

In other words, as the first pattern NC1 and the second pattern NC2, a combination of the NC1 candidate code and the NC2 candidate code in which DSV(1) to DSV(48) and the cross correlations XC(1) to XC(48) are small on the average among the combinations of the NC1 candidate code and the NC2 candidate code in which the variance of DSV(1) to DSV(48) is a threshold -value TH1' or less, and the variance of the cross correlations XC(1) to XC(48) is a threshold value TH2' can be employed.

In the combinations of the NC1 candidate code and the NC2 candidate code indicating the variance of the cross correlation and the like in FIG. 19, the combination of the NC1 candidate code and the NC2 candidate code in which the variance of the cross correlations XC(1) to XC(48) is smallest is the combination of the NC1 candidate code and the NC2 candidate code in which the variance of DSV(1) to DSV(48) is a threshold value TH1' or less, the variance of the cross correlations XC(1) to XC(48) is a threshold value TH2', and DSV(1) to DSV(48) and the cross correlations XC(1) to XC(48) are small on the average.

In this regard, as the first pattern NC1 and the second pattern NC2, the combination of the NC1 candidate code and the NC2 candidate code in which the variance of the cross correlations XC(1) to XC(48) is smallest among the combinations of the NC1 candidate code and the NC2 candidate code indicating the variance of the cross correlation and the like in FIG. 19 can be employed.

Figure 20:
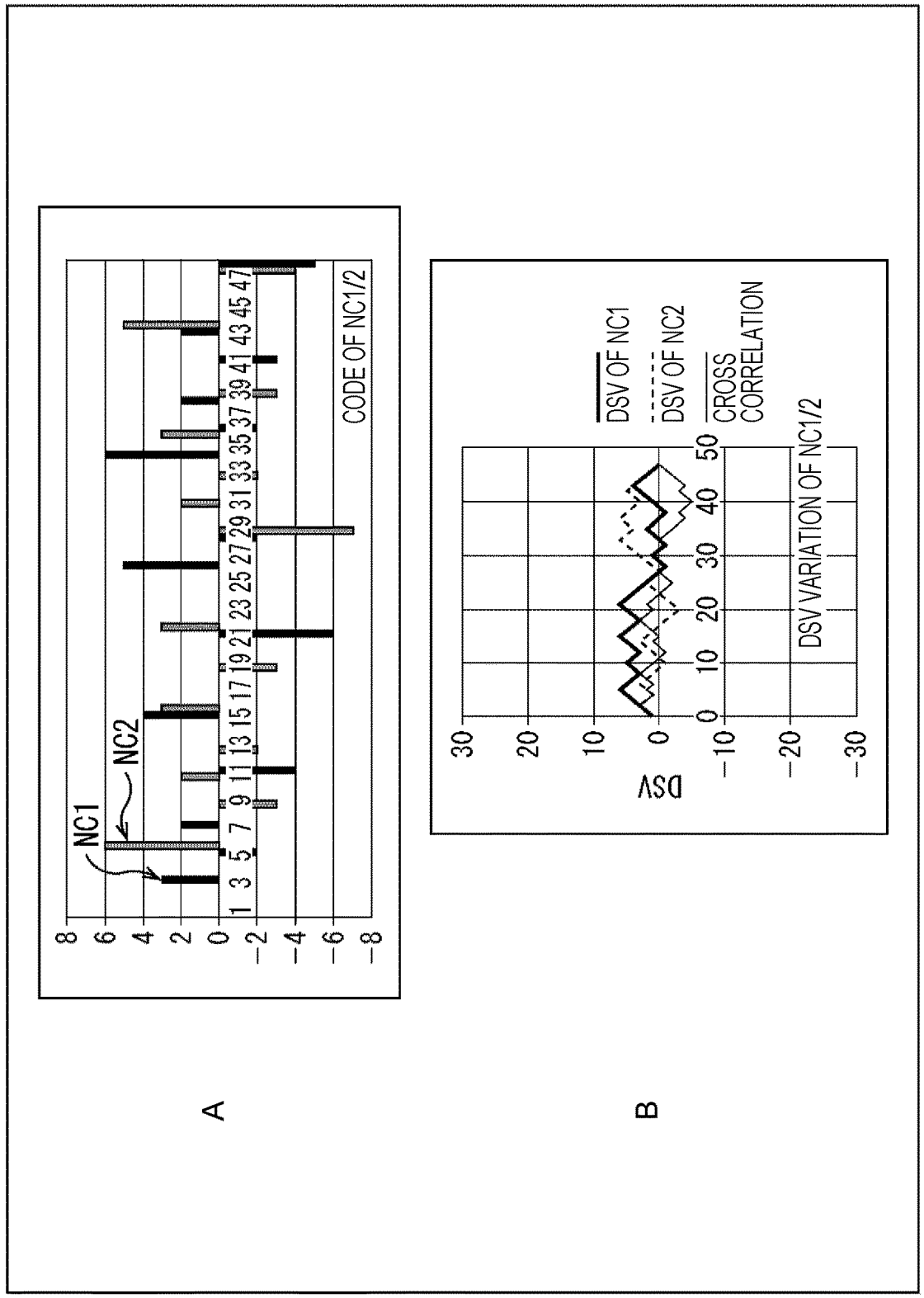
FIG. 20 is a diagram illustrating an example of a first pattern NC1 and a second pattern NC2.

FIG. 20 is a diagram illustrating an example of the first pattern NC1 and the second pattern NC2.

A of FIG. 20 illustrates the first pattern NC1 and the second pattern NC2 obtained as described with reference to FIG. 19.

In A of FIG. 20, a horizontal axis indicates a position (time) from the head of the first pattern NC1 and the second pattern NC2, and a vertical axis indicates a length of a run of data of ±1 of the NRZ expression terminating at the position indicated by the horizontal axis.

According to A of FIG. 20, it can be confirmed that the maximum run of the first pattern NC1 is 6T, the maximum run of the second pattern NC2 is 7T, and the like.

B of FIG. 20 is a diagram illustrating information related to the first pattern NC1 and the second pattern NC2 in A of FIG. 20.

In B of FIG. 20, DSV(1) to DSV(48) of the first pattern NC1 are illustrated as "DSV of NC1", and DSV(1) to DSV(48) of the second pattern NC2 are illustrated as "DSV of NC2".

Further, in B of FIG. 20, the cross correlations XC(1) to XC (48) of the first pattern NC1 and the second pattern NC2 are illustrated as "cross correlation".

According to B of FIG. 20, it can be confirmed that "DSV of NC1", "DSV of NC2", and "cross correlation" are small on average.

<Run_Out>

Figure 21:
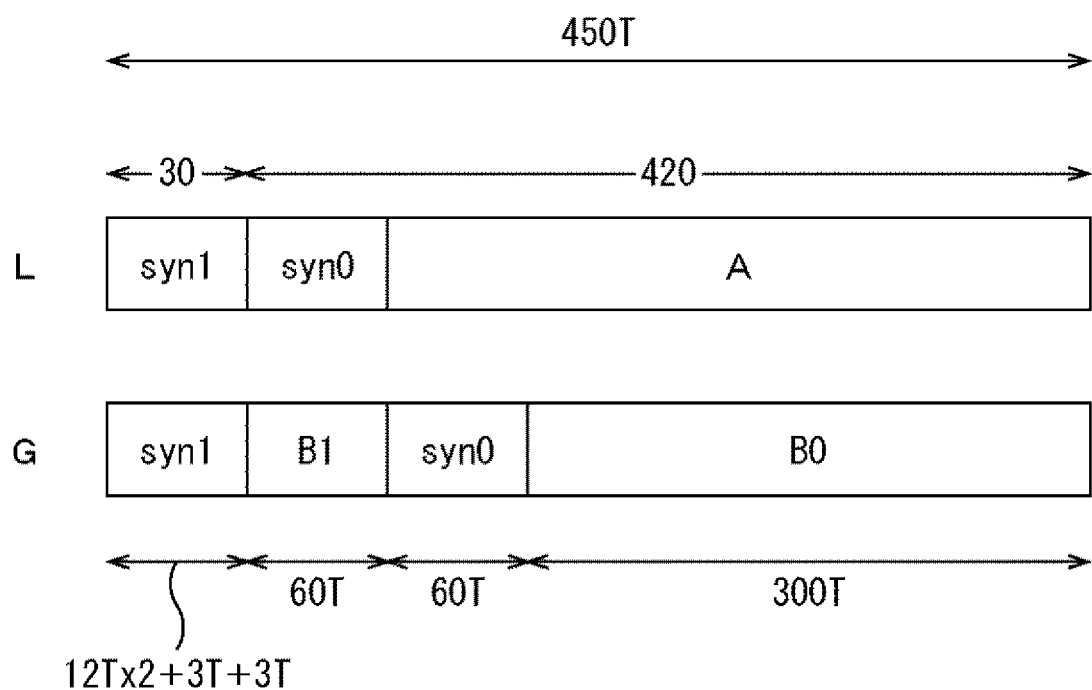
FIG. 21 is a diagram for describing an example of Run_out.

FIG. 21 is a diagram for describing an example of Run_out.

Run_out is a pattern of 450T configured such that a pattern syn1 of 30T, a synchronization pattern syn0 of 60T, and the A pattern or the B pattern of 360T are arranged.

In other words, Run_out of one of the two adjacent tracks, that is, the land L and the groove G, for example, Run_out of the land L is configured such that the pattern syn1, the synchronization pattern syn0, and the A pattern of 360T are arranged in the described order.

Further, Run_out of the groove G which is the other of the two adjacent tracks, that is, the land L and the groove G is configured such that the pattern syn1, the B1 pattern, the synchronization pattern syn0, and the B0 pattern are arranged in the described order.

Therefore, in Run_out of the land L and Run_out of the groove G, the synchronization pattern syn0 is arranged with a shift of 60T which is the length of the synchronization pattern syn0, similarly to Run_in.

Further, the cross correlation between the synchronization pattern syn0 and the A pattern after the pattern syn1 of Run_out of the land L and the B1 pattern after the pattern syn1 of Run_out of the groove G, the synchronization pattern syn0, and the B0 pattern is zero, similarly to Run_in described above with reference to FIG. 12.

Therefore, the reproduction signal of Run_out is a signal having a similar characteristic to that of the reproduction signal of the frame data, similarly to the reproduction signal of Run_in.

The pattern syn1 includes an FS entity of 12T×2 of FIG. 11, a pattern of 3T arranged thereafter, and another pattern of 3T arranged thereafter.

As the pattern syn1, for example, a pattern including an FS entity of 12T×2 of FIG. 11 and a BC of 6T arranged after the FS entity can be employed.

<Example of Process by Sync Detecting Unit 61>

Figure 22:
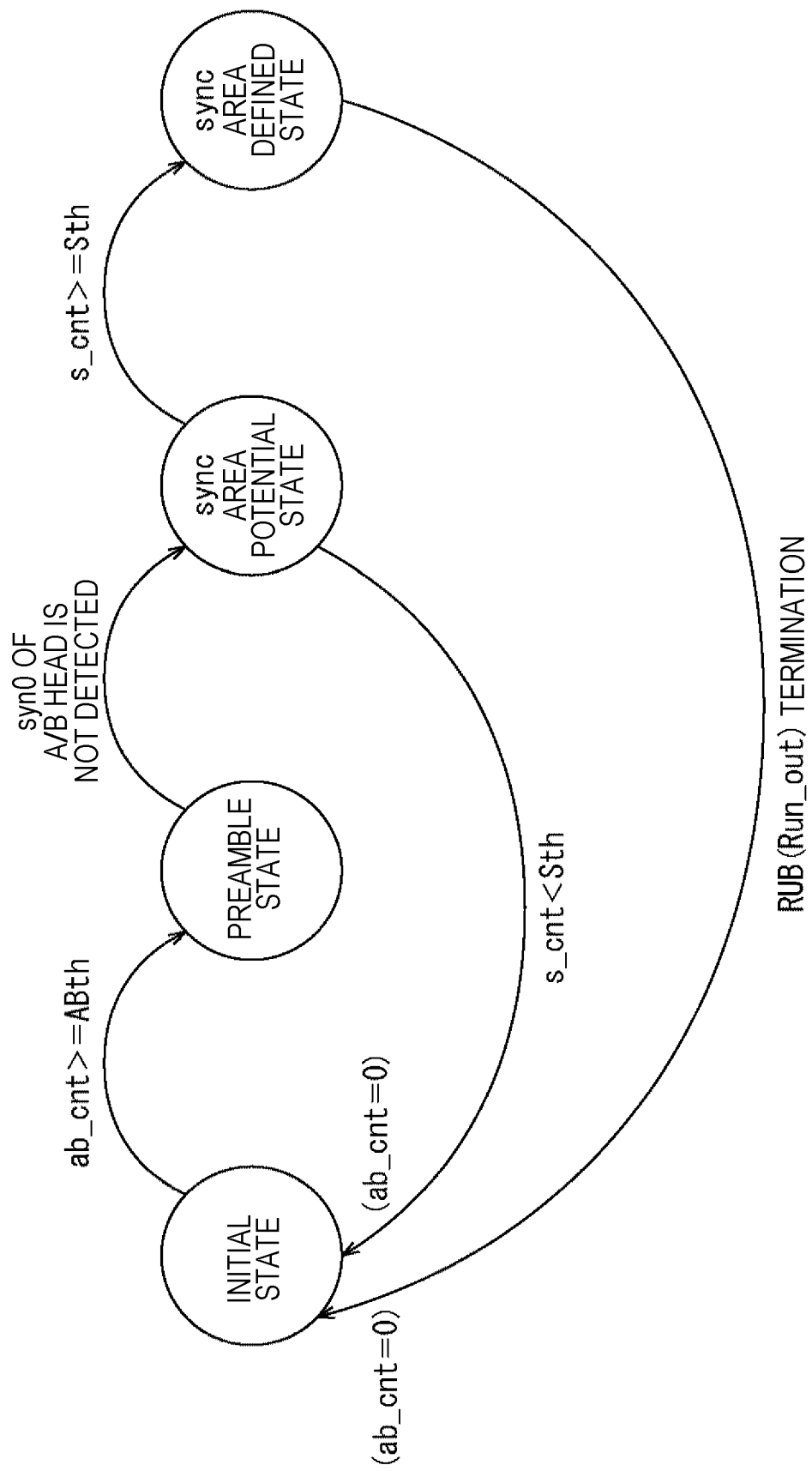
FIG. 22 is a diagram for describing an example of a sync detection process performed by a sync detecting unit 61.

FIG. 22 is a diagram for describing an example of the sync detection process performed by the sync detecting unit 61 of FIG. 6.

In a case where the Viterbi decoding serving as the maximum likelihood decoding is started from the head of Run_in in the restoring unit 35, and the synchronization pattern syn0 is correctly restored, the sync detecting unit 61 detects the synchronization pattern syn0 which is a pattern of 6T/12T/12T/12T/12T/6T from the Viterbi decoding result supplied from the restoring unit 35.

Here, in a case where the synchronization pattern syn0 is indicated by data of ±1 of the NRZ expression, +1 of the NRZ expression is indicated as 1, and −1 is indicated as 0.

In this case, the synchronization pattern syn0 is indicated as
000000_111111111111_000000000000_111111111111_00000000000 0_111111 or
111111_000000000000_111111111111_000000000000_11111111111 1_000000 in the NRZ expression.

In the synchronization pattern syn0, the four patterns 111111111111 and 000000000000 of 12T in the center portion are sync entities.

Here, in the synchronization pattern syn0, a pattern of 12×4+r×2+1 bits from before r bits of the first pattern of 12T of the sync entity to after r+1 bits of the last pattern of 12T of the sync entity is a detection target pattern of a detection target.

For example, in a case where r bits are 2 bits, the detection target pattern of 53 bits (=12×4+2×2+1) can be indicated as
00_100000000000_100000000000_100000000000_100000000000_10 0 in the NRZI notation.

The detection target pattern described above has five edges (is in the NRZI expression), but in a case where the locking of the PLL 32 (FIG. 4), the cutting of the DC component in the HPF 41 (FIG. 4), the gain adjustment of the AGC 42 (FIG. 4), the XTC learning, and the like do not progress sufficiently (are not performed), the Viterbi decoding result may contains many errors, and the position of the edge of the detection target pattern may be shifted back and forth.

In this regard, for example, the sync detecting unit 61 counts the number c of edges appearing at the correct position in the detection target pattern of 53 bits, and in a case where the number c satisfies Formula 5−(5−1)/2=3<=c, and the remaining 5-c edges are located within a range before and after r=2 bits at the correct position, (sync entity of) the synchronization pattern syn0 is detected.

The sync detecting unit 61 performs the sync detection process of detecting the synchronization pattern syn0 as described above.

FIG. 22 illustrates an example of a sequence of the sync detection process performed by the sync detecting unit 61 of FIG. 6.

The sync detecting unit 61 first enters an initial state. In the initial state, sync detecting unit 61 resets the number of consecutive detections ab_cnt obtained by counting the number of synchronization pattern syn0 included in preamble in Run_in (FIG. 12) to 0. Further, the sync detecting unit 61 starts detecting the synchronization pattern syn0 from the restoration result from the restoring unit 35 (the decoding result of the maximum likelihood decoding), and increments the number of consecutive detections ab_cnt by 1 each time the synchronization pattern syn0 is detected.

Here, in the initial state, the sync detecting unit 61 detects the synchronization pattern syn0 arranged immediately before the A pattern or the B pattern of the preamble of Run_in. In the initial state, the number of consecutive detections of the synchronization pattern syn0 arranged immediately before the A pattern or the B pattern is counted by the number of consecutive detections ab_cnt.

In the initial state, if the number of consecutive detections ab_cnt is equal to or larger than a threshold value ABth of the number of consecutive detections ab_cnt, the sync detecting unit 61 recognizes that the preamble (FIG. 12) of Run_in is being reproduced and transitions from the initial state to a preamble state.

In the preamble state, the sync detecting unit 61 keeps detecting the synchronization pattern syn0 arranged immediately before the A pattern or the B pattern. Then, in a case where the synchronization pattern syn0 arranged immediately before the A pattern or the B pattern is not detected, the sync detecting unit 61 recognizes that there is a possibility of the start of the reproduction of the sync area (FIG. 12) of Run_in, and transitions from the preamble state to a sync area potential state.

In the sync area potential state, the sync detecting unit 61 resets the number of detections s_cnt obtained by counting the number of synchronization patterns syn0 included in the sync area of Run_in to 0. Further, the sync detecting unit 61 starts detecting the synchronization pattern syn0 included in the sync area, and increments the number of detections s_cnt by 1 each time the synchronization pattern syn0 is detected.

In the sync area potential state, if the number of detections s_cnt is equal to or larger than a threshold value Sth of the number of detections s_cnt, the sync detecting unit 61 recognizes that the sync area of Run_in is being reproduced, and transitions from the sync area potential state to a sync area defined state.

On the other hand, in the sync area potential state, in a case where the number of detections s_cnt is not equal to or larger than the threshold value Sth during the reproduction of the sync area (within a time in which the reproduction is estimated to be performed), the sync detecting unit 61 recognizes that the synchronization pattern syn0 of the sync area fails to be detected, and returns from the sync area potential state to the initial state.

In the sync area defined state, the sync detecting unit 61 recognizes a timing of the last EC of Run_in (the EC arranged at the end of the first pattern NC1 or the second pattern NC2 of Run_in (FIG. 18)) from the number of detections s_cnt which is a count number of the synchronization pattern syn0 of the sync area.

Further, the sync detecting unit 61 generates a signal indicating an interval from the head of the last EC of Run_in to the end of FS of the frame frame1 (FIG. 9) subsequent to Run_in, and supplies an FS gate signal indicating the interval of the FS of the frame frame1 signal to the time information generating unit 62.

Thereafter, if Run_out (FIG. 9 and FIG. 21) (the FS entity or the like included in the pattern syn1) is detected, the sync detecting unit 61 transitions from the sync area defined state to the initial state at the terminal of Run_out.

Figure 23:
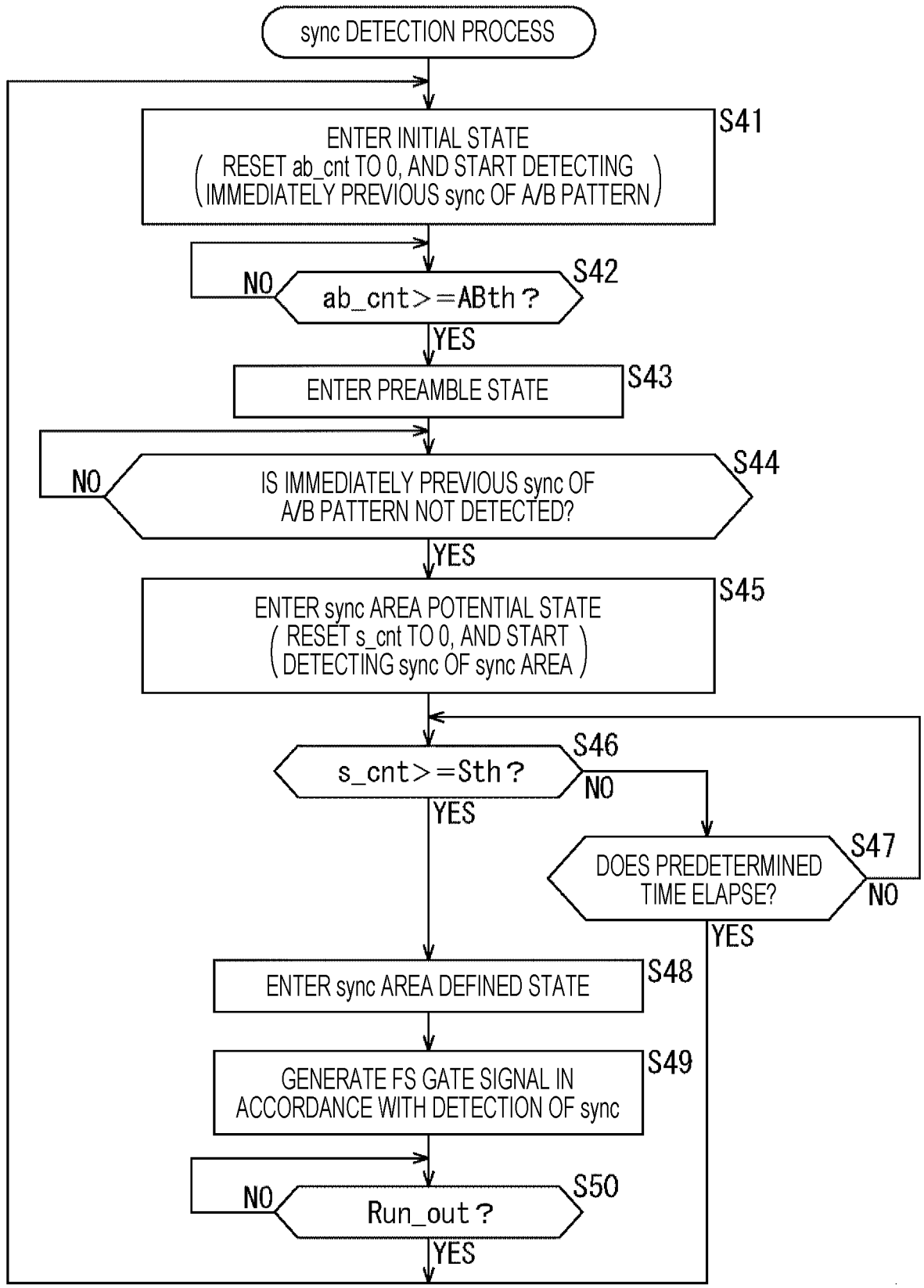
FIG. 23 is a flowchart illustrating an example of a sync detection process performed by a sync detecting unit 61.

FIG. 23 is a flowchart for describing an example of the sync detection process performed by the sync detecting unit 61 of FIG. 6.

In step S41, the sync detecting unit 61 enters the initial state, and resets the number of consecutive detections ab_cnt to 0. Further, the sync detecting unit 61 starts detecting the synchronization pattern syn0 arranged immediately before the A pattern or the B pattern from the restoration result from the restoring unit 35, and increments the number of consecutive detections ab_cnt every time the synchronization pattern syn0 is detected.

Thereafter, the process proceeds from step S41 to step S42, and the sync detecting unit 61 determines whether or not the number of consecutive detections ab_cnt is equal to or larger than the threshold value ABth.

In a case where it is determined in step S42 that the number of consecutive detections ab_cnt is not equal to or larger than the threshold value ABth, the process returns to step S42.

In addition, in a case where it is determined in step S42 that the number of consecutive detections ab_cnt is equal to or larger than the threshold value ABth, the process proceeds to step S43, and the sync detecting unit 61 transitions from the initial state to the preamble state, and the process proceeds to step S44.

In step S44, the sync detecting unit 61 keeps detecting the synchronization pattern syn0 arranged immediately before the A pattern or the B pattern. Further, in step S44, the sync detecting unit 61 determines whether or not a synchronization pattern syn0 arranged immediately before the A pattern or the B pattern is detected.

In a case where it is determined in step S44 that the synchronization pattern syn0 arranged immediately before the A pattern or the B pattern is detected, that is, in a case where the preamble of Run_in (FIG. 12) is being reproduced, the process of step S44 is repeated.

In addition, in a case where it is determined in step S44 that the synchronization pattern syn0 arranged immediately before the A pattern or the B pattern is not detected, that is, in a case where there is a possibility of the start of the reproduction of the sync area (FIG. 12) of Run_in, the process proceeds to step S45.

In step S45, the sync detecting unit 61 transitions from the preamble state to the sync area potential state, and resets the number of detections s_cnt to 0. Further, the sync detecting unit 61 starts detecting the synchronization pattern syn0 included in the sync area from the restoration result from the restoring unit 35, and increments the number of detections s_cnt by 1 each time the synchronization pattern syn0 is detected.

Thereafter, the process proceeds from step S45 to step S46, and the sync detecting unit 61 determines whether or not the number of detections s_cnt is equal to or later than the threshold value Sth.

In a case where it is determined in step S46 that the number of detections s_cnt is not equal to or larger than the threshold value Sth, the process proceeds to step S47.

In step S47, the sync detecting unit 61 determines whether or not a predetermined time estimated as a time required for the reproduction of the sync area elapses since the sync detecting unit 61 enters the sync area potential state.

In a case where it is determined in step S47 that a predetermined time does not elapse since it enters the sync area potential state, the process returns to step S41, the sync detecting unit 61 transitions from the sync area potential state to the initial state, and a similar process is then repeated.

Further, in a case where it is determined in step S47 that the predetermined time does not elapse since it enters the sync area potential state, the process returns to step S46.

In addition, in a case where it is determined in step S46 that the number of detections s_cnt is equal to or larger than the threshold value Sth, the process proceeds to step S48, and the sync detecting unit 61 transitions from the sync area potential state to the sync area defined state, and the process proceeds to step S49.

In step S49, the sync detecting unit 61 generates the FS gate signal indicating the interval of the FS of the frame frame1 from the number of detections s_cnt which is the count number of the synchronization pattern syn0 in the sync area as described above with reference to FIG. 22, and supplies the FS gate signal to the time information generating unit 62, and the process proceeds to step S50.

In step S50, the sync detecting unit 61 determines whether or not Run_out (FIG. 9) (FIG. 21) is detected from the restoration result from the restoring unit 35, and in a case where it is determined that Run_out is not detected, the process returns to S50.

Further, in a case where it is determined in step S50 that Run_out is detected, the process returns to step S41.

As described above, in the recording/reproducing apparatus of FIG. 1, since the synchronization patterns syn0 are recorded in the land and the groove serving as the two adjacent tracks in the optical disc 16 with a predetermined amount of shift in the track direction, the interference from the adjacent tracks is suppressed when the synchronization pattern syn0 is reproduced from the optical disc 16.

Further, in the recording/reproducing apparatus of FIG. 1, a plurality of synchronization pattern syn0 are recorded in Run_in of the optical disc 16.

Therefore, it is possible to accurately detect the synchronization pattern syn0, that is, the FS at the head of the frame after Run_in including the synchronization pattern syn0, and as a result, it is possible to record data in the optical disc 16 with high density, and it is possible to reproduce data recorded with high density robustly.

Note that in FIG. 12, a plurality of sets each including the synchronization pattern syn0 and the A pattern or the B pattern are arranged in the preamble, but a set of synchronization pattern syn0 and A pattern or B pattern can be arranged in the preamble.

Similarly, in FIG. 12, a plurality of sets each including the synchronization pattern syn0 and the zero correlation pattern NC0 are arranged in the sync area, but a set of synchronization pattern syn0 and zero correlation pattern NC0 can be arranged in the sync area.

<Recording of FS in Two Adjacent Tracks>

Figure 24:
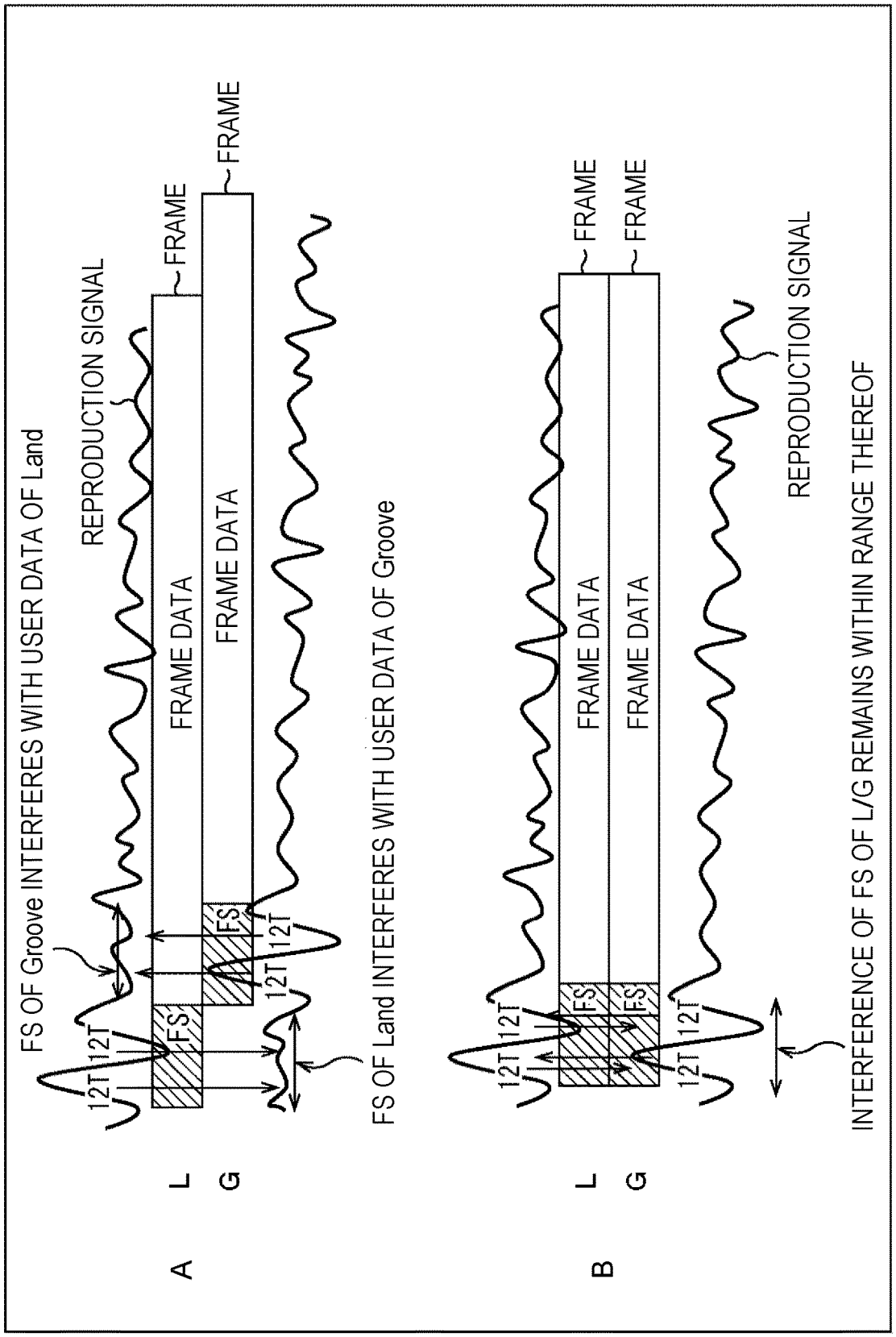
FIG. 24 is a diagram for describing an example of recording of an FS in two adjacent tracks of an optical disc 16.

FIG. 24 is a diagram for describing an example of recording the FS in the two adjacent tracks of the optical disc 16.

In the above example, recording of the frame in the land and the groove which are the two adjacent tracks of optical disc 16 is not particularly mentioned, but as a method of recording the frame in the land and the groove which are adjacent, for example, there are a method of recording the frame in the land and the groove which are adjacent with a predetermined amount of shift in the track direction and a method of recording the frame in the land and the groove which are adjacent at the same position in the track direction, similarly to the synchronization pattern syn0.

A of FIG. 24 illustrates an example of the frame recorded in the land L and the groove G which are adjacent with a shift in the track direction.

In A of FIG. 24, the frame is recorded in the land L and the groove G which are adjacent with a predetermined amount of shift corresponding to, for example, the length of the FS in the track direction.

As described above, in a case where the frames are recorded in the land L and the groove G which are adjacent with a shift in the track direction, the FS of the track adjacent to the track of the reproduction target interferes with the reproduction signal of the frame data of the track of the reproduction target, and thus the decoding performance of the frame data of the track of the reproduction target is likely to deteriorate.

B of FIG. 24 illustrates an example of the frame recorded in the land L and the groove G which are adjacent at the same position in the track direction.

In B of FIG. 24, since the frame is recorded in the land L and the groove G which are adjacent at the same position in the track direction, the interference of the FS of the track adjacent to the track of the reproduction target remains only in the FS of the track of the reproduction target.

Therefore, in a case where the frame is recorded in the land L and the groove G which are adjacent at the same position in the track direction, the deterioration in the decoding performance of the frame data caused by the interference of the FS can be prevented.

In this regard, in the recording/reproducing apparatus of FIG. 1, the frame is recorded in the land L and the groove G which are adjacent at the same position in the track direction as illustrated in B of FIG. 24.

However, in a case where the frame is recorded in the land L and the groove G which are adjacent at the same position in the track direction, the FS of the track adjacent to the track of the reproduction target interferes with the reproduction signal of the FS of the track of the reproduction target, and thus the decoding performance of the FS is likely to deteriorate.

Further, if the decoding performance of FS deteriorates, in a case where there is a clock shift (clock slip) in the channel clock of the PLL 32 (FIG. 4), the interval of the frame data is unable to be specified correctly, and it may hinder reproducing the data recorded with high density robustly.

Meanwhile, the FS is a known pattern. Therefore, in the recording/reproducing apparatus of FIG. 1, since the FS is a known pattern, it is possible to reduce the deterioration in the decoding performance of the FS of the track of the reproduction target caused by the interference of the FS of the track adjacent to the track of the reproduction target and to reproduce the data recorded with high density robustly.

In other words, in the recording/reproducing apparatus of FIG. 1, the FS is restored by performing only the maximum likelihood decoding of the FS among the maximum likelihood decoding of the reproduction signal reproduced from the optical disc 16 in the restoring unit 35 (FIG. 4) in accordance with the time-variant trellis in which the state and the state transition are limited in accordance with a time.

The time-variant trellis used for the maximum likelihood decoding of the FS is limited in accordance with a states and a state transition which can be taken in the FS which is a known pattern.

Further, the time-variant trellis is appropriately limited in accordance with, for example, the minimum run, the maximum run, and a repeated minimum transition run length (RMTR) of the PCWA 110 code serving as the channel code employed in the optical disc 16.

Note that in the present embodiment, an FS in a case where there is no clock shift and an FS in a case where there is a clock shift are taken into consideration in the maximum likelihood decoding of the FS. Therefore, as the state and the state transition which can be taken in the FS, there are a state and a state transition which can be taken in each of the FS in a case where there is no clock shift and the FS in a case where there is a clock shift, and the time-variant trellis is limited in accordance with the stat and the state transition which can be taken in each of the FS in a case where there is no clock shift and the FS in a case where there is a clock shift.

<Example of Time-Variant Trellis Used for Maximum Likelihood Decoding of FS>

Figure 25:
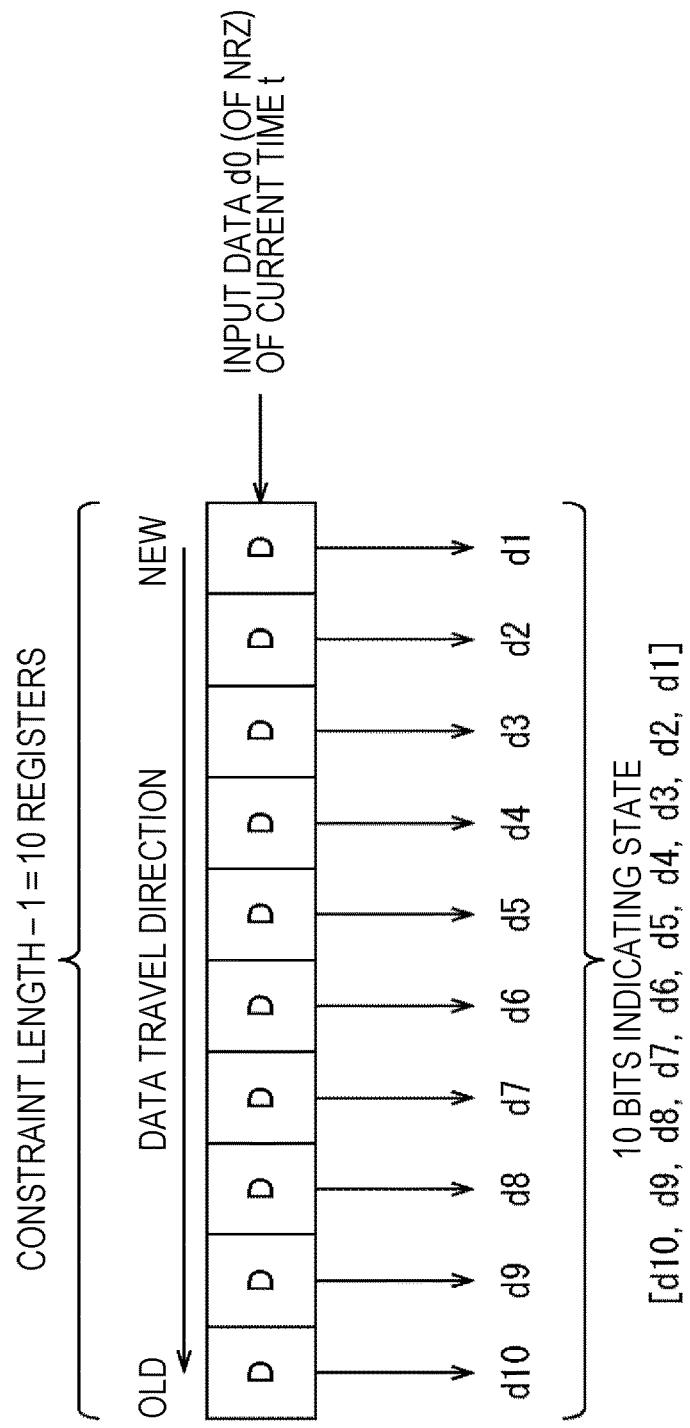
FIG. 25 is a diagram for describing a partial response maximum likelihood (PRML) of a code in which a constraint length (ISI length) is 11, and a minimum run d is 1 (2T in an NRZ expression).

FIG. 25 is a diagram for describing a partial response maximum likelihood (PRML) of a code in which the constraint length (ISI length) is 11, and the minimum run d is 1 (2T in the NRZ expression).

Here, the PCWA 110 code employed in the recording/reproducing apparatus of FIG. 1 is one type of code with the minimum run d=1.

Here, that input data (NRZ expression) at a current time t among codes with the minimum run d=1 serving as input data input to the PR channel with the constraint length 11 is indicated by d0, and input data (NRZ expression) at a time t-n which is a time n earlier than the current time t is indicated by d #n.

In a case where the constraint length is 11, the input data d0 at the current time t is affected by (constraint length-1) pieces of input data immediately before the input data d0, that is, input data d1, d2, . . . , and d10 at past 10 times t-1, t-2, . . . , and t-n.

In this regard, 10 registers which correspond in number to (constraint length-1) are prepared, and input data d1, d2, . . . , and d10 at past 10 times t-1, t-2, . . . , and t-10 are stored in the 10 registers.

The trellis of the PRML of the code with the constraint length of 11 and the minimum run d=1 has states indicated by the past input data d1 to d10 stored in the 10 registers, that is, 1024 (=$2^{10}$) states indicated by 10 bits in which the input data d10, d9, . . . , and d1 are arranged in the described order (time order).

The time-variant trellis used for the maximum likelihood decoding of the FS may include 1024 (=$2^{10}$) states described above.

Figure 26:
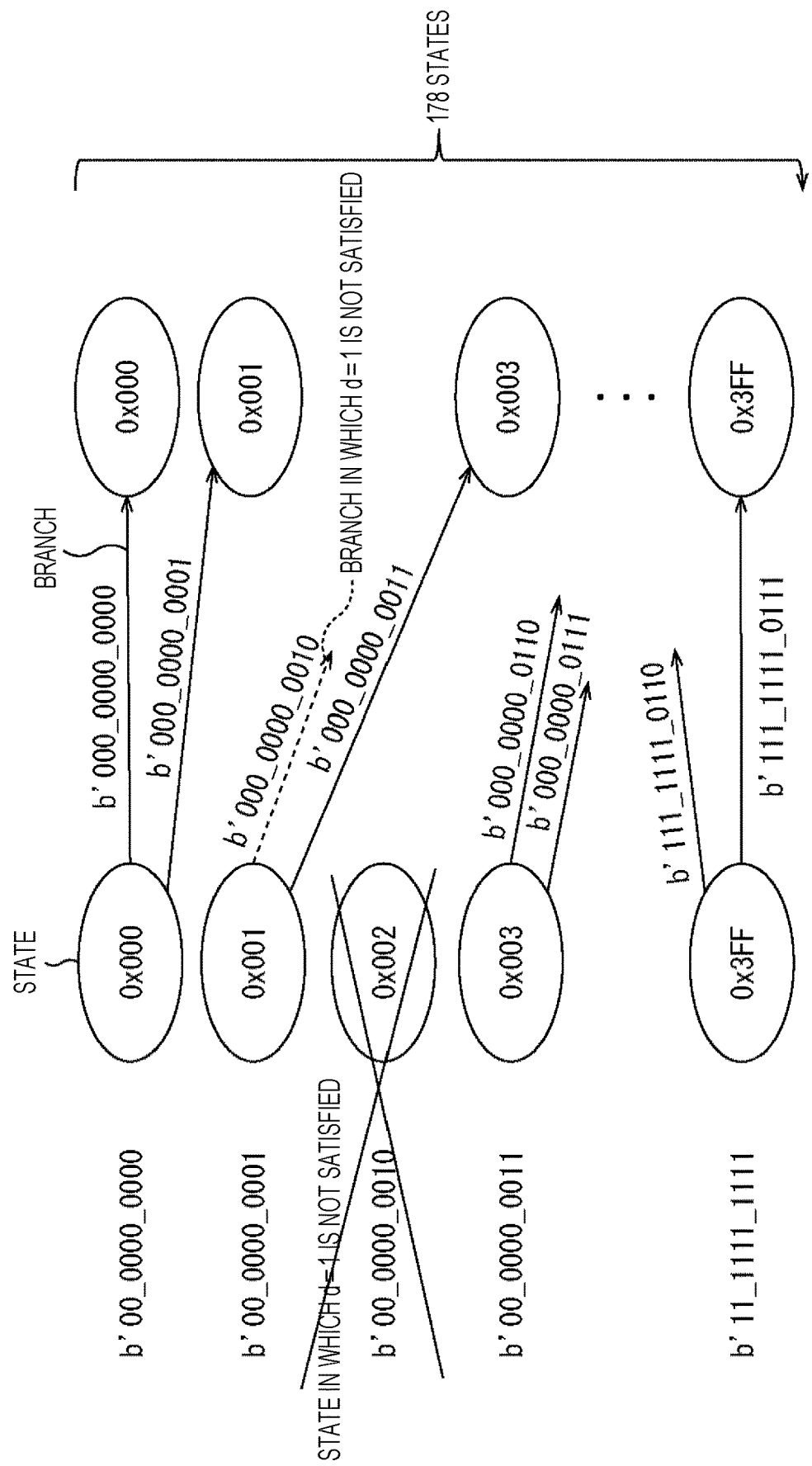
FIG. 26 is a diagram illustrating an example of a trellis used for a PRML of a code in which a constraint length is 11, and a minimum run d is 1.

FIG. 26 is a diagram illustrating an example of the trellis used for the PRML of the code with the constraint length of 11 and the minimum run d=1.

Here, hereinafter, a value subsequent to 0x indicates a hexadecimal number, and a value subsequent to b' indicates a binary number.

Further, hereinafter, the state and the state transition (branch) of the trellis are appropriately indicated using a decimal number, a binary number, or a hexadecimal number.

For example, each state of the trellis having the 1024 states is indicated as a state 0x000, 0x001, . . . 0x3FF.

Further, in the trellis, a state transition or a branch from a state #i to a state #j is indicated using the state #i before the state transition and the input data d0 input at the current time when the state transition from the state #i to the state #j occurs (i and j=0, 1, . . . , and 1023 in a case where the trellis has 1024 states).

For example, in the state 0x000=b'00_0000_0000 (underbars are added so that a value is comfortably viewed and does not relate to a binary value), in a case where there is b'1 as the input data d0 at the current time, transition from a state 0x000=b'00_0000_0000 to a state 0x001=b'00_0000_0001 is performed, but the state transition or the branch from the state b'00_0000_0000 to the state b'00_0000_0001 is indicated as a state transition b'000_0000_0001 or a branch b'000_0000_0001 using 11 bits in -which the state b'00_0000_0000 before the state transition as high-order bits and the input data d0=b'1 at the current time as the least significant bit.

In this case, the low-order 10 bits b'00_0000_0001 of the state transition or the branch b'000_0000_0001 indicates the state of the transition destination of the state transition. As described above with reference to FIG. 25, a bit sequence indicating the state is equivalent to a bit sequenced d10, d9, . . . , and d1 in which the input data d1, d2, . . . , and d10 at the past 10 times until it enters the state are arranged in the time order.

In a case where the PRML of the code with the constraint length=11 and the minimum run d=1 is performed in the restoring unit 35, two or more bits of each of 1 and 0 are consecutive in the input data of the NRZ expression due to the minimum run d=1. In other words, only one bit of each of 1 and 0 does not appear in the input data.

Therefore, the time-variant trellis used for the maximum likelihood decoding of the FS does not have a state 0x002=b'00_0000_0010 in which only one bit of 1 appears independently, for example.

Similarly, the time-variant trellis does not have, for example, a state b'00_0000_0100 or the like. Here, for example, there may be the state b'00_0000_0001 or the like in the time-variant trellis. It is because, for the state b'00_0000_0001, in a case where the input data d0 at the current time is 1, is are consecutive at the current time and a time immediately before the time (the least significant bit of the state b'00_0000_0001).

Further, due to the minimum run d=1, the time-variant trellis used for the maximum likelihood decoding of the FS does not have a branch in which only one bit of 0 or 1 appears independently.

Therefore, the time-variant trellis does not have the branch b'000_000_0010 in which, for example, in the state 0x001=b'00_0000_0001, 0 is as the input data d0 at the current time, and state transition to the state b'00_0000_0010 is performed.

Similarly, the time-variant trellis does not have the branch b'000_0000_0100 or the like Here, for example, there may be a branch b'000_0000_0001 or the like in the time-variant trellis. It is because, for the branch b'000_0000_0001, if input data at a next time is 1 in the state b'00_0000_0001 of the transition destination of the branch b'000_0000_0001, 1s are consecutive at the current time and the next time.

In the PRML of the code with the constraint length of 11 and the minimum run d=1, the time-variant trellis used for the maximum likelihood decoding of the FS is restricted to a trellis having 178 states and 288 branches due to the minimum run d=1.

Here, only due to the limitation of the minimum run d=1, the structure of the trellis does not change with time. Therefore, the trellis in which the state and the branch (state transition) are just limited by the minimum run d=1 is not a time-variant trellis.

Figure 27:
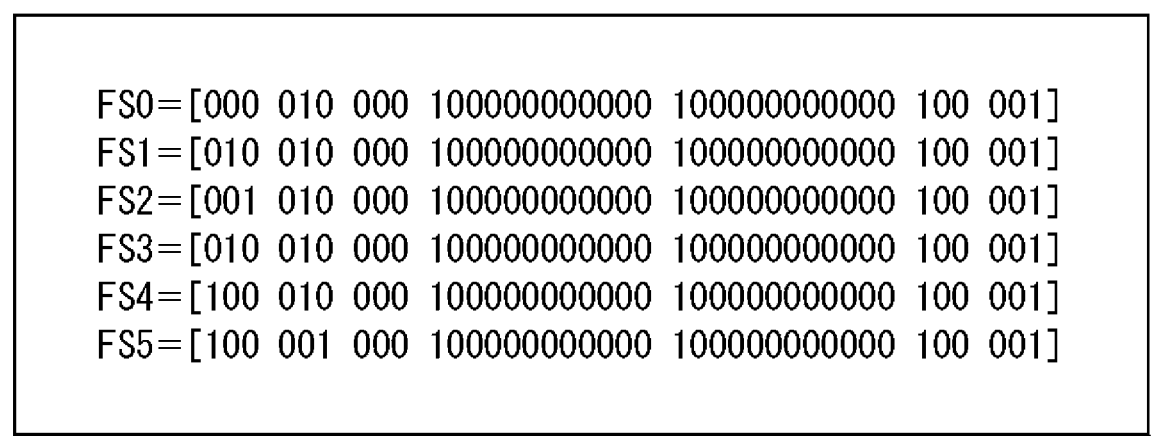

FIG. 27 is a diagram illustrating an example of the FS.

As described above with reference to FIG. 11, the FS includes the EC, the FS entity, and the BC.

Then, as described above with reference to FIG. 11, the EC is a pattern in which the encoding state of the PCWA 110 encoding starts from each of the possible states S1 to S5 and terminates in the state S3 which is a specific one state.

In other words, as the EC, there are five patterns starting from each of the states S1 to S5 and terminating in the state S3. Further, as described with reference to FIG. 11, the pattern starting from the state S1 and terminating in the state S3 may be replaced with the replacement code sequence.

Therefore, the EC includes 6 patterns, and the FS includes 6 patterns having the ECs of the 6 patterns.

FIG. 27 illustrates the FSs of the 6 patterns by the NRZI expression.

In FIG. 27, FS0 is an FS including an EC starting from the state S1 and terminating in the state S3, and FS1 is an FS including an EC obtained by performing replacement by the replacement code sequence on the pattern starting from the state S1 and terminating in the state S3.

FS2, FS3, FS4, and FS5 are FSs having ECs starting from the states S2, S3, S4, and S5 and terminating in the state S3, respectively.

If the interval of the FS is assumed, it is possible to assume a bit of the FS to be decoded with time. In this case, the restoring unit 35 can limit the time-variant trellis used for the maximum likelihood decoding of the FS to the states and the state transitions which can be taken as FS0 to FS5 (deletes the state and the state transition which are unable to be taken as FS0 to FS5 from the time-variant trellis) and perform the maximum likelihood decoding of the FS.

In the present embodiment, in order to detect the clock shift of the channel clock, the restoring unit 35 considers the FS in a case in there is no clock shift and the FS in a case where there is a clock shift as the FSs.

In other words, the restoring unit 35 limits the time-variant trellis used for the maximum likelihood decoding of the FS in accordance with the state and the state transition which can be taken in each of the FS in a case in there is no clock shift and the FS in a case where there is a clock shift.

Here, as the time-variant trellis used for the maximum likelihood decoding of the FS is limited in accordance with the state and the state transition which can be taken in each of the FS in a case in there is no clock shift and the FS in a case where there is a clock shift, the trellis becomes a time-variant trellis.

FIG. 28 is a diagram illustrating an example of the FS in a case where there is no clock shift and the FS in a case where there is a clock shift for the FSs of the 6 patterns of FIG. 27.

FIG. 28 illustrates an extended FS code string FSB #i obtained by extending the FS in a case where there is no clock shift and extended FS code strings FSA #i and FSC #i obtained by extending the FS in a case where there is a clock shift (i=0, 1, 2, 3, 4, and 5).

In other words, in FIG. 28, in order to detect a clock shift of +1 clock and the clock shift of −1 clock as the clock shift of the channel clock, portions of before and after FS #i of FIG. 27 are extended by 1 bit, so that the extended code string becomes the extended FS code string FSB #i.

Further, in FIG. 28, a rear side of FS #i of FIG. 28 is extended by 2 bits, so that the extended code string becomes an extended FS code string FSC #i, and a front side of FS #i of FIG. 27 is extended by 2 bits, so that the extended code string becomes the extended FS code string FSA #i.

If the extended FS code string FSB #i is assumed to be a code string containing an FS with no clock shift, the extended FS code string FSA #i is a code string containing an FS with a clock shift of +1 clock, and the extended FS code string FSC #i is a code string containing an FS with a clock shift of −1 clock.

Note that in FIG. 28, an asterisks (*) included in each of the extended FS code strings FSA #i, FSB #i, and FSC #i indicates a bit extended for the FS #i of FIG. 27, and a value thereof is don't care.

Further, in this example, the clock shift of ±1 clock is detected, but a clock shift of an arbitrary number of clocks other than ±1 clock can be detected as the clock shift. For example, in a case where a clock shift of arbitrary ±N clock such as ±2 or more clocks is detected, it is preferable to consider an extended FS code string obtained by extending the front side of FS #i by 2N bits, an extended FS code string obtained by extending the front side of FS by 2N−1 bits and extending the rear side of FS by 1 bit, . . . , an extended FS code string obtained by extending the front side of FS #i by N+1 bits and extending the rear side of FS #i by N−1 bits, an extended FS code string obtained by extending the front side and the rear side of FS #i by N bits, an extended FS code string obtained by extending the front side of FS #i by N−1 bits and extending the rear side of FS #i by N+1 bits, . . . , an extended FS code string obtained by extending the front side of FS #i by 1 bit and extending the rear side of FS #i by 2N−1 bits, and an extended FS code string obtained by extending the rear side of FS #i by 2N bits.

Figure 29:
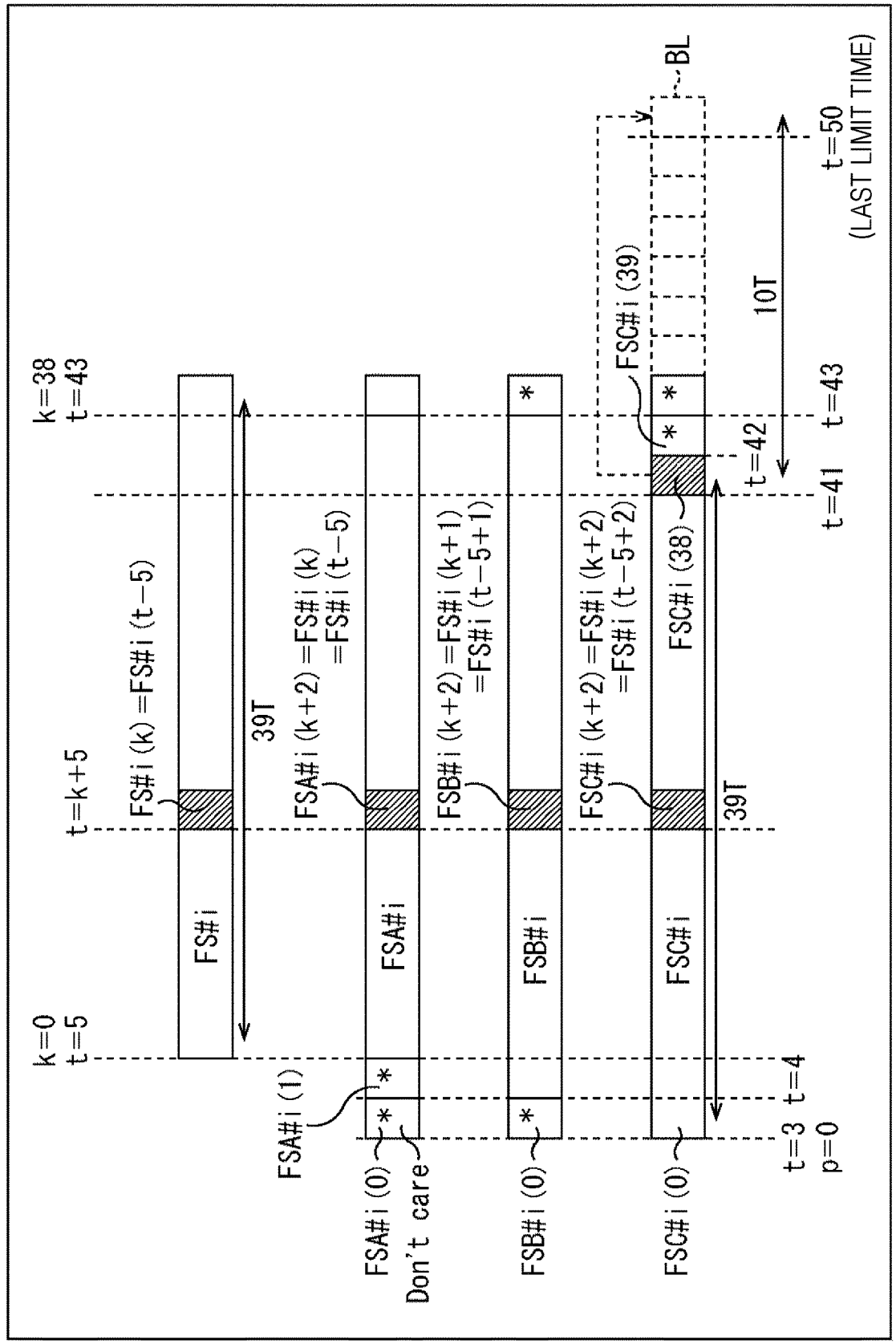
FIG. 29 is a diagram illustrating a relation of extended FS code strings FSA #i, FSB #i, and FSC #i.

FIG. 29 is a diagram illustrating a relation between the extended FS code strings FSA #i, FSB #i, and FSC #i.

In FIG. 29, the extended FS code strings FSA #i, FSB #i, and FSC #i are illustrated side by side using a horizontal axis as a time.

In FIG. 29, for example, a time t of a first bit (a first bit from the left) of the FS #i included in the extended FS code string FSA # among the extended FS code strings FSA #i, FSB #i, and FSC #i, that is, a time t of a third bit from the left of the extended FS code string FSA #i is set as, for example, a time t=5 serving as a predetermined time, and the extended FS code strings FSA #i, FSB #i, and FSC #i are arranged on the basis of the time t=5.

Here, a (k+1)-th bit from the left of the FS #i is indicated as FS #i(k).

In this case, if the time of the first bit FS #i(0) of the FS #i is matched with the standard time t=5, a relation between k and t is indicated by Formula t=k+5.

In addition, a bit of the extended FS code string FSA #i at the time t=k+5 is indicated by FS #i(k). Further, a bit of the extended FS code string FSB #i at the time t=k+5 is indicated by FS #i(k+1), and a bit of the extended FS code string FSC #i at the time t=k+5 is indicated by FS #i(k+2).

Here, (p+1)-th bits from the left of the extended FS code strings FSA #i, FSB #i, and FSC #i are indicated by FSA #i (p), FSB #i(p), and FSC #i(p), respectively.

FSA #i(k+2), FSB #i(k+2), and FSC #i(k+2) are equivalent to FS #i(k), FS #i(k+1), and FS #i(k+2), respectively.

Here, as described above, if the time t=5 is used as a reference, the bits of the extended FS code strings FSA #i, FSB #i, and FSC #i at the time t are indicated by FSA #i(t−3), FSB #i(t−3), and FSC #i(t−3).

In a case where the FS is decoded as one of the extended FS code strings FSA #i, FSB #i, and FSC #i in the maximum likelihood decoding of the FS, in the time-variant trellis used for the maximum likelihood decoding of the FS, the state transition is limited by deleting the branch which is unable to be taken for any of the extended FS code strings FSA #i, FSB #i, and FSC #i at each time t, For the restriction of the time-variant trellis (state transition) at the time t, it is determined whether or not each branch at the time t can be taken on the basis of bit sequences FSA #i(0) to FSA #i(t−3), FSB #i(0) to FSB #i(t−3), and FSC #i (0) to FSC #i (t−3) among the extended FS code strings FSA #i, FSB #i, and FSC #i.

Here, the bit sequences FSA #i(0) to FSA #i (t−3), FSB #i(0) to FSB #i(t−3), and FSC #i(0) to FSC #i(t−3) of the extended FS code strings FSA #i, FSB #i, and FSC #i used for the limitation of the time-variant trellis are bit sequences that can be taken as the FS and hereinafter also referred to as FS candidate bit strings.

Further, the bit sequence from the (p+1)-th bit FSA #i (p) to the (p'+1)-th bit FSA #i(p') from the left of the extended FS code string FSA #i is indicated by FSA #i[p:p'] (p<p'). The same applies to the extended FS code strings FSB #i and FSC #i.

The bits FSA #i(0), FSA #i(1), and FSB #i(0) among the FS candidate bit strings FSA #i[0:t−3], FSB #i[0:t−3], and FSC #i[0:t−3] are don't care.

The bits FSA #i(0) and FSB #i(0) which are don't care are bits at the time t=3, and the bit FSA #i(1) is a bit at the time t=4.

Further, at a time before the time t=3, the extended FS code strings FSA #i, FSB #i, and FSC #i are not present.

Therefore, the FS candidate bit string does not appear until the time t=4, or although the FS candidate bit string appears, there is don't care in the bit of the FS candidate bit string at each time, and thus the time-variant trellis can take an arbitrary state and branch.

In the extended FS code strings FSA #i, FSB #i, and FSC #i, there is no bit of don't care after the time t=5, and thus the time-variant trellis can be limited by the FS candidate bit string after the time t=5.

At the time t=5, bits FSA #i[0:5-3], FSB #i[0:5-3], and FSC #i[0:5-3], that is, the bits FSA #i[0:2], FSB #i[0:2], and FSC #i[0:2] become the FS candidate bit strings.

For the FS candidate bit strings FSA #i[0:2], FSB #i[0:2], and FSC #i[0:2], there is a bit including don't care as two bits FSA #i[0:1], FSB #i[0:1], and FSC #i[0:1] at the time t=3 and 4. Further, both of 0 or 1 in the NRZI expression can be taken as the bits FSA #i[2:2], FSB #i[2:2], and FSC #i[2:2](third bits from the left of FSA #i, FSB #i, and FSC #i) at the time t=5.

Therefore, at the time t=5, the time-variant trellis is not limited to the extended FS code strings FSA #i, FSB #i, and FSC #i as a result.

At the time t=6, bits FSA #i[0:6-3], FSB #i[0:6-3], and FSC #i[0:6-3], that is, bits FSA #i[0:3], FSB #i[0:3], and FSC #i[0:3] become the FS candidate bit strings.

For the FS candidate bit strings FSA #i[0:3], FSB #i[0:3], and FSC #i[0:3], there is a bit including don't care as two bits FSA #i[0:1], FSB #i[0:1], and FSC #i[0:1] at the time t=3 and 4. Further, one of 00, 01, and 10 in the NRZI expression can be taken as two bits FSA #i[2:3], FSB #i[2:3], and FSC #i [2:3] at the time t=5 and 6.

Therefore, at the time t=6, a branch in which the lower 2 bits are none of 00, 01, and 10 in the NRZI expression is limited.

Here, in the present embodiment, as described above with reference to FIG. 25, the minimum run d of the code which is a target of the PRML is 1.

In the NRZI expression, 11 indicates 2-bit consecutive inversion, and thus in a case where the minimum run d is 1, 11 in the NRZI expression is unable to be taken.

In other words, two bits that can be taken in a case where the minimum run d is 1 are one of 00, 01, and 10 in the NRZI expression.

As described above, at the time t=6, the branch in which the lower 2 bits are none of 00, 01, and 10 in the NRZI expression is limited, but 00, 01, 10 in the NRZI expression are all sets of two bits which can be taken in a case where the minimum run d is 1.

For this reason, the time-variant trellis is not limited by the FS candidate bit strings FSA #i[0:3], FSB #i[0:3], and FSC #i[0:3] accordingly.

At the time t=7, bits FSA #i[0:7-3], FSB #i[0:7-3], and FSC #i[0:7-3], that is, 5 bits FSA #i[0:4], FSB #i[0:4], and FSC #i[0:4] become the FS candidate bit strings.

FIG. 30 is a diagram illustrating the FS candidate bit strings FSA #i[0:4], FSB #i[0:4], and FSC #i[0:4] in a case where the time t=7.

The FS candidate bit strings FSA #i[0:4], FSB #i[0:4], and FSC #i[0:4] of FIG. 30 are 5 bit on the left side of FSA #i, FSB #i, and FSC #i of FIG. 28.

At the time t=7, a branch in which the lower 5 bits are none of the FS candidate bit strings FSA #i[0:4], FSB #i[0:4], and FSC #i[0:4] in the NRZI expression is limited.

Here, before the time t=6, for example, there is a branch b'000_0001_1001 from a state 12=b'00_0000_1100 to a state 25=b'00_0001_1001 in the time-variant trellis.

The branch b'000_0001_1001 is an NRZ expression, but a numerical value b'000_0001_1001 indicating the branch b'000_0001_1001 is b'00_0001_0101 in the NRZI expression.

The lower 5 bits of the branch b'00_0001_0101 in the NRZI expression are b'1_0101, but the 5 bits b'1_0101 do not coincide with any of the FS candidate bit strings FSA #i[0:4], FSB #i[0:4], and FSC #i[0:4] of FIG. 30.

Therefore, the branch b'00_0001_0101 in the NRZI expression is a branch which is unable to be taken as any of extended FS code strings FSA #i, FSB #i, and FSC #i.

Therefore, at the time t=7, the branch b'00_0001_0101 in the NRZI expression, that is, the branch b'000_0001_1001 in the NRZ expression is deleted from the time-variant trellis, and the time-variant trellis is limited to a trellis in which the branch b'000_0001_1001 is unable to be taken.

Then, similarly, at the time t=7, the branch that is unable to be taken as any of the extended FS code string FSA #i, FSB #i, and FSC #i is deleted.

Further, in the state of the time-variant trellis at the time t=7, a state in which there is no branch connection, that is, a state in which there is no state transition from a previous time is deleted.

As described above with reference to FIG. 26, the time-variant trellis limited to 178 states and 288 branches due to the minimum run d=1 is a trellis in which 178 states and 272 branches remain at the time t=7.

Then, similarly, the branch which is unable to be taken as any of the extended FS code strings FSA #i, FSB #i, and FSC #i and the state in which there is no branch connection are deleted at each time of the time-variant trellis, and the time-variant trellis in which the state and the branch (state transition) are limited is completed by the extended FS code strings FSA #i, FSB #i, and FSC #i.

Further, as described with reference to FIG. 29, in a case where the time t=5 is used as a reference, the bit FSC #i(39) of the extended FS code string FSC #i (FIG. 29) among the extended FS code string FSA #i, FSB #i, and FSC #i becomes don't care at the earliest time t=42. Thus, the bits of the extended FS code strings FSA #i, FSB #i, and FSC #i after the time t=42 do not substantially limit the time-variant trellis, similarly to the case until the time t=4.

Therefore, the bit at the latest time affecting the limitation of the time-variant trellis among the extended FS code strings FSA #i, FSB #i, and FSC #i is the bit FSC #i(38) of the extended FS code string FSC #i at the time t=41, but bits with which the bit FSC #i(38) interferes are bits from the bit FSC #i(38) to a (constraint length −1)-th bit after the bit FSC #i(38).

In other words, the bits with which the bit FSC #i(38) interferes are bits from the bit FSC #i(38) to a 10-th bit after the bit FSC #i(38).

Therefore, the last (future) bit with which the bit FSC #i(38) interferes is a bit BL at a time t=50 (=41+10−1) which is a 10-th time from the time t=41 after the time t=41 of the bit FSC #i(38).

As described above, according to the extended FS code strings FSA #i, FSB #i, and FSC #i, the time-variant trellis is limited by the bit at the time t=41 such as the bit FSC #i(38) of the extended FS code string FSC #i until the time t=50.

Therefore, in a case where the time t=5 is used as a reference (in a case where the time t=5 is a time of a bit on the left end of FS #i included in FSA #i), the time-variant trellis is limited by the extended FS code strings FSA #i, FSB #i, and FSC #i from the time t=5 to the time t=50.

Here, the first time (=5) at which the time-variant trellis can be limited by the extended FS code strings FSA #i, FSB #i, and FSC #i is also referred to as a limit start time, and the last the time t (=50) is also referred to as a last limit time.

Note that as described above with reference to FIGS. 29 and 30, the limitation of the time-variant trellis by the extended FS code strings FSA #i, FSB #i, and FSC #i is substantially performed from the time t=7 to the time t=50. In other words, the time-variant trellis is substantially not limited by the extended FS code strings FSA #i, FSB #i, and FSC #i at the reference time t=5 or the next time t=6.

Further, according to a simulation conducted by the inventors of the present application, it was confirmed that the number of sates and branches deleted from the time-variant trellis is decreased by the extended FS code strings FSA #i, FSB #i, and FSC #i at a time close to the limit start time and a time close to the last limit time, and the number of sates and branches deleted from the time-variant trellis is increased by the extended FS code strings FSA #i, FSB #i, and FSC #i at a time away from the limit start time and a time away from the last limit time.

<Special State>

Figure 31:
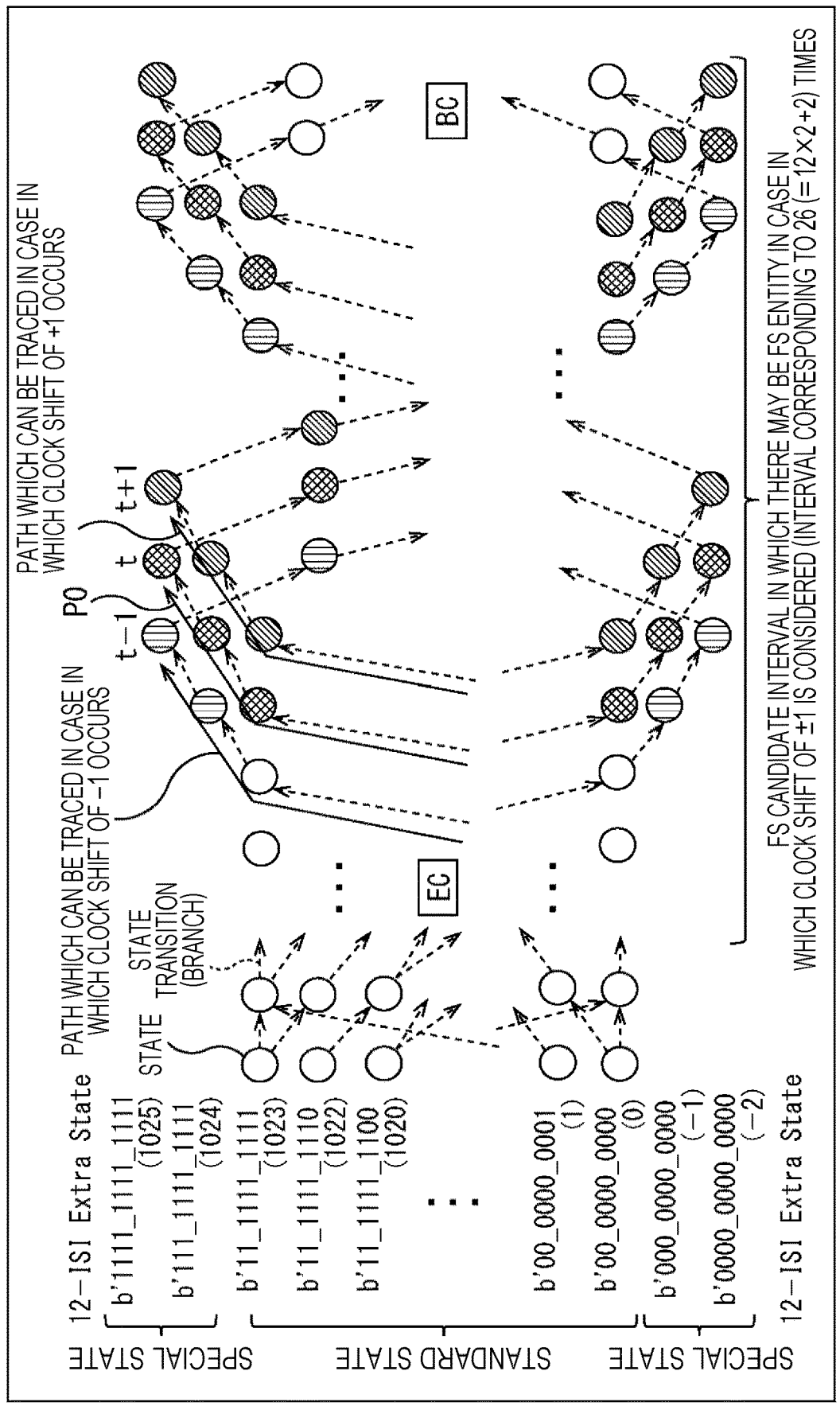
FIG. 31 is a diagram for describing a special state.

FIG. 31 is a diagram for describing a special state.

The time-variant trellis used for the maximum likelihood decoding of the FS can have 1024 ($=2^{10}$) states as the number corresponding to the constraint length as described above with reference to FIG. 25 if there is no any limitation. Here, the time-variant trellis which can have states which correspond in number to the constraint length is also referred to as a standard time-variant trellis.

Meanwhile, as described above with reference to FIG. 12, the FS has the FS entity in which the pattern of the run of 12T which is 1T larger than the maximum run k=11T of the PCWA 110 code (the runs exceeding the maximum run k) is repeated twice.

In a case where the maximum likelihood decoding of the FS is performed in accordance with the standard time-variant trellis, in the standard time-variant trellis, for example, a path of the FS entity including the run of 12T larger than the maximum run k=11T of the PCWA 110 code may be merged with a path of a long run of the PCWA 110 code, for example, a path of (the pattern of) the run of 10T or 11T.

Here, for example, in the PRML with the constraint length of ii, paths of different runs of 10T or more that are the constraint length-1 repeat the state transition to the same state such as the state transition from the state 0x000 to the state 0x000 or the state transition from the state 0x3FF to the state 0x3FF among the 1024 states serving as the number corresponding to the constraint length and are merged into the same state (state 0x000 or 0x3FF).

In the trellis, in a case where the path of the FS entity including the run of 12T longer than the maximum run k=11T of the PCWA 110 code and the path of the run of 10T or more of the PCWA 110 code are merged, the detection accuracy of the FS entity, eventually the FS deteriorates.

In this regard, in order to improve the detection accuracy of the FS (FS entity), the special state is introduced to the standard time-variant trellis.

Here, the number of states corresponding to the constraint length that the standard time-variant trellis can have is also referred to as a normal state. Further, a trellis obtained by introducing the special state into the standard time-variant trellis is also referred to as an extended time-variant trellis.

As the special state, a state which paths of runs of respective lengths from the run of the length of the constraint length to the run of 12T of the FS entity reach so that the paths of the runs of the respective lengths from the run of the constraint length-1 to the run of 12T of the FS entity are not merged is introduced.

Therefore, in the present embodiment, a state which a path of a run of 0s of 11T reaches, a state which a path of a run of is of 11T reaches, a state which a path of a run of 0s of 12T reaches, and a state which a path of a run of is of 12T reaches are introduced as the special states.

Here, the state which the path of the run of 0s of 11T reaches is indicated as a (special) state −1 or a state b'000_0000_0000, and the state which the path of the run of 1s of 11T reaches is indicated as a (special) state 1024 or a state b'111_1111_111. Further, the state which the path of the run of 0s of 12T reaches is indicated as a (special) state −2 or a state b'0000_0000_0000, and the state which the path of the run of is of 12T reaches is indicated as a (special) state 1025 or a state b'1111_1111_1111.

As described above, according to the extended time-variant trellis to which the special states −2, −1, 1024, and 1025 are introduced, it is possible to suppress the paths of the runs of the respective lengths of the run of 10T, the run of 11T, and the run of 12T of the FS entity from being merged.

In other words, in the extended time-variant trellis, for example, the path of the run of 1s of 10T reaches the state 1023, the path of the run of 1s of 11T reaches the state 1024, -and the path of the run of 1s of 12T reaches the state 1025.

Therefore, it is possible to prevent the path of the run of 10T, the path of the run of 11T, or the path of the run of 12T from being merged into the same state, and it is possible to improve the detection accuracy of the FS (FS entity).

For example, in a case where the clock shift does not occur, a path P0 of a first run of 12T out of two runs of 12T included in the FS entity reaches the special state 1025 at the time t. The path P0 reaches the special state 1025 via the state 1023 and further the special state 1024.

As described above, in a case where the clock shift does not occur, the path P0 reaches the special state 1025 at the time t, and for example, in a case where the clock shift of −1 clock occurs, the path P0 reaches the special state 1025 at a time t−1 which is an immediately previous time.

Further, for example, in a case where the clock shift of +1 clock occurs, the path P0 reaches the special state 1025 at a time t+1 which is the very next time.

Therefore, it is possible to detect an amount and a direction of the clock shift in accordance with the time at which the path P0 reaches the special state 1025 (the last time of the first run of 12T out of two runs of 12T included in the FS entity).

Note that in the PCWA 110 code, in addition to the limitation of the minimum run d=1 and the maximum run k=10, there is a limitation that the RMTR is 2.

The extended time-variant trellis can be limited in accordance with the RMTR of 2 in addition to the minimum run d=1 and the extended FS code strings FSA #i, FSB #i, and FSC #i.

In a case where the extended time-variant trellis is limited by the minimum run d=1, the extended FS code strings FSA #i, FSB #i, and FSC #i, and the RMTR of 2, a maximum of the number of states which can be taken by the extended time-variant trellis at each time is 170, and a maximum of the number of branches which can be taken is 272.

<Configuration Example of Restoring Unit 35>

Figure 32:
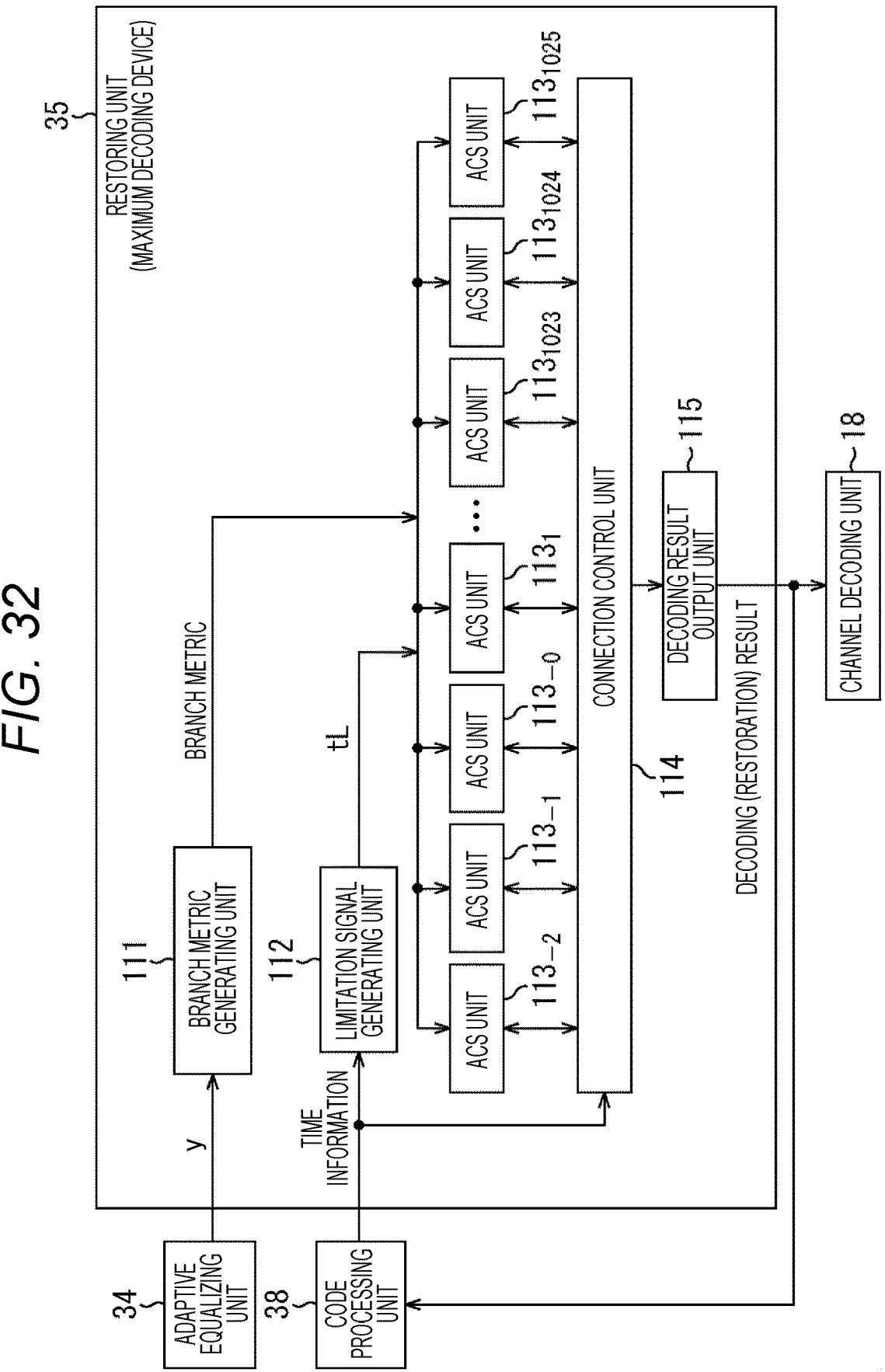
FIG. 32 is a block diagram illustrating a configuration example of a restoring unit 35.

FIG. 32 is a block diagram illustrating a configuration example of the restoring unit 35 of FIG. 4.

In other words, FIG. 32 illustrates a configuration example of a portion of the restoring unit 35 that can function as a maximum likelihood decoding apparatus that performs the maximum likelihood decoding in accordance with the extended time-variant trellis.

In FIG. 32, the restoring unit 35 serving as the maximum likelihood decoding apparatus includes a branch metric generating unit 111, a limitation signal generating unit 112, an add compare select (ACS) unit 113*i*, a connection control unit 114, and a decoding result output unit 115.

The equalized signal y is supplied from the adaptive equalizing unit 34 (FIG. 4) to the branch metric generating unit 111.

The branch metric generating unit 111 generates a branch metric $bm_j$ of the branch from the state j to the state i in accordance with Formula (3) using the equalized signal y from the adaptive equalizing unit 34.

$$bm_j = (y - \Sigma a_m \times d(j,i)_{CL-1-m})^2 \qquad (3)$$

In Formula (3), am indicates an (m+1)-th coefficient of an impulse response sequence of a PR channel (an (m+1)-th coefficient $a_m$ of $Pr(a_0, a_1, \ldots, $ and $a_{CL-1})$). $d(j, i)_k$ indicates (k+1)-th input data ((k+1)-th new input data) among time-series input data corresponding to CL latest times for the path including the branch from the state j to the states i (k=0, 1, ..., CL-1). CL indicates the constraint length of the PR channel. Σ indicates a summation obtained by replacing m with an integer ranging from 0 to CL-1.

According to Formula (3), the branch metric $bm_j$ is obtained as a square of a difference between the equalized signal y and a reference level $\Sigma a_m \times d(j, i)_{CL-1-m}$ obtained by convoluting the time-series input data $d(j, i)_0$, $d(j, i)_1$, ..., and $d(j, i)_{CL-1}$ corresponding to the CL latest times for the impulse response sequence $a_0, a_1, \ldots,$ and $a_{CL-1}$ of the PR channel and the path including the branch from the state j to the state i.

Here, the reference level $\Sigma a_m \times d(j, i)_{CL-1-m}$ can be obtained in advance for all pieces of time series input data $d(j, i)_0$, $d(j, i)_1, \ldots,$ and $d(j, i)_{CL-1}$ corresponding to the CL times.

For each state i which can be taken by the extended time-variant trellis, the branch metric generating unit 111 calculates the branch metric $bm_j$ of the branch that can be taken as the branch to the state i, and supplies the branch metric $bm_j$ to the ACS unit 113$_i$ corresponding to the state i.

Time information is supplied from the time information generating unit 62 (FIG. 6) of the code processing unit 38 to the limitation signal generating unit 112.

Here, the time information supplied from (the time information generating unit 62 of) the code processing unit 38 to the limitation signal generating unit 112 indicates, for example, as described with reference to FIG. 29, the time t in which the 3-rd bit time from the left of the extended FS code string FSA #i is the time t=5 and is a time in which (the position estimated as) the FS is used as the reference.

The limitation signal generating unit 112 generates a limitation signal tL of limiting the extended time-variant trellis in accordance with the minimum run d of the PCWA 110 code, the RMTR, and the extended FS code strings FSA #i, FSB #i, and FSC #i in accordance with the time t indicated by the time information from (the time information generating unit 62 of) the code processing unit 38, and supplies the limitation signal tL to the ACS unit 113.

The ACS unit 113$_i$ controls selection of the state metric of the state at the current time and selection of a survival path surviving to the state at the current time in accordance with the limitation signal tL, so that the maximum likelihood decoding of the FS is performed in accordance with the extended time-variant trellis limited in accordance with the minimum run d of the PCWA 110 code, the RMTR, and the extended FS code strings FSA #i, FSB #i, and FSC #i.

In other words, for example, for each of the state j=j0, j1, and j2 which corresponding to the state i of the extended time-variant trellis and is one or more states at an immediately previous time, the ACS unit 113$_i$ adds the branch metric $sm_j$ of the state j and the branch metric $bm_j$ of the branch to the state i at the current time, and obtains candidates of the state i at the current time.

Further, the ACS unit 113$_i$ compares the candidates of the state metric of the state i at the current time, and selects a candidate having the smallest value from the candidates of the state metric as a state metric $sm_i$ of the state i at the current time.

Further, the ACS unit 113$i$ selects the survival path that survives to the state i at the current time from the survival path to the state j=j0, j1, and j2 at an immediately previous time.

In other words, in order to obtain the state metric $sm_i$ of the state i at the current time from the state j=j0, j1, and j2 at an immediately previous time, the ACS unit 113$_i$ sets the state j in which the state metric $sm_j$ is used as a survival state, and selects a path in which a branch from the surviving state j to the state i at the current time is connected to the survival path to the survival state j as the survival path surviving to the state i at the current time.

As described above, the ACS unit 113$_i$ performs the selection of the state metric $sm_i$ of the state i at the current time and the selection of the survival path surviving to the state i at the current time, but these selections are controlled in accordance with the limitation signal tL from the limitation signal generating unit 112. Under the control according to the limitation signal T1, the extended time-variant trellis used for the maximum likelihood decoding of the FS is limited in accordance with the minimum run d=1, the extended FS code strings FSA #i, FSB #i, and FSC #i, and the RMTR.

The ACS unit 113$_i$ corresponds to the state i which can be taken by the extended time-variant trellis. Therefore, the restoring unit 35 includes the ACS units 113$_i$ which are equal in number to the states which can be taken by the extended time-variant trellis.

The ACS units 113$_i$ corresponding to 1028 states which is a sum of 1024 (=$2^{10}$) states which correspond in number to the constraint length 11 and the special states –2, –1, 1-24, and 1025 described above with reference to FIG. 31 are installed in the restoring unit 35, and thus the restoring unit 35 can perform the maximum likelihood decoding on an arbitrary PR with the constraint length of 11 in addition to the maximum likelihood decoding of the FS according to the extended time-variant trellis.

Hereinafter, for the sake of simplicity of description, the restoring unit 35 is assumed to include the ACS units 113$_i$ corresponding to 1028 states which is a sum of 1024 (=$2^{10}$) states which correspond in number to the constraint length 11 and the special states –2, –1, 1-24, and 1025.

The time information is supplied from the time information generating unit 62 (FIG. 6) of the code processing unit 38 to the connection control unit 114.

The connection control unit 114 controls a connection between an arbitrary ACS unit 113$_i$ and an ACS unit 113$_j$ in accordance with the time t indicated by the time information from (the time information generating unit 62 of) the code processing unit 38 such that data exchange can be performed between the ACS unit 113$_i$ and the ACS unit 113$_j$.

Further, the connection control unit 114 controls a connection between an arbitrary ACS unit 113$_i$ and the decoding result output unit 115 in accordance with the time t indicated by the time information from the code processing unit 38 such that data exchange can be performed between the ACS unit 113$_i$ and the decoding result output unit 115.

The decoding result output unit 115 receives the state metric $sm_i$ of each state i from the ACS unit 113$_i$ via the connection control unit 114, and recognizes the state i in which the state metric $sm_i$ is smallest.

Further, the decoding result output unit 115 receives the survival path surviving to the state i from the ACS unit 113$_i$ corresponding to the state i having the smallest state metric $sm_i$, obtains the bit sequence serving as the decoding result of the maximum likelihood decoding in accordance with the survival path, and outputs the bit sequence to the channel decoding unit 18 (FIG. 1) and the code processing unit 38 (FIG. 4).

<Configuration Example of ACS Unit $113_i$>

Figure 33:
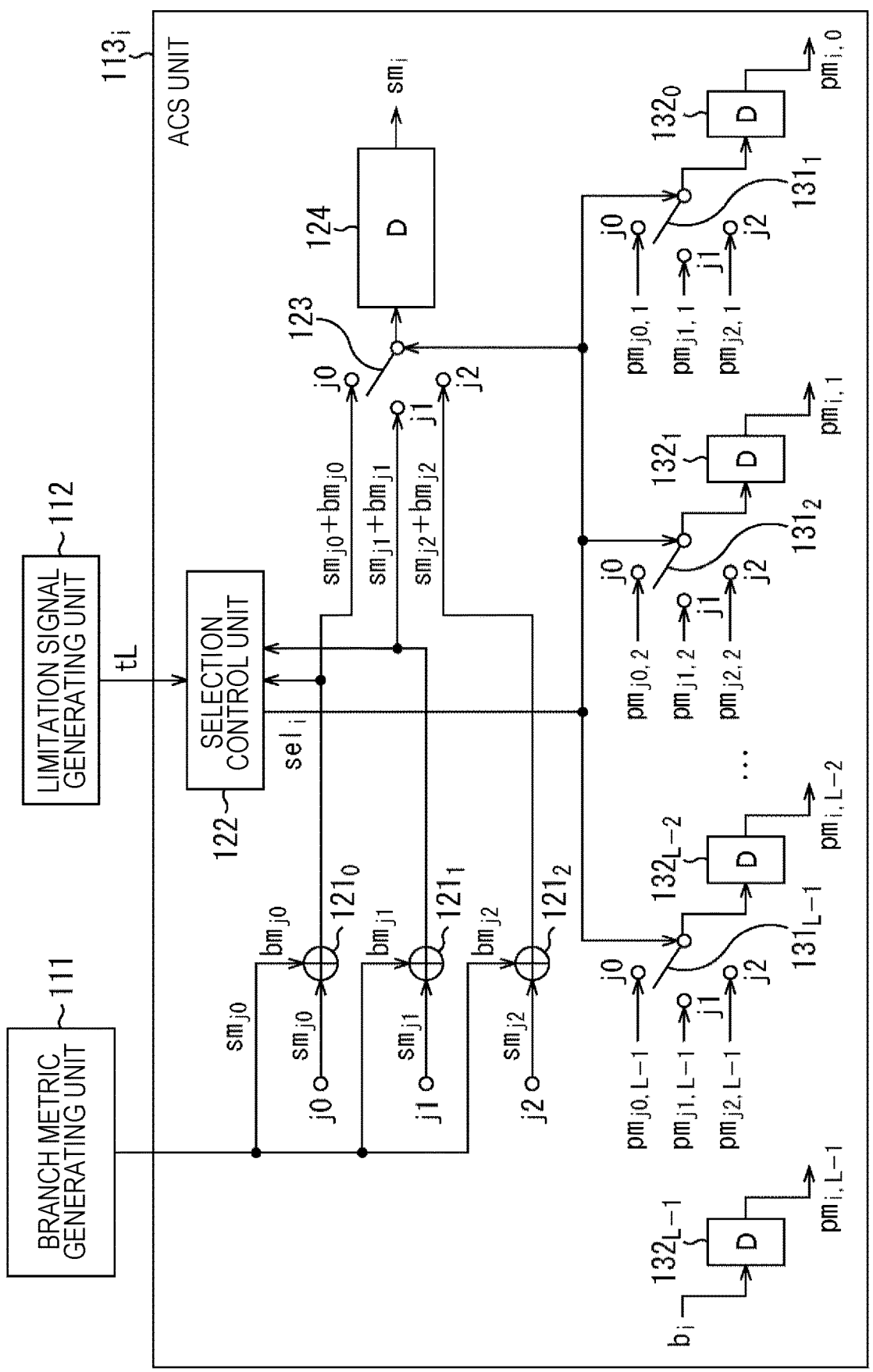
FIG. 33 is a block diagram illustrating a configuration example of an ACS unit $113_j$.

FIG. 33 is a block diagram illustrating a configuration example of the ACS unit $113_i$ of FIG. 32.

In FIG. 33, the ACS unit $113_i$ includes calculating units $121_0$, $121_1$, and $121_2$, a selection control unit 122, a selector 123, a state metric memory 124, selectors $131_1$, $131_2$, ..., and $131_{L-1}$, and bus memory $132_0$, $132_1$, ..., and $132_{L-1}$.

The calculating unit $121_k$ (k=0, 1, and 2) includes a terminal j #k. A state metric $sm_{j\ \#k}$ of a state j #k at an immediately previous time stored in the state metric memory 124 of the ACS unit $113_{j\ \#k}$ corresponding to the states j #k is supplied to the terminal j #k of the calculating unit $121_k$ via the connection control unit 114 (FIG. 32).

Here, the state metric memory 124 of the ACS unit $113_{j\ \#k}$ corresponding to the state j #k which can transition to the state i at the current time is connected to the terminal j #k of the calculating unit $121_k$ in accordance with the extended time-variant trellis by the connection control unit 114.

Further, the branch metric $bm_{j\ \#k}$ of the branch from the state j #k to the states i is supplied from branch metric generating unit 111 (FIG. 32) to the calculating unit $121_k$.

The calculating unit $121_k$ adds the state metric $sm_{j\ \#k}$ supplied to the terminal j #k of the calculating unit $121_k$ and the branch metric $bm_{j\ \#k}$ from the branch metric generating unit 111, obtains a candidate $sm_{j\ \#k}+bm_{j\ \#k}$ of the state metric of the state i at the current time, and supplies the candidate $sm_{j\ \#k}+bm_{j\ \#k}$ to the terminal j #k of the selector 123.

Further, the calculating units $121_0$ and $121_1$ supply the candidates $sm_{j0}+bm_{j0}$ and $sm_{j1}bm_{j1}$ of the state metric of the state i at the current time to the selection control unit 122.

The limitation signal tL is supplied from the limitation signal generating unit 112 (FIG. 32) to the selection control unit 122.

The selection control unit 122 generates a selection signal $sel_i$ in response to the limitation signal tL from the limitation signal generating unit 112. Further, the selection control unit 122 supplies the selection signal $sel_i$ to the selector 123 and the selectors $131_1$ to $131_{L-1}$, and controls the selection of the terminal j #k of the selector 123 and the selection of the terminal j #k of each of the selectors $131_1$ to $131_{L-1}$.

Further, the selection control unit 122 also generates the selection signal $sel_i$ in accordance with the candidates $sm_{j0}+bm_{j0}$ and $sm_{j1}bm_{j1}$ of the state metric of the state i at the current time from each of the calculating units $121_0$ and $121_0$ if necessary.

The selection of the terminal j #k of the selector 123 corresponds to the selection of state metric $sm_i$ of the state i at the current time, and the selection of the terminal j #k of each of the selectors $131_1$ to $131_{L-1}$ corresponds to the survival path to the state i at the current time.

The selector 123 selects the terminal j #k of the selector 123 in accordance with the selection signal seli from the selection control unit 122, so that the candidate $sm_{j\ \#k}+bm_{j\ \#k}$ of the state metric supplied to the terminal j #k is selected as the state metric $sm_i$ of the state i at the current time.

The selector 123 then supplies the state metric $sm_i$ of the state i at the current time to the state metric memory 124.

The state metric memory 124 stores the state metric $sm_i$ of the state i at the current time from the selector 123.

The selector $131_r$ (r=1, 2, ..., and L−1) includes a terminal j #k. Here, L indicates a bus memory length. Branch information $pm_{j\ \#k,r}$ indicating the branch constituting the survival path to the states j #k at the immediately previous time which is stored in the bus memory $132_r$ of the ACS unit $113_{j\ \#k}$ is supplied to the terminal j #k of selector $131_r$ via the connection control unit 114 (FIG. 32).

In other words, similarly to the terminal j #k of the calculating unit $121_k$, the bus memory $132_r$ of the ACS unit $113_{j\ \#k}$ corresponding to the state j #k which can transition to the state i at the current time in accordance with the extended time-variant trellis is connected to the terminal j #k of the selector $131_r$ via the connection control unit 114.

Note that in the present embodiment, the ACS unit $113_{j\ \#k}$ connected to the calculating unit $121_k$ and the terminal j #k of the selector $131_r$ is set in advance in accordance with the extended time-variant trellis.

In other words, the ACS unit $113_{j0}$ corresponding to a state (a normal state or a special state) j0 having a number equal to or smaller than a number of the state i among the states that can transition to the state i corresponding to the ACS unit $113_i$ is connected to the terminal j0 in accordance with the extended time-variant trellis, and the ACS unit $113_{j1}$ corresponding to a state (a normal state or a special state) j1 having a number larger than a number of the state i among the states that can transition to the state i corresponding to the ACS unit $113_i$ is connected to the terminal j1 in accordance with the extended time-variant trellis.

Only the ACS unit $113_{j2}$ corresponding to the special state j2 can be connected to the terminal j2 in accordance with the extended time-variant trellis.

The selector $131_r$ selects the terminal j #k of the selector $131_r$ in accordance with the selection signal $sel_i$ from the selection control unit 122, so that the branch information $pm_{j\ \#k,r}$ of the branch constituting the survival path to the state j #k at the immediately previous time which is supplied to the terminal j #k is selected as the branch information $pm_{i,r-1}$ of the branch constituting the survival path surviving to the states i at the current time.

The selector $131_r$ then supplies the branch information $pm_{i,r-1}$ of the branch constituting the survival path surviving to the state i at the current time to the bus memory $132_{r-1}$.

The bus memories $132_r$ which are bus memory $132_0$ to $131_{L-2}$ among the bus memories $132_r$ (r=0, 1, ..., and L−1) store the branch information $pm_{i,r+1}$ of the branch constituting the survival path surviving to the state i at the current time which is supplied from the selector $131_{r+1}$.

The bus memory $132_{L-1}$ stores branch information $b_i$ indicating the branch from the state j #k to the states i.

Here, the branch information $b_i$ of the branch from the state j #k to the state i is uniquely determined by the state i to which the state transition is directed and is equal to the least significant bit of the binary number indicating the state i.

The selector 131, selects the branch information $pm_{j\ \#k,r}$ of the branch constituting the survival path to the state j #k at the immediately previous time as the branch information $pm_{i,r-1}$ of the branch constituting the survival path surviving to the state i at the current time, stores the branch information $pm_{i,r-1}$ in the bus memories $132_0$ to $131_{L-2}$, stores the branch information $b_i$ indicating the branch from the state j #k to the state i in the bus memory $132_{L-1}$, and updates storage content of the bus memories $132_0$ to $131_{L-1}$ to (the branch constituting) the survival path to the state i. A process of updating the storage content of the bus memories $132_0$ to $131_{L-1}$ is referred to as register exchange.

In the ACS unit $113_i$ configured as described above, the selectors 123 and 131, select the terminal j #k in accordance with the selection signal $sel_i$ from the selection control unit 122 as described above, but the selection signal $sel_i$ is generated in accordance with the limitation signal tL from the limitation signal generating unit 112.

In the present embodiment, there are five types of limitation signals tL from the limitation signal generating unit 112 (tL=0, 1, 2, 3, and 4).

In a case where the limitation signal tL=0, the selection control unit 122 outputs the selection signal $sel_i=-1$ while regarding that the state i corresponding to the ACS unit $131_i$ is invalid (does not exist). In a case where the selection signal $sel_i=-1$, the selectors 123 and $131_r$ stop their operations (do not perform the selection of the terminal j #k).

In a case where the limitation signal tL=1, the selection control unit 122 outputs the selection signal $sel_i=0$ for giving an instruction to select the terminal j0. In a case where the selection signal $sel_i=0$, the selectors 123 and $131_r$ select the terminal j0.

In a case where the limitation signal tL=2, the selection control unit 122 outputs the selection signal $sel_i=1$ for giving an instruction to select the terminal j1. In a case where the selection signal seli=1, the selectors 123 and $131_r$ select the terminal j1.

In a case where the limitation signal tL=3, the selection control unit 122 outputs the selection signal $sel_i=0$ or 1 for giving an instruction to select the terminal j #k to which the candidate $sm_{j\ \#k}+bm_{j\ \#k}$ which is smaller in the state metric of the state i at the current time from each of the calculating units $121_0$ and $121_0$ among the candidates $sm_{j0}+bm_{j0}$ and $sm_{j1}bm_{j1}$ is supplied out of the terminals j0 and j1. As described above, in a case where the selection signal $sel_i=0$, the selectors 123 and $131_r$ select the terminal j0, and in a case where the selection signal $sel_i=1$, the selectors 123 and $131_r$ select the terminal j1.

In a case where the limitation signal tL=4, the selection control unit 122 outputs the selection signal $sel_i=2$ for giving an instruction to select the terminal j2. In a case where the selection signal $sel_i=2$, the selectors 123 and $131_r$ select the terminal j2.

Here, the selection of the terminal j0 of the selectors 123 and $131_r$ corresponds to the selection of the branch from the state j0 corresponding to the ACS unit $113_{j0}$ connected to the terminal j0 to the state i, and the selection of the terminal j1 corresponds to the selection of the branch from the state j1 corresponding to the ACS unit $113_{j1}$ connected to the terminal j1 to the state i. Further, the selection of the terminal j2 corresponds to the selection of the branch from the state (special state) j2 corresponding to the ACS unit $113_{j2}$ connected to the terminal j2 to the state i.

<Time Information Generation Process>

Figure 34:
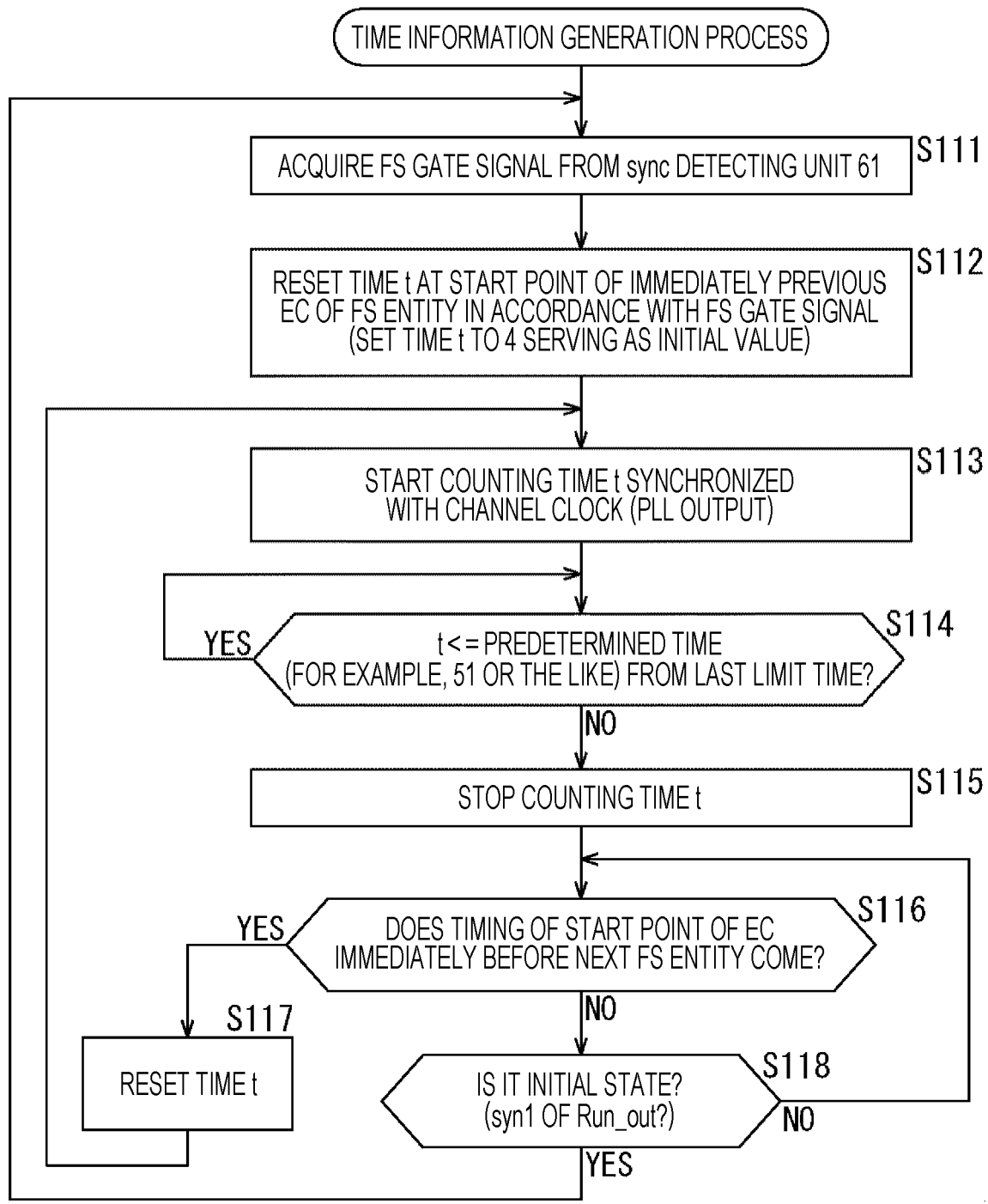
FIG. 34 is a flowchart illustrating an example of a time information generation process performed by a time information generating unit 62 of a code processing unit 38.

FIG. 34 is a flowchart illustrating an example of the time information generation process performed by the time information generating unit 62 of the code processing unit 38 of FIG. 6.

In step S111, the time information generating unit 62 is on standby for the supply of the FS gate signal indicating the interval of the FS of the frame frame1 at the head of the RUB (FIG. 9) from the sync detecting unit 61, and receives and acquires the FS gate signal, and the process proceeds to step S112.

In step S112, the time information generating unit 62 recognizes the timing of the start point of the EC immediately before the FS entity of the FS of the frame frame1 in accordance with the FS gate signal from the sync detecting unit 61. Then, the time information generating unit 62 resets the time t to, for example, 4 which is the initial value at the timing of the start point of the EC immediately before the FS entity of FS of the frame frame1 (the timing which is 9T earlier than the FS entity), and the process proceeds from step S112 to step S113.

Here, the RUB including the frame frame1 including the FS indicated by the FS gate signal from the sync detecting unit 61 is also referred to as a RUB of interest.

In step S113, the time information generating unit 62 starts counting the time t synchronized with the channel clock output from the PLL 32 (FIG. 4) and outputting the time information indicating the time t, and the process proceeds to step S114.

In step S114, the time information generating unit 62 determines whether or not the time t is a time after the last limit time in which the extended time-variant trellis can be limited (in the present embodiment, the time t=50 described above with reference to FIGS. 29 and 30), for example, a time within 51.

In a case where it is determined in step S114 that the time t is a time within 51, the process returns to step S114, and a similar process is repeated. In this case, the counting the time t and the outputting the time information indicating the time t are continued.

On the other hand, in a case where it is determined in step S114 that the time t is not a time within 51, the process proceeds to step S115, and the time information generating unit 62 stops counting the time t and outputting the time information indicating the time t, and the process proceeds to step S116.

In step S116, the time information generating unit 62 determines whether or not the timing of the start point of the EC immediately before the FS entity of the FS of the frame next to the RUB of interest (the timing which is 9T earlier than the FS entity) comes.

Here, as illustrated in FIG. 9, in the RUB, the FS of the frame is followed by the frame data of 3,600 cbits, and then the FS of the next frame follows.

In this regard, the time information generating unit 62 counts the channel clocks corresponding to the frame data of 3, 600 cbits, that is, the channel clocks of 3, 600 clocks after the end of the FS, and determines whether or not the timing of the start point of the EC immediately before the FS entity of the FS of the frame next to the RUB of interest comes.

In a case where it is determined in step S116 that the timing of the start point of the EC immediately before the FS entity of the FS of the frame next to the RUB of interest comes, the process proceeds to step S117.

In step S117, the time information generating unit 62 resets the time t to 4 which is as the initial value at the timing of the EC start point immediately before the FS entity of the FS of the frame next to the RUB of interest, similarly to step S112, the process returns to step S113, and a similar process is repeated thereafter.

In addition, in a case where it is determined in step S116 that the timing of the start point of the EC immediately before the FS entity of the FS of the frame next to the RUB of interest does not come, the process proceeds to step S118.

In step S118, the time information generating unit 62 determines whether or not the reproduction of Run_out (syn1) of the RUB of interest ends, that is, whether or not the sync detecting unit 61 returns to the initial state from the sync area potential state described above with reference to FIG. 22.

In a case where it is determined in step S118 that the sync detecting unit 61 does not return to the initial state, the process returns to step S116, and a similar processing is repeated thereafter.

In addition, in a case where it is determined in step S118 that the sync detecting unit 61 returns to the initial state, that is, in a case where the reproduction of the RUB of interest ends, and the reproduction of the next RUB is started, the process returns to step S111, and a similar processing is repeated thereafter.

According to the time information generation process described above, ideally, the time information generating unit 62 resets the time t to 4 at the timing of the start point of the EC immediately before the FS entity (the timing which is 9T earlier than the FS entity), starts counting the time t synchronized with the channel clock, and repeats counting the time t until, for example, 51 which is the time after 50 which is the last limit time.

<Maximum Likelihood Decoding Process>

Figure 35:
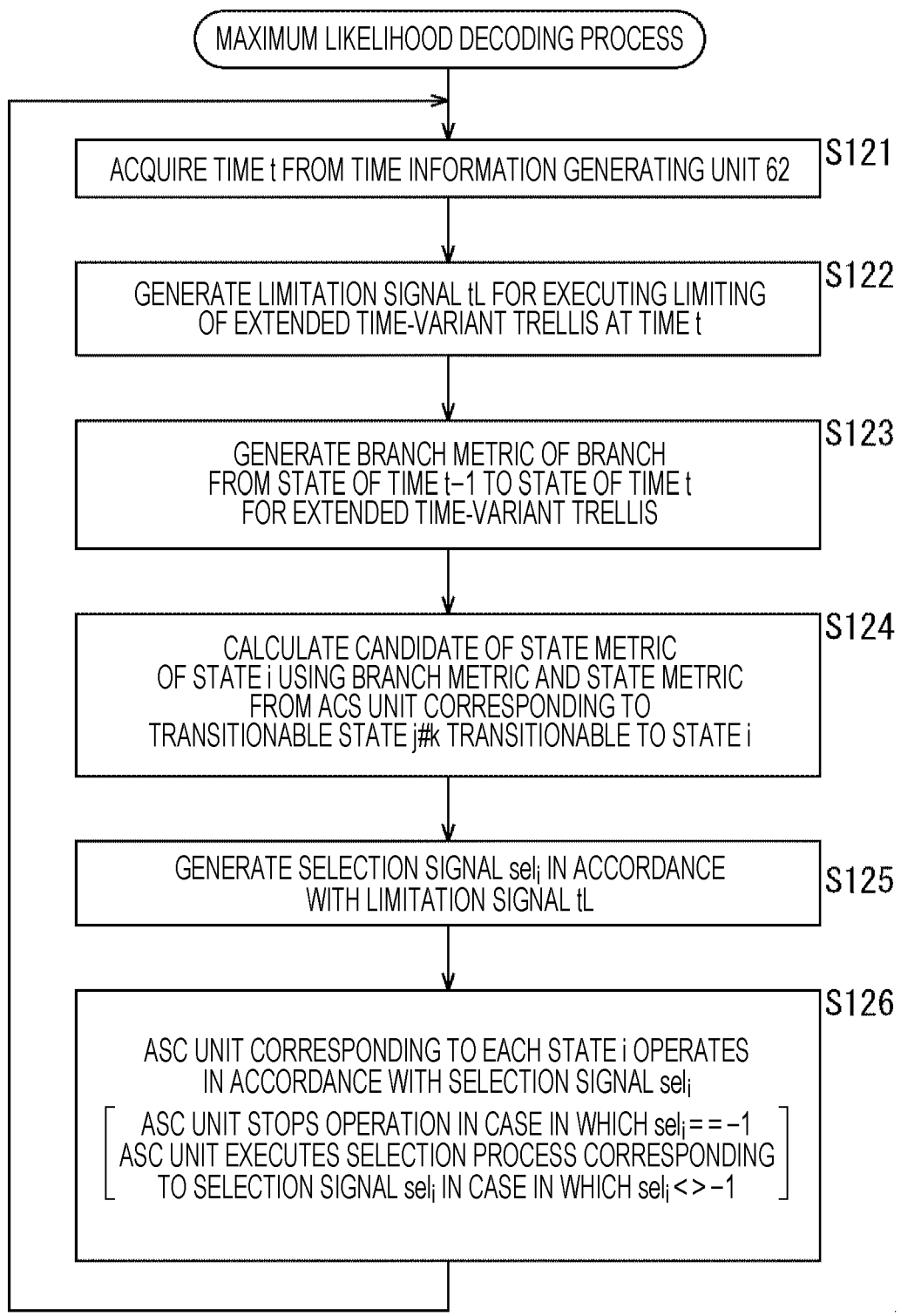
FIG. 35 is a flowchart for describing a maximum likelihood decoding process performed by a restoring unit 35 serving as a maximum likelihood decoding apparatus.

FIG. 35 is a flowchart illustrating the maximum likelihood decoding process performed by the restoring unit 35 serving as the maximum likelihood decoding apparatus of FIG. 32.

In step S121, the limitation signal generating unit 112 and the connection control unit 114 are on standby for the supply of the time information (the time t indicated by the time information) from the time information generating unit 62 (FIG. 6) of the code processing unit 38, and acquires the time information, and the process proceeds to step S122.

Here, hereinafter, the connection control unit 114 is assumed to connect the ACS unit $113_i$ and the ACS unit $113_j$ corresponding to the state i and the state j from which the state transition can be performed with the extended time-variant trellis in accordance with the time t indicated by the time information from the time information generating unit 62 so that data exchange be performed between the ACS unit $113_i$ and the ACS unit $113_j$.

In other words, in the connection control unit 114, the terminal j #k of the calculating unit $121_k$ of the ACS unit $113_i$ and the state metric memory 124 of the ACS unit $113_{j \ \#k}$ are connected, and the terminal j #k of the selector $131_r$ of the ACS unit $113_i$ and the bus memory $132_r$ of the ACS unit $113_{j \ \#k}$ are connected.

In step S122, the limitation signal generating unit 112 generates the limitation signal tL for limiting (the time transition of) the extended time-variant trellis at the (current) time t indicated by the time information from the time information generating unit 62 for each state i existing at the time t. Further, the limitation signal generating unit 112 supplies the limitation signal tL generated for each state i existing at the time t to the ACS unit $113_i$ corresponding to each state i, and the process proceeds from step S122 to step S123.

In step S123, the branch metric generating unit 111 can transition to each state i existing at the time t, and generates the branch metric $bm_j$ of the branch from the state j at the time t−1 to the states i through a calculation according to Formula (3). Further, the branch metric generating unit 111 supplies the branch metric $bm_j$ of the branch from the state j to the state i to the ACS unit $113_i$ corresponding to the state i, and the process proceeds from step S123 to step S124.

In steps S124 to S126, the ACS unit $113_i$ corresponding to each state i existing in the extended time-variant trellis performs an ACS process.

In other words, in step S124, the calculating unit $121_k$ of the ACS unit $113_i$ obtains the candidate $sm_{j \ \#k} + bm_{j \ \#k}$ of the state metric of the state i at the current time t by adding the state metric $sm_{j \ \#k}$ from the ACS unit $113_{j \ \#k}$ corresponding to the state (transitionable state) j #k which can transition to the state i which is supplied to the terminal j #k of the calculating unit $121_k$ to the branch metric $bm_{j \ \#k}$ from the branch metric generating unit 111. Further, the calculating unit $121_k$ supplies the candidate $sm_{j \ \#k} + bm_{j \ \#k}$ of the state metric of the state i at the current time t to the terminal j #k of the selector 123, and the process proceeds from step S124 to step S125.

Note that the calculating units $121_0$ and $121_1$ also supply the candidates $sm_{j0} + bm_{j0}$ and $sm_{j1} bm_{j1}$ of the state metric of the state i at the current time to the selection control unit 122.

In step S125, the selection control unit 122 generates the selection signal $sel_i$ using the limitation signal tL from the limitation signal generating unit 112 and using the candidates $sm_{j0} + bm_{j0}$ and $sm_{j1} b_{m1}$ of the state metric of the state i at the current time from the calculating units $121_0$ and $121_1$ if necessary. Further, the selection control unit 122 supplies the selection signal $sel_i$ to the selector 123 and the selector $131_r$, and the process proceeds from step S125 to step S126.

In step S126, the ACS unit $113_i$ operates in accordance with the selection signal $sel_i$ generated by the selection control unit 122.

In a case where the selection signal $sel_i = -1$, the ACS unit $113_i$ stops its operation. Therefore, the selectors 123 and $131_r$ of the ACS unit $113_i$ also stop their operations (do not perform the selection of the terminal j #k).

In a case where the selection signal $sel_i < >-1$, the ACS unit $113_i$ performs the following selection process in accordance with the selection signal $sel_i$.

In other words, in a case where the selection signal $sel_i = 0$, the selectors 123 and $131_r$ select the terminal j0, so that the state j0 is selected as the state of the transition source of the state transition (branch) to the state i corresponding to the ACS unit $113_i$ at the current time t.

Then, the selector 123 selects the terminal j0, so that the candidate $sm_{j0} + bm_{j0}$ obtained using the state metric $sm_{j0}$ of the state j0 of the transition source among the candidates $sm_{j \ \#k} + bm_{j \ \#k}$ of the state metric of the state i at the current time t is supplied to and stored in the state metric memory 124 as the state metric $sm_i$ of the state i at the current time t via the selector 123.

Further, the selector $131_r$ selects the terminal j0, so that the register exchange of updating the storage content of bus memories $132_0$ to $131_{L-1}$ is performed. In other words, the branch information $pm_{j0,r}$ from the ACS unit $113_{j0}$ corresponding to the state j0 of the transition source is supplied to and stored in the bus memory $132_{r-1}$ (r=1, 2, ... L−1) via the selector $131_r$. Further, the branch information $b_i$ indicating the branch from the state j0 of the transition source to the state i is stored in the bus memory $132_{L-1}$.

In a case where the selection signal $sel_i = 1$, the selectors 123 and $131_r$ select the terminal j1, so that the state j1 is selected as the state of the transition source of the state transition (branch) to the states i corresponding to the ACS unit $113_i$ at the current time t.

Then, the selector 123 selects the terminal j1, so that so that the candidate $sm_{j1} + bm_{j1}$ obtained using the state metric $sm_{j1}$ of the state j1 of the transition source among the candidates $sm_{j \ \#k} + bm_{j \ \#k}$ of the state metric of the state i at the current time t is supplied to and stored in the state metric memory 124 as the state metric $sm_i$ of the state i at the current time t via the selector 123.

Further, the selector $131_r$ selects the terminal j1, so that the register exchange of updating the storage content of bus memories $132_0$ to $131_{L-1}$ is performed. In other words, the branch information $pm_{j1,r}$ from the ACS unit $113_{j1}$ corresponding to the state j1 of the transition source is supplied to and stored in the bus memory $132_{r-1}$ (r=1, 2, ... L−1) via the selector $131_r$. Further, the branch information $b_i$ indicating the branch from the state j1 of the transition source to the state i is stored in the bus memory $132_{L-1}$.

In a case where the selection signal $sel_i=2$, the selectors 123 and $131_r$ select the terminal j2, so that the state j2 is selected as the state of the transition source of the state transition (branch) to the states i corresponding to the ACS unit $113_i$ at the current time t.

Then, the selector 123 selects the terminal j2, so that so that the candidate $sm_{j2}+bm_{j2}$ obtained using the state metric $sm_{j2}$ of the state j2 of the transition source among the candidates $sm_{j\#k}+bm_{j\#k}$ of the state metric of the state i at the current time t is supplied to and stored in the state metric memory 124 as the state metric $sm_i$ of the state i at the current time t via the selector 123.

Further, the selector $131_r$ selects the terminal j2, so that the register exchange of updating the storage content of bus memories $132_0$ to $131_{L-1}$ is performed. In other words, the branch information $pm_{j2,r}$ from the ACS unit $113_{j2}$ corresponding to the state j2 of the transition source is supplied to and stored in the bus memory $132_{r-1}$ (r=1, 2, ... L−1) via the selector 131r. Further, the branch information $b_i$ indicating the branch from the state j2 of the transition source to the state i is stored in the bus memory $132_{L-1}$.

Thereafter, the process returns from step S126 to step S121, and the process of steps S121 to S126 is repeated thereafter.

As the process of steps S121 to S126 is repeated, the state metric $sm_i$ of the state i stored in the state metric memory 124 of the ACS unit 113, corresponding to each state i and the branch information $pm_{i,r}$ stored in the bus memory $132_r$ are appropriately supplied to the decoding result output unit 115 via the connection control unit 114.

The decoding result output unit 115 recognizes the state i (min) having the smallest state metric $sm_i$ from among the state metrics $sm_i$ of the respective states i from the ACS units $113_i$ of the respective states i.

Further, the decoding result output unit 115 acquires the branch information $pm_{i,r}$ stored in the bus memory $132_r$ from the ACS unit $113_{(min)}$ corresponding to the state i (min) having the smallest state metric $sm_i$ via the connection control unit 114. Then, the decoding result output unit 115 sets the path configured with the branch information $pm_{i,r}$ obtained from the bus memory $132_r$ of the ACS unit $113_{i(min)}$ as the survival path surviving to the state i (min) at the current time t, obtains the decoding result of the maximum likelihood decoding in accordance with the survival path, and supplies the decoding result to the channel decoding unit 18 or the encoding processing unit 38.

<Specific Example of Maximum Likelihood Decoding Process>

Figure 36:
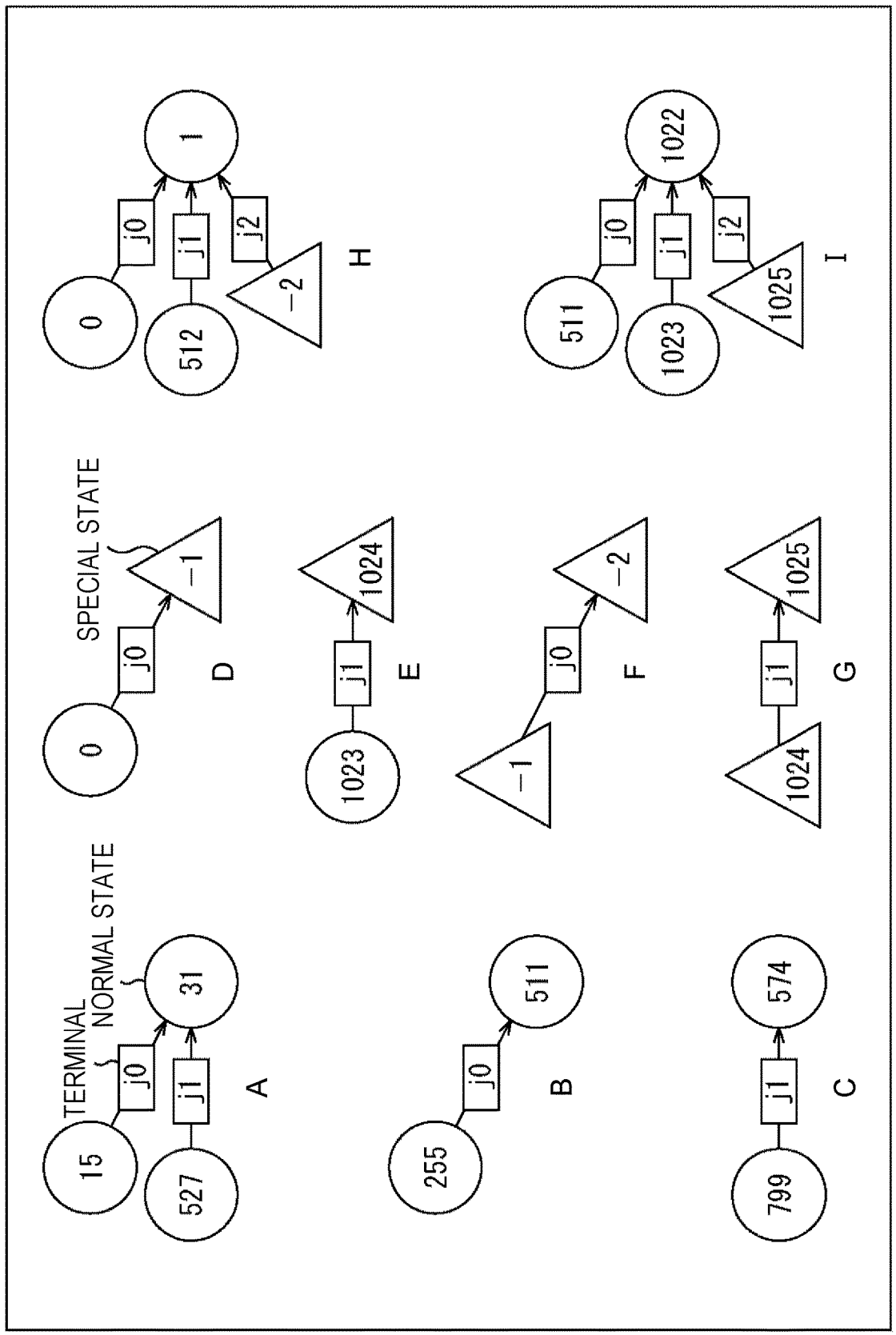
FIG. 36 is a diagram illustrating a specific example of a maximum likelihood decoding process performed in accordance with an extended time-variant trellis.

FIG. 36 is a diagram for describing a specific example of the maximum likelihood decoding process performed in accordance with the extended time-variant trellis.

<<ACS Unit $113_{31}$ Corresponding to the States 31>>

In the extended time-variant trellis, if the state 31 (=0x01F=b'00_0001_1111) is focused as the state of interest, there are a state 15 (=0x00F=b'00_0000_1111) and a state 527 (=0x20F=b'10_0000_1111) as the transitionable state which can transition to the state of interest 31 as illustrated in A of FIG. 36.

To this end, the calculating unit $121_0$ and the terminal j0 of the selector $131_r$ of the ACS unit $113_{31}$ corresponding to the state of interest 31 are connected with an ACS unit $113_{15}$ corresponding to the state j0=15 and supplied with information related to the state 15. The calculating unit $121_1$ and the terminal j1 of the selector 131, of the ACS unit $113_{31}$ are connected with an ACS unit $113_{527}$ corresponding to the state j1=527 and supplied with information related to the state 527. Nothing is connected to the calculating unit $121_2$ and the terminal j2 of the selector $131_r$ of the ACS unit $113_{31}$.

As described above with reference to FIG. 26, the branch is indicated by 11 bits in which 10 bits indicating the state before the state transition are used as the high-order bits, and the input time at the current time (the decoding result of the maximum likelihood decoding) is indicated by the least significant bit. Further, the lower 10 bits of the branch of 11 bits indicate the state i after the state transition.

Therefore, the branch from the state 15 (=b'00_0000_1111) to the state of interest 31 (=b'00_0001_1111) is indicated by the branch b'000_0001_1111, and the branch from the state 527 (=b'10_0000_1111) to the state of interest 31 is indicated by b'100_0001_1111.

The least significant bit of the branch which is the input data at the current time (the decoding result of the maximum likelihood decoding) is the branch information $b_i$ of the branch, and branch information $b_{31}$ for the state of interest 31 is 1.

For the state of interest 31, the limitation signal generating unit 112 generates the following limitation signal tL in accordance with the time t and supplies the limitation signal tL to the ACS unit $113_{31}$ corresponding to the state of interest 31.

In other words, in a case where the time t<10, the limitation signal generating unit 112 generates the limitation signal tL=3 in order to limit the extended time-variant trellis. In this case, in the ACS unit $113_{31}$ corresponding to the state of interest 31, the selectors 123 and $131_r$ select the terminal j0 to which the information related to the state 15 is supplied or the terminal j1 to which the information related to the state 527 is supplied.

In a case where the candidate $sm_{15}+bm_{15}$ of the state metric of the state of interest 31 at the current time t obtained using the state metric $sm_{15}$ of the state 15 is smaller than the candidate $sm_{527}+bm_{527}$ of the state metric of the state of interest 31 at the current time t obtained using the state metric $sm_{527}$ of the state 527, the terminal j0 is selected.

Further, in a case where the candidate $sm_{527}+bm_{527}$ obtained using the state metric $sm_{527}$ of the state 527 is smaller, the terminal j1 is selected.

In a case where the time t=10, the limitation signal generating unit 112 generates the limitation signal tL=0 in order to limit the extended time-variant trellis. In this case, the ACS unit $113_{31}$ corresponding to the state of interest 31 does not operate.

In a case where the time t is a time within a range indicated by 11<=t<14, the limitation signal generating unit 112 generates the limitation signal tL=3 in order to limit the extended time-variant trellis. In this case, in the ACS unit $113_{31}$ corresponding to the state of interest 31, the selectors 123 and 131, select the terminal j0 to which the information related to the state 15 or the terminal j1 to which the information related to the state 527 is supplied.

In a case where the time t is a time within a range indicated by 14<=t<16, the limitation signal generating unit 112 generates the limitation signal tL=0 in order to limit the extended time-variant trellis. In this case, the ACS unit $113_{31}$ corresponding to the state of interest 31 does not operate.

In a case where the time t is a time within a range indicated by 16<=t<19, the limitation signal generating unit 112 generates the limitation signal tL=2 in order to limit the extended time-variant trellis. In this case, in the ACS unit $113_{31}$ corresponding to the state of interest 31, the selectors 123 and 131, select the terminal j1 to which the information related to the state 527 is supplied.

In a case where the time t is a time within a range indicated by 19<=t<28, the limitation signal generating unit 112 generates the limitation signal tL=0 in order to limit the extended time-variant trellis. In this case, the ACS unit $113_{31}$ corresponding to the state of interest 31 does not operate.

In a case where the time t is a time within a range indicated by 28<=t<31, the limitation signal generating unit 112 generates the limitation signal tL=1 in order to limit the extended time-variant trellis. In this case, in the ACS unit $113_{31}$ corresponding to the state of interest 31, the selectors 123 and 131, select the terminal j0 to which the information related to the state 15 is supplied.

In a case where the time t is a time within a range indicated by 31<=t<40, the limitation signal generating unit 112 generates the limitation signal tL=0 in order to limit the extended time-variant trellis. In this case, the ACS unit $113_{31}$ corresponding to the state of interest 31 does not operate.

In a case where the time t is a time within a range indicated by 40<=t<43, the limitation signal generating unit 112 generates the limitation signal tL=1 in order to limit the extended time-variant trellis. In this case, in the ACS unit $113_{31}$ corresponding to the state of interest 31, the selectors 123 and $131_r$ select the terminal j0 to which the information related to the state 15 is supplied.

In a case where the time t is a time within a range indicated by 43<=t<45, the limitation signal generating unit 112 generates the limitation signal tL=0 in order to limit the extended time-variant trellis. In this case, the ACS unit $113_{31}$ corresponding to the state of interest 31 does not operate.

In a case where the time t is a time within a range indicated by 45<=t<: 48, the limitation signal generating unit 112 generates the limitation signal tL=2 in order to limit the extended time-variant trellis. In this case, in the ACS unit $113_{31}$ corresponding to the state of interest 31, the selectors 123 and $131_r$ select the terminal j1 to which the information related to the state 527 is supplied.

In a case where the time t is a time within a range indicated by 48<=t<50, the limitation signal generating unit 112 generates the limitation signal tL=0 in order to limit the extended time-variant trellis. In this case, the ACS unit $113_{31}$ corresponding to the state of interest 31 does not operate.

In a case where the time t=50, the limitation signal generating unit 112 generates the limitation signal tL=2 in order to limit the extended time-variant trellis. In this case, in the ACS unit $113_{31}$ corresponding to the state of interest 31, the selectors 123 and $131_r$ select the terminal j1 to which the information related to the state 527 is supplied.

In a case where the time t>=51, the limitation signal generating unit 112 generates the limitation signal tL=3 in order to limit the extended time-variant trellis. In this case, in the ACS unit $113_{31}$ corresponding to the state of interest 31, the selectors 123 and 131, select the terminal j0 to which the information related to the state 15 is supplied or the terminal j1 to which the information related to the state 527 is supplied.

<<ACS Unit $113_{511}$ Corresponding to the States $51_1$>>

In the extended time-variant trellis, if the state 511 (=0x1FF=b'01_1111_1111) is focused as the state of interest, there are a state 255 (=0x0FF=b'00_1111_1111) as the transitionable state which can transition to the state of interest 511 as illustrated in B of FIG. 36.

To this end, the calculating unit $121_0$ and the terminal j0 of the selector 131, of the ACS unit $113_{511}$ corresponding to the state of interest 511 are connected with an ACS unit $113_{255}$ corresponding to the state j0=255 and supplied with information related to the state 255. Nothing is connected to the calculating unit $121_1$ and the terminal j1 of the selector $131_r$ of the ACS unit $113_{511}$ and the calculating unit $121_2$ and the terminal j2 of the selector $131_r$ of the ACS unit $113_{511}$.

As described above with reference to FIG. 26, the branch is indicated by 11 bits in which 10 bits indicating the state before the state transition are used as the high-order bits, and the input time at the current time (the decoding result of the maximum likelihood decoding) is indicated by the least significant bit. Further, the lower 10 bits of the branch of 11 bits indicate the state i after the state transition.

Therefore, the branch from the state 255 (=b'00_1111_1111) to the state of interest 511 (=b'01_1111_1111) is indicated by a branch b'001_1111_1111.

The least significant bit of the branch which is the input data at the current time (the decoding result of the maximum likelihood decoding) is the branch information $b_i$ of the branch, and branch information $b_{511}$ for the state of interest 511 is 1.

For the state of interest 511, the limitation signal generating unit 112 generates the following limitation signal tL in accordance with the time t and supplies the limitation signal tL to the ACS unit $113_{511}$ corresponding to the state of interest 511.

In other words, in a case where the time t<9, the limitation signal generating unit 112 generates the limitation signal tL=1 in order to limit the extended time-variant trellis. In this case, in the ACS unit $113_{511}$ corresponding to the state of interest 511, the selectors 123 and $131_r$ select the terminal j0 to which information related to the state 255 is supplied.

In a case where the time t is a time within a range indicated by 9<=t<20, the limitation signal generating unit 112 generates the limitation signal tL=0 in order to limit the extended time-variant trellis. In this case, the ACS unit $113_{511}$ corresponding to the state of interest 511 does not operate.

In a case where the time t is a time within a range indicated by 20<=t<23, the limitation signal generating unit 112 generates the limitation signal tL=1 in order to limit the extended time-variant trellis. In this case, in the ACS unit $113_{511}$ corresponding to the state of interest 511, the selectors 123 and $131_r$ select the terminal j0 to which information related to the state 255 is supplied.

In a case where the time t is a time within a range indicated by 23<=t<32, the limitation signal generating unit 112 generates the limitation signal tL=0 in order to limit the extended time-variant trellis. In this case, the ACS unit $113_{511}$ corresponding to the state of interest 511 does not operate.

In a case where the time t is a time within a range indicated by 32<=t<35, the limitation signal generating unit 112 generates the limitation signal tL=1 in order to limit the extended time-variant trellis. In this case, in the ACS unit $113_{511}$ corresponding to the state of interest 511, the selectors 123 and $131_r$ select the terminal j0 to which information related to the state 255 is supplied.

In a case where the time t is a time within a range indicated by 35<=t<49, the limitation signal generating unit 112 generates the limitation signal tL=0 in order to limit the extended time-variant trellis. In this case, the ACS unit $113_{511}$ corresponding to the state of interest 511 does not operate.

In a case where the time t>=49, the limitation signal generating unit 112 generates the limitation signal tL=1 in order to limit the extended time-variant trellis. In this case, in the ACS unit $113_{511}$ corresponding to the state of interest

511, the selectors 123 and 131$_r$ select the terminal j0 to which information related to the state 255 is supplied.

<<ACS Unit 113$_{574}$ Corresponding to the States 574>>

In the extended time-variant trellis state 574 (=0x23E=b'10_0011_1110) is focused as the state of interest, there is a state 799 (=0x31F=b'11_0001_1111) as the transitionable state which can transition to the state of interest 574 as illustrated in C of FIG. 36.

To this end, the calculating unit 121$_1$ and the terminal j1 of the selector 131$_r$ of the ACS unit 113$_{574}$ corresponding to the state of interest 574 are connected with an ACS unit 113$_{799}$ corresponding to the state j1=799 and supplied with information related to the state 799. Nothing is connected to the calculating unit 121$_0$ and the terminal j0 of the selector 131$_r$ of the ACS unit 113$_{574}$ and the calculating unit 121$_2$ and the terminal j2 of the selector 131$_r$ of the ACS unit 113$_{574}$.

As described above with reference to FIG. 26, the branch is indicated by 11 bits in which 10 bits indicating the state before the state transition are used as the high-order bits, and the input time at the current time (the decoding result of the maximum likelihood decoding) is indicated by the least significant bit. Further, the lower 10 bits of the branch of 11 bits indicate the state i after the state transition.

Therefore, the branch from the state 799 (=b'11_0001_1111) to the state of interest 574 is indicated by b'110_0011_1110.

The least significant bit of the branch which is the input data at the current time (the decoding result of the maximum likelihood decoding) is the branch information $b_i$ of the branch, and branch information $b_{574}$ for the state of interest 574 is 0.

For the state of interest 574, the limitation signal generating unit 112 generates the following limitation signal tL in accordance with the time t and supplies the limitation signal tL to the ACS unit 113$_{574}$ corresponding to the state of interest 574.

In other words, in a case where the time t<11, the limitation signal generating unit 112 generates the limitation signal tL=2 in order to limit the extended time-variant trellis. In this case, in the ACS unit 113$_{574}$ corresponding to the state of interest 574, the selectors 123 and 131$_r$ select the terminal j1 to which information related to the state 799 is supplied.

In a case where the time t=11, the limitation signal generating unit 112 generates the limitation signal tL=0 in order to limit the extended time-variant trellis. In this case, the ACS unit 113$_{574}$ corresponding to the state of interest 574 does not operate.

In a case where the time t is a time within a range indicated by 12<=t<15, the limitation signal generating unit 112 generates the limitation signal tL=2 in order to limit the extended time-variant trellis. In this case, in the ACS unit 113$_{574}$ corresponding to the state of interest 574, the selectors 123 and 131, select the terminal j1 to which information related to the state 799 is supplied.

In a case where the time t is a time within a range indicated by 15<=t<49, the limitation signal generating unit 112 generates the limitation signal tL=0 in order to limit the extended time-variant trellis. In this case, the ACS unit 113$_{574}$ corresponding to the state of interest 574 does not operate.

In a case where the time t>=49, the limitation signal generating unit 112 generates the limitation signal tL=2 in order to limit the extended time-variant trellis. In this case, in the ACS unit 113$_{574}$ corresponding to the state of interest 574, the selectors 123 and 131$_r$ select the terminal j1 to which information related to the state 799 is supplied.

<<ACS Unit 113$_{-1}$ Corresponding to State −1>>

In the extended time-variant trellis, if the special state −1 is focused on as the state of interest, there is a state 0 as the transitionable state which can transition to the state of interest −1 as illustrated in D of FIG. 36.

To this end, the calculating unit 121$_0$ and the terminal j0 of the selector 131$_r$ of the ACS unit 113$_{-1}$ corresponding to the state of interest −1 are connected with an ACS unit 113$_0$ corresponding to the state j0=0 and supplied with information related to the state 0. Nothing is connected to the calculating unit 121$_1$ and the terminal j1 of the selector 131$_r$ of the ACS unit 113- and the calculating unit 121$_2$ and the terminal j2 of the selector 131$_r$ of the ACS unit 113$_{-1}$.

The branch from the state 0 (=b'00_0000_0000) to the state of interest −1 is indicated by a branch b'000_0000_0000.

The least significant bit of the branch which is the input data at the current time (the decoding result of the maximum likelihood decoding) is the branch information $b_i$ of the branch, and branch information $b_{-1}$ for the state of interest −1 is 0.

For the state of interest −1, the limitation signal generating unit 112 generates the following limitation signal tL in accordance with the time t and supplies the limitation signal tL to the ACS unit 113$_{-1}$ corresponding to the state of interest −1.

In other words, in a case where the time t<22, the limitation signal generating unit 112 generates the limitation signal tL=0 in order to limit the extended time-variant trellis. In this case, the ACS unit 113$_{-1}$ corresponding to the state of interest −1 does not operate.

In a case where the time t is a time within a range indicated by 22<=t<25, the limitation signal generating unit 112 generates the limitation signal tL=1 in order to limit the extended time-variant trellis. In this case, in the ACS unit 113$_{-1}$ corresponding to the state of interest −1, the selectors 123 and 131$_r$ select the terminal j0 to which information related to the state 0 is supplied.

In a case where the time t is a time within a range indicated by 25<=t<34, the limitation signal generating unit 112 generates the limitation signal tL=0 in order to limit the extended time-variant trellis. In this case, the ACS unit 113$_{-1}$ corresponding to the state of interest −1 does not operate.

In a case where the time t is a time within a range indicated by 34<=t<37, the limitation signal generating unit 112 generates the limitation signal tL=1 in order to limit the extended time-variant trellis. In this case, in the ACS unit 113$_{-1}$ corresponding to the state of interest −1, the selectors 123 and 131$_r$ select the terminal j0 to which information related to the state 0 is supplied.

In a case where the time t>=37, the limitation signal generating unit 112 generates the limitation signal tL=0 in order to limit the extended time-variant trellis. In this case, the ACS unit 113$_{-1}$ corresponding to the state of interest −1 does not operate.

<<ACS Unit 113$_{1024}$ Corresponding to the States 1024>>

In the extended time-variant trellis, if the special state 1024 is focused on as the state of interest, there is a state 1023 as the transitionable state which can transition to the state of interest 1024 as illustrated in E of FIG. 36.

To this end, the calculating unit 121$_1$ and the terminal j1 of the selector 131$_r$ of the ACS unit 113$_{1024}$ corresponding to the state of interest 1024 are connected with an ACS unit 113$_{1023}$ corresponding to the state j1=1023 and supplied with information related to the state 1023. Nothing is connected to the calculating unit 121$_0$ and the terminal j0 of the selector $131_r$ of the ACS unit $113_{1024}$ and the calculating unit $121_2$ and the terminal j2 of the selector $131_r$ of the ACS unit $113_{1024}$.

The branch from the state 1023 (=b'11_0001_1111) to the state of interest 1024 is indicated by b'111_1111_1111.

The least significant bit of the branch which is the input data at the current time (the decoding result of the maximum likelihood decoding) is the branch information $b_i$ of the branch, and branch information $b_{1024}$ for the state of interest 1024 is 1.

For the state of interest 1024, the limitation signal generating unit 112 generates the following limitation signal tL in accordance with the time t and supplies the limitation signal tL to the ACS unit $113_{1024}$ corresponding to the state of interest 1024.

In other words, in a case where the time t<22, the limitation signal generating unit 112 generates the limitation signal tL=0 in order to limit the extended time-variant trellis.

In this case, the ACS unit $113_{1024}$ corresponding to the state of interest 1024 does not operate.

In a case where the time t is a time within a range indicated by 22<=t<25, the limitation signal generating unit 112 generates the limitation signal tL=2 in order to limit the extended time-variant trellis. In this case, in the ACS unit $113_{1024}$ corresponding to the state of interest -1024, the selectors 123 and $131_r$ select the terminal j1 to which information related to the state 1023 is supplied.

In a case where the time t is a time within a range indicated by 25<=t<34, the limitation signal generating unit 112 generates the limitation signal tL=0 in order to limit the extended time-variant trellis. In this case, the ACS unit $113_{1024}$ corresponding to the state of interest 1024 does not operate.

In a case where the time t is a time within a range indicated by 34<=t<37, the limitation signal generating unit 112 generates the limitation signal tL=2 in order to limit the extended time-variant trellis. In this case, in the ACS unit $113_{1024}$ corresponding to the state of interest 1024, the selectors 123 and 131, select the terminal j1 to which information related to the state 1023 is supplied.

In a case where the time t>=37, the limitation signal generating unit 112 generates the limitation signal tL=0 in order to limit the extended time-variant trellis. In this case, the ACS unit $113_{1024}$ corresponding to the state of interest 1024 does not operate.

<<ACS Unit $113_{-2}$ Corresponding to <<State -2>>

In the extended time-variant trellis, if the special state -2 is focused on as the state of interest, there is a state -1 as the transitionable state which can transition to the state of interest -2 as illustrated in F of FIG. 36.

To this end, the calculating unit $121_0$ and the terminal j0 of the selector $131_r$ of the ACS unit $113_{-2}$ corresponding to the state of interest -2 are connected with an ACS unit $113_{-1}$ corresponding to the state j0=-1 and supplied with information related to the state -1. Nothing is connected to the calculating unit $121_1$ and the terminal j1 of the selector $131_r$ of the ACS unit $113_{-2}$ and the calculating unit $121_2$ and the terminal j2 of the selector $131_r$ of the ACS unit $113_{-2}$.

The branch from the state -1 to the state of interest -2 is indicated by a branch b'000_0000_0000.

The least significant bit of the branch which is the input data at the current time (the decoding result of the maximum likelihood decoding) is the branch information $b_i$ of the branch, and branch information $b_{-2}$ for the state of interest -2 is 0.

For the state of interest -2, the limitation signal generating unit 112 generates the following limitation signal tL in accordance with the time t and supplies the limitation signal tL to the ACS unit $113_{-2}$ corresponding to the state of interest -2.

In other words, in a case where the time t<23, the limitation signal generating unit 112 generates the limitation signal tL=0 in order to limit the extended time-variant trellis.

In this case, the ACS unit $113_{-2}$ corresponding to the state of interest -2 does not operate.

In a case where the time t is a time within a range indicated by 23<=t<26, the limitation signal generating unit 112 generates the limitation signal tL=1 in order to limit the extended time-variant trellis. In this case, in the ACS unit $113_{-2}$ corresponding to the state of interest -2, the selectors 123 and $131_r$ select the terminal j0 to which information related to the state -1 is supplied.

In a case where the time t is a time within a range indicated by 26<=t<35, the limitation signal generating unit 112 generates the limitation signal tL=0 in order to limit the extended time-variant trellis. In this case, the ACS unit $113_{-2}$ corresponding to the state of interest -2 does not operate.

In a case where the time t is a time within a range indicated by 35<=t<38, the limitation signal generating unit 112 generates the limitation signal tL=1 in order to limit the extended time-variant trellis. In this case, in the ACS unit $113_{-2}$ corresponding to the state of interest -2, the selectors 123 and $131_r$ select the terminal j0 to which information related to the state -1 is supplied.

In a case where the time t>=38, the limitation signal generating unit 112 generates the limitation signal tL=0 in order to limit the extended time-variant trellis. In this case, the ACS unit $113_{-2}$ corresponding to the state of interest -2 does not operate.

<<ACS Unit $113_{1025}$ Corresponding to the States 1025>>

In the extended time-variant trellis, if the special state 1025 is focused on as the state of interest, there is a state 1024 as the transitionable state which can transition to the state of interest 1025 as illustrated in G of FIG. 36.

To this end, the calculating unit $121_1$ and the terminal j1 of the selector $131_r$ of the ACS unit $113_{1025}$ corresponding to the state of interest 1025 are connected with an ACS unit $113_{1024}$ corresponding to the state j1=1024 and supplied with information related to the state 1024. Nothing is connected to the calculating unit $121_0$ and the terminal j0 of the selector $131_r$ of the ACS unit $113_{1025}$ and the calculating unit $121_2$ and the terminal j2 of the selector $131_r$ of the ACS unit $113_{1025}$.

The branch from the state 1024 to the state of interest 1025 is indicated by b'111_1111_1111.

The least significant bit of the branch which is the input data at the current time (the decoding result of the maximum likelihood decoding) is the branch information $b_i$ of the branch, and branch information $b_{1025}$ for the state of interest 1025 is 1.

For the state of interest 1025, the limitation signal generating unit 112 generates the following limitation signal tL in accordance with the time t and supplies the limitation signal tL to the ACS unit $113_{1025}$ corresponding to the state of interest 1025.

In other words, in a case where the time t<23, the limitation signal generating unit 112 generates the limitation signal tL=0 in order to limit the extended time-variant trellis.

In this case, the ACS unit $113_{1025}$ corresponding to the state of interest 1025 does not operate.

In a case where the time t is a time within a range indicated by 23<=t<26, the limitation signal generating unit 112 generates the limitation signal tL=2 in order to limit the extended time-variant trellis. In this case, in the ACS unit $113_{1025}$ corresponding to the state of interest 1025, the selectors 123 and 131$_r$ select the terminal j1 to which information related to the state 1024 is supplied.

In a case where the time t is a time within a range indicated by 26<=t<35, the limitation signal generating unit 112 generates the limitation signal tL=0 in order to limit the extended time-variant trellis. In this case, the ACS unit $113_{1025}$ corresponding to the state of interest 1025 does not operate.

In a case where the time t is a time within a range indicated by 35<=t<38, the limitation signal generating unit 112 generates the limitation signal tL=2 in order to limit the extended time-variant trellis. In this case, in the ACS unit $113_{1025}$ corresponding to the state of interest 1025, the selectors 123 and 131$_r$ select the terminal j1 to which information related to the state 1024 is supplied.

In a case where the time t>=38, the limitation signal generating unit 112 generates the limitation signal tL=0 in order to limit the extended time-variant trellis. In this case, the ACS unit $113_{1025}$ corresponding to the state of interest 1025 does not operate.

<<ACS Unit $113_1$ Corresponding to the States 1>>

In the extended time-variant trellis, if the state 1 (=0x001=b'00_0000_0001) is focused on as the state of interest, there are a state 0 (=0x000=b'00_0000_0000), a state 512 (=0x200=b'10_0000_0000), and a state −2 as the transitionable state which can transition to the state of interest 1 as illustrated in H of FIG. 36.

To this end, the calculating unit $121_0$ and the terminal j0 of the selector 131$_r$ of the ACS unit $113_1$ corresponding to the state of interest 1 are connected with an ACS unit $113_0$ corresponding to the state j0=0 and supplied with information related to the state 0. The calculating unit $121_1$ and the terminal j1 of the selector 131, of the ACS unit $113_1$ are connected with an ACS unit $113_{512}$ corresponding to the state j1=512 and supplied with information related to the state 512. The calculating unit $121_2$ and the terminal j2 of the selector 131$_r$ of the ACS unit $113_1$ are connected with an ACS unit $113_{-2}$ corresponding to the state (special state) j2=−2 and supplied with information related to the state −2.

The branch from the state 0 (=b'00_0000_0000) to the state of interest 1 (=b'00_0000_0001) is indicated by branch b'000_0000_0001. The branch from the state 512 (=b'10_0000_0000) to the state of interest 1 is indicated by b'100_0000_0001. The branch from the state −2 to the state of interest 1 is indicated by b'000_0000_0001.

The least significant bit of the branch which is the input data at the current time (the decoding result of the maximum likelihood decoding) is the branch information $b_i$ of the branch, and branch information $b_1$ for the state of interest 1 is 1.

For the state of interest 1, the limitation signal generating unit 112 generates the following limitation signal tL in accordance with the time t and supplies the limitation signal tL to the ACS unit $113_1$ corresponding to the state of interest 1.

In other words, in a case where the time t<10, the limitation signal generating unit 112 generates the limitation signal tL=3 in order to limit the extended time-variant trellis. In this case, in the ACS unit $113_1$ corresponding to the state of interest 1, the selectors 123 and 131$_r$ select the terminal j0 to which information related to the state 0 is supplied or the terminal j1 to which information related to the state 512 is supplied.

In a case where the candidate $sm_0+bm_0$ of the state metric of the state of interest 1 at the current time t obtained using the state metric $sm_0$ of the state 0 is smaller than the candidate $sm_{512}+bm_{512}$ of the state metric of the state of interest 1 at the current time t obtained using the state metric $sm_{512}$ of the state 512, the terminal j0 is selected.

Further, in a case where the candidate $sm_{512}+bm_{512}$ obtained using the state metric $sm_{512}$ of the state 512 is smaller, the terminal j1 is selected.

In a case where the time t is a time within a range indicated by 10<=t<24, the limitation signal generating unit 112 generates the limitation signal tL=0 in order to limit the extended time-variant trellis. In this case, the ACS unit $113_1$ corresponding to the state of interest 1 does not operate.

In a case where the time t is a time within a range indicated by 24<=t<27, the limitation signal generating unit 112 generates the limitation signal tL=4 in order to limit the extended time-variant trellis. In this case, in the ACS unit $113_1$ corresponding to the state of interest 1, the selectors 123 and 131, select the terminal j2 to which information related to the state −2 is supplied.

In a case where the time t is a time within a range indicated by 27<=t<36, the limitation signal generating unit 112 generates the limitation signal tL=0 in order to limit the extended time-variant trellis. In this case, the ACS unit $113_1$ corresponding to the state of interest 1 does not operate.

In a case where the time t is a time within a range indicated by 36<=t<39, the limitation signal generating unit 112 generates the limitation signal tL=4 in order to limit the extended time-variant trellis. In this case, in the ACS unit $113_1$ corresponding to the state of interest 1, the selectors 123 and 131$_r$ select the terminal j2 to which information related to the state −2 is supplied.

In a case where the time t is a time within a range indicated by 39<=t<50, the limitation signal generating unit 112 generates the limitation signal tL=0 in order to limit the extended time-variant trellis. In this case, the ACS unit $113_k$ corresponding to the state of interest 1 does not operate.

In a case where the time t>=50, the limitation signal generating unit 112 generates the limitation signal tL=3 in order to limit the extended time-variant trellis. In this case, in the ACS unit $113_1$ corresponding to the state of interest 1, the selectors 123 and 131$_r$ select the terminal j0 to which information related to the state 0 is supplied or the terminal j1 to which information related to the state 512 is supplied.

<<ACS Unit $113_{1022}$ Corresponding to the States 1022>>

In the extended time-variant trellis, if the state 1022 (=0x3FE=b'11_1111_1110) is focused on as the state of interest, there are state 511 (=0x1FF=b'01_1111_1111), a state 1023 (=0x3FF=b'11_11111_1111), and a state 1025 as the transitionable state which can transition to the state of interest 1022 as illustrated in I of FIG. 36.

To this end, the calculating unit $121_0$ and the terminal j0 of the selector 131$_r$ of the ACS unit $113_{1022}$ corresponding to the state of interest 1022 are connected with an ACS unit $113_{511}$ corresponding to the state j0=511 and supplied with information related to the state 511. The calculating unit $121_1$ and the terminal j1 of the selector 131$_r$ of the ACS unit $113_{1022}$ are connected with an ACS unit $113_{1023}$ corresponding to the state j1=1023 and supplied with information related to the state 1023. The calculating unit $121_2$ and the terminal j2 of the selector 131$_r$ of the ACS unit $113_{1022}$ are connected with an ACS unit $113_{1025}$ corresponding to the state (special state) j2=1025 and supplied with information related to the state 1025.

The branch from the state 511 (=b'01_1111_1111) to the state of interest 1022 (=b'11_11111_1110) is indicated by a branch b'011_1111_1110. The branch from the state 1023 (=b'11_11111_1111) to the state of interest 1022 is indicated by b'111_1111_1110. The branch from the state 1025 to the state of interest 1022 is indicated by b'111_1111_1110.

The least significant bit of the branch which is the input data at the current time (the decoding result of the maximum likelihood decoding) is the branch information $b_i$ of the branch, and branch information $b_{1022}$ for the state of interest 1022 is 0.

For the state of interest 1022, the limitation signal generating unit 112 generates the limitation signal tL similar to that in the case of the state 1 described above in accordance with the time t and supplies the limitation signal tL to the ACS unit $113_{1022}$ corresponding to the state of interest 1022.

In other words, in a case where the time t<10, the limitation signal generating unit 112 generates the limitation signal tL=3 in order to limit the extended time-variant trellis. In this case, in the ACS unit $113_{1022}$ corresponding to the state of interest 1022, the selectors 123 and 131, selects the terminal j0 to which information related to the state 511 is supplied or the terminal j1 to which information related to the state 1023 is supplied.

In a case where the candidate $sm_{511}+bm_{511}$ of the state metric of the state of interest 1022 at the current time t obtained using the state metric $sm_{511}$ of the state 511 is smaller than the candidate $sm_{1023}+bm_{1023}$ of the state metric of the state of interest 1022 at the current time t obtained using the state metric $sm_{1023}$ of the state 1023, the terminal j0 is selected.

Further, in a case where the candidate $sm_{1023}+bm_{1023}$ obtained using the state metric $sm_{1023}$ of the state 1023 is smaller, the terminal j1 is selected.

In a case where the time t is a time within a range indicated by 10<=t<24, the limitation signal generating unit 112 generates the limitation signal tL=0 in order to limit the extended time-variant trellis. In this case, the ACS unit $113_{1022}$ corresponding to the state of interest 1022 does not operate.

In a case where the time t is a time within a range indicated by 24<=t<27, the limitation signal generating unit 112 generates the limitation signal tL=4 in order to limit the extended time-variant trellis. In this case, in the ACS unit $113_{1022}$ corresponding to the state of interest 1022, the selectors 123 and $131_r$ select the terminal j2 to which information related to the state 1025 is supplied.

In a case where the time t is a time within a range indicated by 27<=t<36, the limitation signal generating unit 112 generates the limitation signal tL=0 in order to limit the extended time-variant trellis. In this case, the ACS unit $113_{1022}$ corresponding to the state of interest 1022 does not operate.

In a case where the time t is a time within a range indicated by 36<=t<39, the limitation signal generating unit 112 generates the limitation signal tL=4 in order to limit the extended time-variant trellis. In this case, in the ACS unit $113_{1022}$ corresponding to the state of interest 1022, the selectors 123 and $131_r$ select the terminal j2 to which information related to the state 1025 is supplied.

In a case where the time t is a time within a range indicated by 39<=t<50, the limitation signal generating unit 112 generates the limitation signal tL=0 in order to limit the extended time-variant trellis. In this case, the ACS unit $113_{1022}$ corresponding to the state of interest 1022 does not operate.

In a case where the time t>=50, the limitation signal generating unit 112 generates the limitation signal tL=3 in order to limit the extended time-variant trellis. In this case, in the ACS unit $113_{1022}$ corresponding to the state of interest 1022, the selectors 123 and $131_r$ select the terminal j0 to which information related to the state 511 is supplied or the terminal j1 to which information related to the state 1023 is supplied.

The extended time-variant trellis includes the branch from one of two normal states to the normal state (A of FIG. 36), the branch from one of one normal state to the normal state (B and C of FIG. 36), the branch from one of one normal state to the special state (D and E of FIG. 36), the branch from one of one special state to the special state (F and G of FIG. 36), and the branch from one of the two normal states and one special state to the normal state (H and I of FIG. 36) as illustrated in FIG. 36.

In the above case, the maximum likelihood decoding process performed on each of the states 31, 511, 574, −1, 1024, −2, 1025, 1, and 1022 has been described, but a similar maximum likelihood decoding process is performed on other states of the extended time-variant trellis as well.

<Detection of Clock Shift and Generation of Data Gate Signal>

Figure 37:
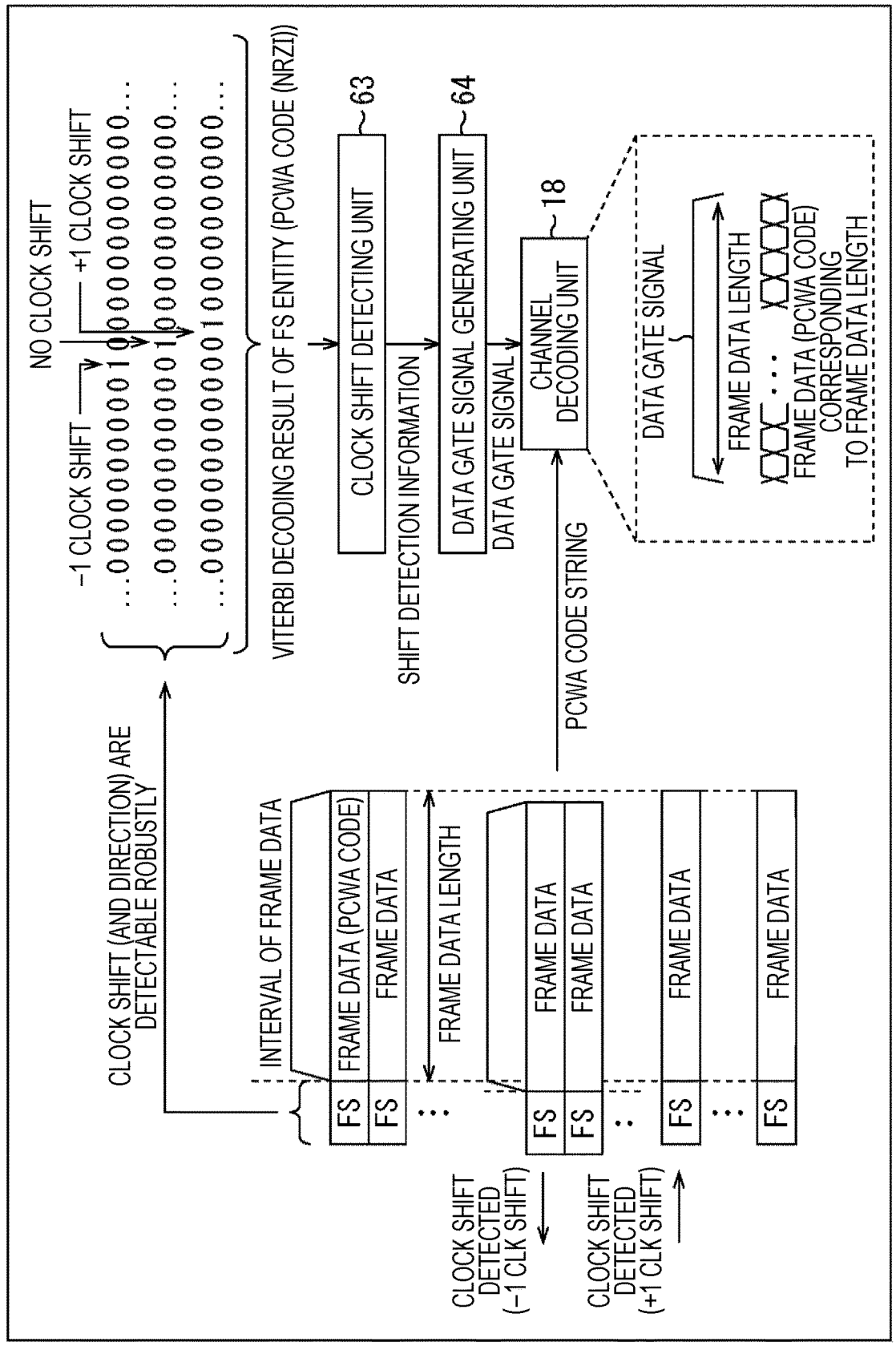
FIG. 37 is a diagram for describing detection of a clock shift and generation of a data gate signal.

FIG. 37 is a diagram for describing detection of the clock shift and generation of the data gate signal.

As the maximum likelihood decoding of the FS entity of the FS is performed in accordance with the extended time-variant trellis limited by the extended FS code strings FSA #i, FSB #i, and FSC #i (FIG. 28), the position of 1 in the center of the FS entity in the NRZI expression serving as the decoding result of the maximum likelihood decoding is shifted by the number of bits corresponding to the amount of the clock shift in a direction in which the clock shift occurs. Therefore, the clock shift can be accurately detected from the decoding result of the maximum likelihood decoding of the FS entity (Viterbi decoding).

In other words, in a case where the extended FS code string FSA #i is obtained as the decoding result of the maximum likelihood decoding of the FS entity, it can be detected that there is a clock shift of +1 clock. In a case where the extended FS code string FSB #i is obtained as the decoding result of the maximum likelihood decoding of the FS entity, it can be detected that there is no clock shift. In a case where the extended FS code string FSC #i is obtained as the decoding result of the maximum likelihood decoding of the FS entity, it can be detected that there is a clock shift of −1 clock.

The clock shift detecting unit 63 (FIG. 6) detects the clock shift in accordance with the decoding result of the maximum likelihood decoding of (the FS entity of) the FS from the restoring unit 35 and outputs shift detection information indicating the detection result of the clock shift to the data gate signal generating unit 64.

In accordance with the shift detection information from the clock shift detecting unit 63, the data gate signal generating unit 64 generates the data gate signal that accurately indicates the interval of the frame data (FIG. 9) subsequent to the FS and supplies the data gate signal to the channel decoding unit 18.

The channel decoding unit 18 extracts the code string of the interval indicated by the data gate signal from the data gate signal generating unit 64, that is, the frame data from the code string of the PCWA 110 code serving as the decoding result of the maximum likelihood decoding from the restoring unit 35.

Then, the channel decoding unit 18 performs decoding (channel decoding) on the PCWA 110 code serving as the frame data, and supplies the frame data obtained by the decoding, that is, row data to which the DCC bit is added to the DCC deleting unit 19 (FIG. 1).

As described above, in the recording/reproducing apparatus 1 of FIG. 1, since the synchronization patterns syn0 of Run_in (FIG. 9) are recorded in the two adjacent tracks, that is, the land and the groove with a predetermined amount of shift in the track direction in the optical disc 16, it is possible to detect the synchronization pattern syn0 of Run_in robustly.

Further, since the synchronization pattern syn0 of Run_in can be detected robustly, it is possible to specify the interval of (the FS entity of) the FS at the head of the frame subsequent to Run_in with a certain degree of accuracy.

Then, the maximum likelihood decoding of (the FS entity of) the FS can be performed on the interval of the FS specified with a certain degree of accuracy using the extended time-variant trellis.

Further, the FS entity having a run of a length equal to or larger than the constraint length of the PR (12T in the present embodiment) is included in the FS, and the normal state which is a state corresponding to the constraint length of the PR and the special state other than the normal state are included in the extended time-variant trellis.

In this case, the path of the FS entity corresponding to the run of the length equal to or larger than the constraint length of the PR reaches (performs the state transition to) the special state in the extended time-variant trellis, and the path of the FS entity corresponding to the run of the length equal to or larger than the constraint length of the PR and the path corresponding to the run of the length less than the constraint length of the PR are suppressed from merging into the same state (normal state). As a result, the detection accuracy of (the FS entity of) the FS can be improved.

Further, as the maximum likelihood decoding of the FS is performed in accordance with the extended time-variant trellis in which the state and the branch (state transition) are limited by the FS in a case where there is no clock shift and the FS in a case where there is a clock shift, and thus it is possible to accurately detect the clock shift from the decoding result of the maximum likelihood decoding.

Further, it is possible to accurately specify the interval of the frame data subsequent to the FS on the basis of the detection result of the clock shift.

As a result, the frame data recorded with high density can be reproduced robustly.

Hereinafter, a format of the RUB different from the example of FIG. 9, that is, a variation of the format of the RUB will be described.

<Frame>

Figure 38:
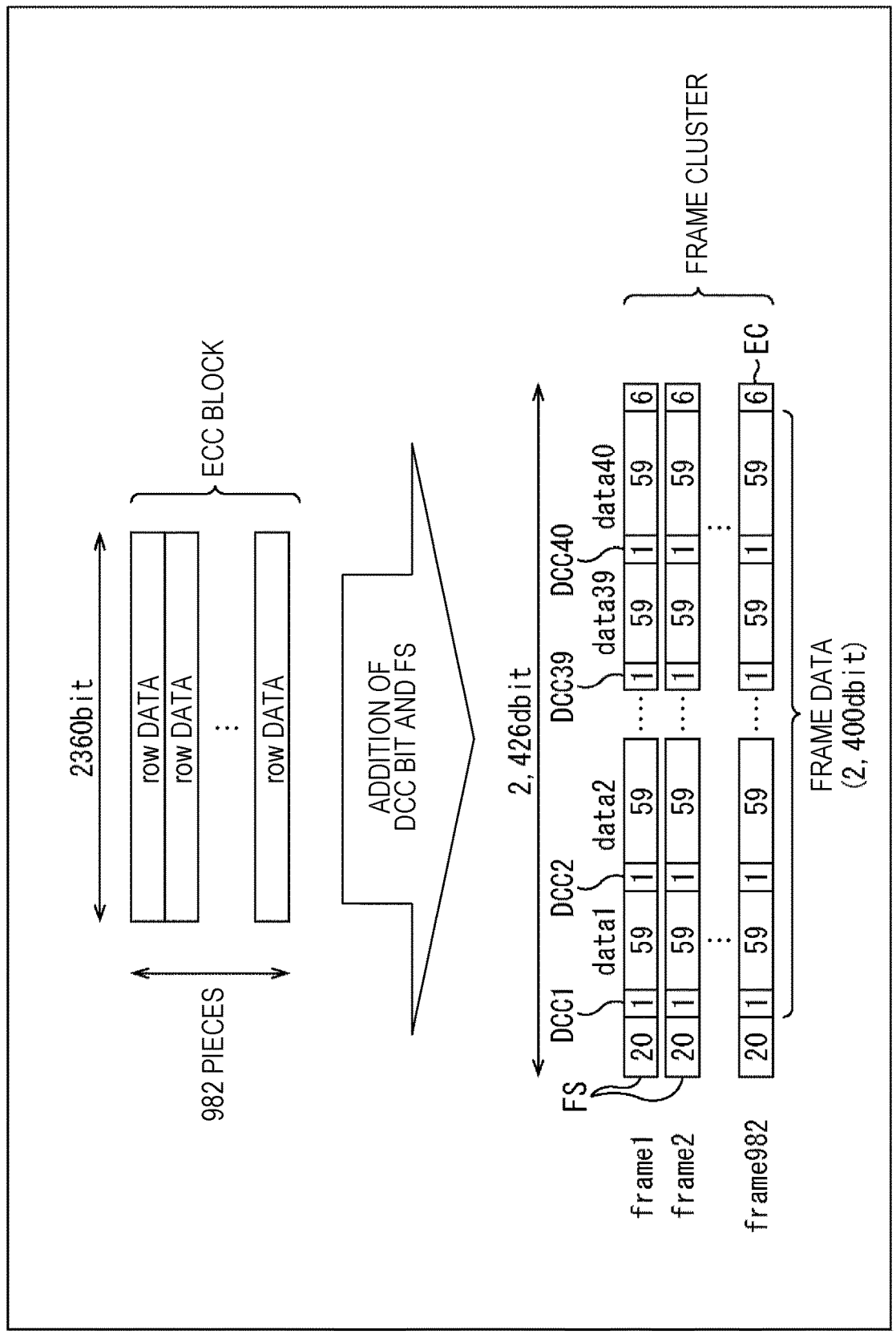
FIG. 38 is a diagram for describing another example of a frame constructed by a DCC adding unit 12.

FIG. 38 is a diagram for describing another example of the frame constructed by the DCC adding unit 12 of FIG. 1.

As described with reference to FIG. 8, the DCC adding unit 12 constructs the frame data from the ECC block.

In other words, the DCC adding unit 12 divides the ECC block into row data which is data of 2,360 dbits in one row.

Further, the DCC adding unit 12 divides each piece of row data divided from the ECC block into 40 pieces of data data1 to data40 of 59 dbits. Then, the DCC adding unit 12 adds a 1-bit DCC bit dcc #i to the head of each piece of data data #i (i=1, 2, . . . , and 40 of FIG. 38), and constructs frame data of 2,400 dbits from the row data of 2,360 dbits.

The frame data of 2,400 dbits includes 40 sets of data data #i and the DCC bit dcc #i.

The DCC adding unit 12 constructs the frame frame #i in which the FS, the frame data, and the EC are arranged from the head by adding the FS to the head of the frame data and adding the EC to the end of the frame data.

Since one ECC block includes 982 pieces (rows) of row data, 982 frames frame1 to frame982 are constructed from one ECC block.

In FIG. 8, the FS (before the channel coding) is a pattern of 26 dbits, but in FIG. 38 (and subsequent drawings), the FS is a pattern of 20 dbits, and the details thereof will be described later. Further, the EC added to the frame data (before the channel coding) is a pattern of 6 dbits similar to the example of FIG. 8.

Therefore, in FIG. 38, one frame frame #i is data of 2,426 dbits including the FS of 20 dbits, the frame data of 2,400 dbits, the EC of 6 dbits, and the frame length (data length) coincides with that of the frame of FIG. 8.

The DCC adding unit 12 supplies a set of 982 frames frame1 to frame982 to the channel coding unit 13 (FIG. 1) as the frame cluster.

<Channel Coding>

Figure 39:
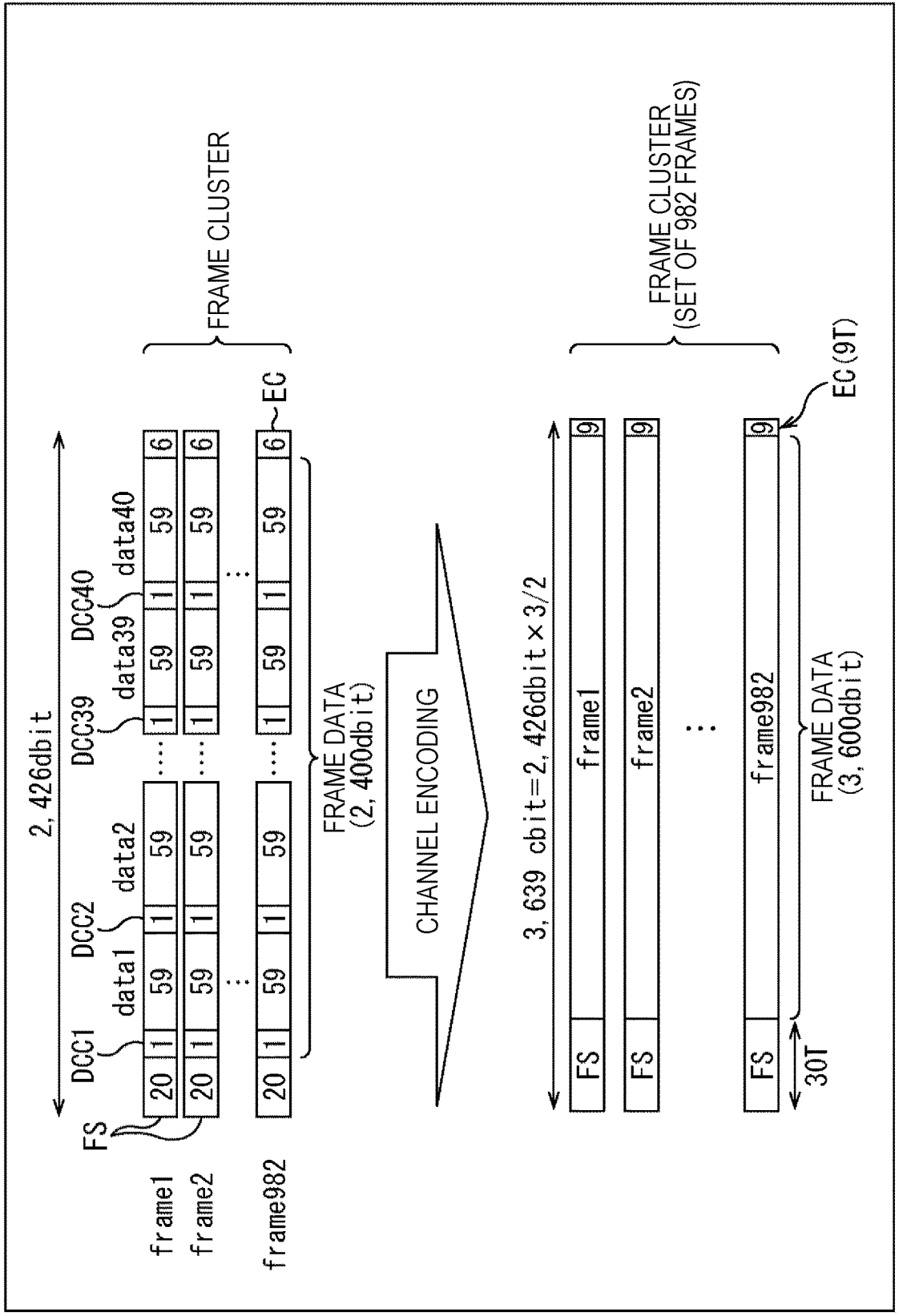
FIG. 39 is a diagram for describing an example of channel coding performed on a frame cluster by a channel coding unit 13.

FIG. 39 is a diagram for describing an example of channel coding in the channel coding unit 13 for frame cluster of FIG. 38.

The channel coding unit 13 performs the channel coding of encoding the frame cluster of FIG. 38 supplied from the DCC adding unit 12 into, for example, the PCWA 110 code or the like. Since the PCWA 110 code is a code with a coding rate of 2/3 as described above with reference to FIG. 1, the size (the number of bits) of the frame cluster after the channel coding is 3/2 times as large as that before the channel coding.

In other words, the size of each of the frames frame #i constituting the frame cluster of FIG. 38 is 3,639 cbits which is 3/2 times of 2,426 dbits. Further, the size of the FS of 20 dbits at the head of the frame frame #i is 30T (30 cbits) which is 3/2 times of 20 dbits, and the size of the EC of 6 dbits at the end of the frame frame #i is 9T (9 cbits) which is 3/2 times of 6 dbits.

The size of the frame cluster after the channel coding is 3,573,498 cbits (=3,639 cbits×982 pieces) which is the size corresponding to the 982 frames each having 3,639 cbits.

The frame cluster encoded into the PCWA 110 code by the channel coding unit 13 is supplied to the RUB constructing unit 14. The RUB constructing unit 14 constructs the RUB using the frame cluster from the channel coding unit 13.

<FS>

Figure 40:
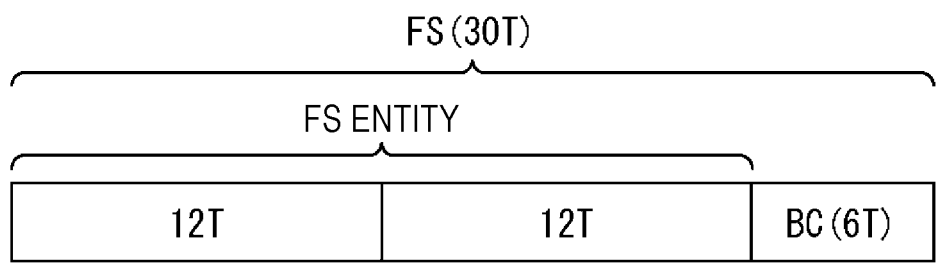
FIG. 40 is a diagram illustrating a configuration example of an FS of 30T.

FIG. 40 is a diagram illustrating a configuration example of the FS of 30T of FIG. 39.

The FS of 30T (the FS after the PCWA encoding of the FS of 20 cbits or the like) is configured such that the FS entity of 12T×2 and the BC of 6T are arranged in the described order.

Therefore, the FS of 30T is a pattern (shortened FS) obtained by excluding the EC of 9T at the head from the FS of 39T of FIG. 11.

Hereinafter, the FS of 30T of FIG. 40 is also referred to as a new FS.

<RUB>

Figure 41:
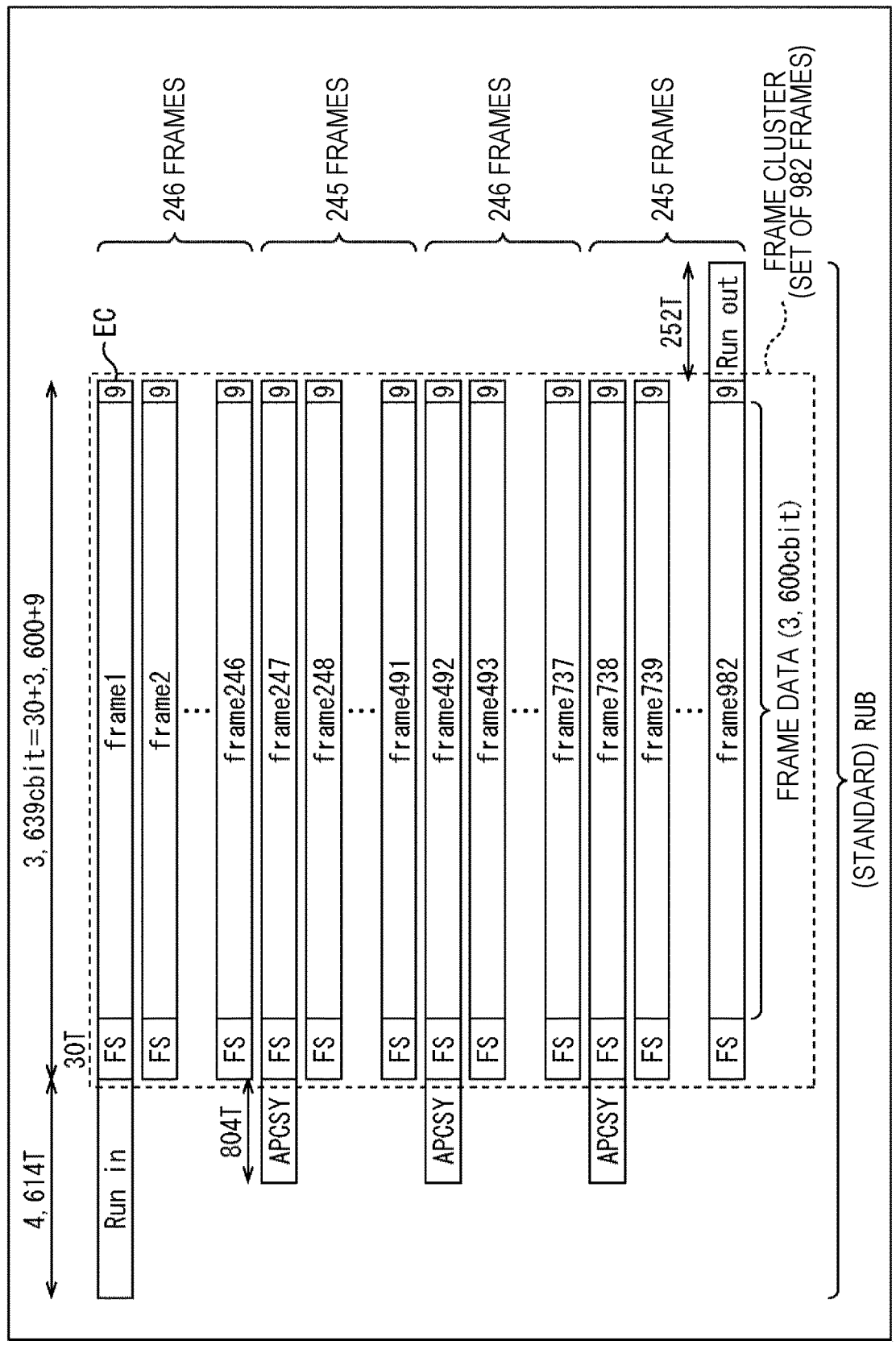
FIG. 41 is a diagram for describing another example of a RUB constructed by a RUB constructing unit 14.

FIG. 41 is a diagram for describing another example of the RUB constituted by the RUB constructing unit 14 of FIG. 1.

The RUB constructing unit 14 constructs the RUB by adding Run_in indicating the head of the RUB and Run_out indicating the end of the RUB to the head and the end of the frame cluster of FIG. 39 from the channel coding unit 13, respectively, and adding an auxiliary control pattern APCSY which is supplementarily used for controlling the recording and reproducing processes of the optical disc 16 to the heads of one or more frames constructing the frame cluster.

In FIG. 41, the size of Run_in is 4,614T, and the size of Run_out is 252T.

The auxiliary control pattern APCSY is added, for example, to the heads of three frames frame247, frame492, and frame738. The size of the auxiliary control pattern APCSY is 804T.

The size of the portion other than the frame cluster in the RUB, that is, the total size 4,614T+252T+804T×3 of Run_in, Run_out, and the three auxiliary control patterns APCSY added to the frame cluster by the RUB constructing unit 14 is equal to the size 3,639T×2 (=7, 278T) corresponding to the two frames each having 3,639 cbits.

Here, the auxiliary control pattern APCSY is a pattern mainly used for timing recovery (of the channel clock of the PLL 32), and thus the three auxiliary control patterns APCSY are inserted (added) into the frame cluster at substantially equal intervals.

In other words, the number of frames from the head of the frame cluster (the end of Run_in) to a first auxiliary control pattern APCSY (the auxiliary control pattern APCSY added to the head of the frame frame247) is 246. Further, the number of frames from the first auxiliary control pattern APCSY to a second auxiliary control pattern APCSY (the auxiliary control pattern APCSY added to the head of the frame frame492) is 245. Further, the number of frames from the second auxiliary control pattern APCSY to a third auxiliary control pattern APCSY (the auxiliary control pattern APCSY added at the head of the frame frame738) is 246. In addition, the number of frames from the third auxiliary control pattern APCSY to the end of the frame cluster (the head of Run_out) is 245.

As described above, the interval of the auxiliary control patterns APCSY is 245 frames or 246 frames.

Here, the RUB of FIG. 41 is hereinafter also referred to as a standard RUB.

In the standard RUB, the timing recovery or the like can be performed also in the auxiliary control pattern APCSY in addition to Run_in (and Run_out).

In the standard RUB, a new FS is allocated at the head of the frame frame #i and an EC is arranged at the end of the frame frame #i. Therefore, the frame data in the frame frame #i is sandwiched between the BC and the EC constituting the new FS, and the standard RUB has a data structure in which the BC, the frame data, and the EC are arranged in the described order, similarly to the RUB of FIG. 9. In the data structure in which the BC, the frame data, and the EC are arranged in the described order, the encoding state starts from the state S5 and terminates in the state S3 as described above with reference to FIG. 11.

As described above, in the frame data constituting the data structure starting from a fixed state (for example, the state S5) and terminating in a fixed state (for example, the state S3), a relation between whether the number of edges of the frame data before the PCWA 110 encoding is an odd number or an even number and whether the number of edges of the frame data after the PCWA 110 encoding is an odd number or an even number is constant. As a result, the DC control can be performed by adding the DCC bit to the frame data (row data) before the PCWA 110 encoding as described above with reference to FIG. 11.

Further, as a recording region of the optical disc 16, there are a user data region in which user data is recorded and a management region in which management information is recorded.

Since the management information does not have so much data amount, if the management information is recorded in a standard RUB including 982 frames as well, there is a frame in which the management information is not arranged, and thus the recording region of the optical disc 16 is likely to be wastefully consumed.

In this regard, the RUB constructing unit 14 can construct shortened RUBs having the number of frames smaller than the standard RUBs in addition to the standard RUBs, and recording can be performed in the optical disc 16 in units of shortened RUBs in addition to in units of standard RUBs.

Figure 42:
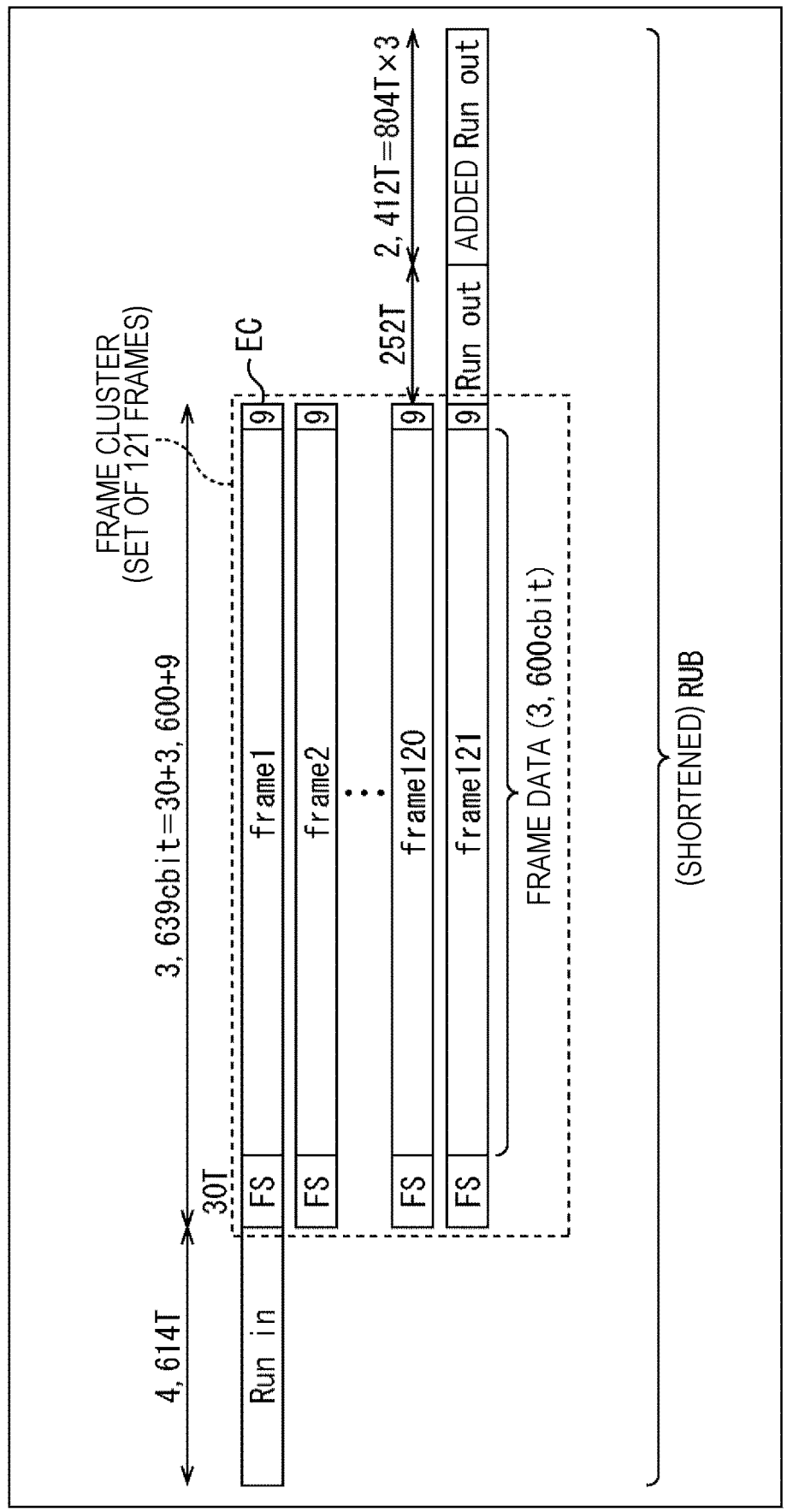
FIG. 42 is a diagram for describing an example of a shortened RUB constructed by a RUB constructing unit 14.

FIG. 42 is a diagram for describing an example of the shortened RUB constructed by the RUB constructing unit 14 of FIG. 1.

In the shortened RUB, the frame cluster includes 121 frames. Therefore, in a case where the shortened RUB is constructed, the DCC adding unit 12 (FIG. 1) constitutes the frame cluster including 121 frames.

The RUB constructing unit 14 constructs the shortened RUB by adding Run_in and Run_out to the head and the end of the frame creator, respectively, similarly to the standard RUB and adding additional Run_out of 2,412T to Run_out.

The size of the shortened RUB is about ⅛ the size of the standard RUB.

Note that the shortened RUB does not include the three auxiliary control patterns APCSY of the standard RUB. In the standard RUB in which the number of frames is as large as 982 frames, it is effective that there is an auxiliary control pattern APCSY which can be used for the timing recovery or the like for every 245 or 246 frames, but in the shortened RUB in which the number of frames is as small as 121 frame, there is Run_in which can be used for the timing recovery or the like at intervals shorter than the intervals of the auxiliary control pattern APCSY of the standard RUB.

In addition, when the shortened RUB is constructed, the RUB constructing unit 14 adds additional Run_out to the shortened RUB in order to cause the size of the portion excluding the frame cluster to be equal to the size 3,639T×2 (=7, 278T) corresponding to the two frames, similarly to the standard RUB, in consideration of affinity between the standard RUB and the shortened RUB. The size of additional Run_out is equal to the size 804T×3 (=2, 412T) of a sum of the three auxiliary control patterns APCSY.

<Run_In>

Figure 43:
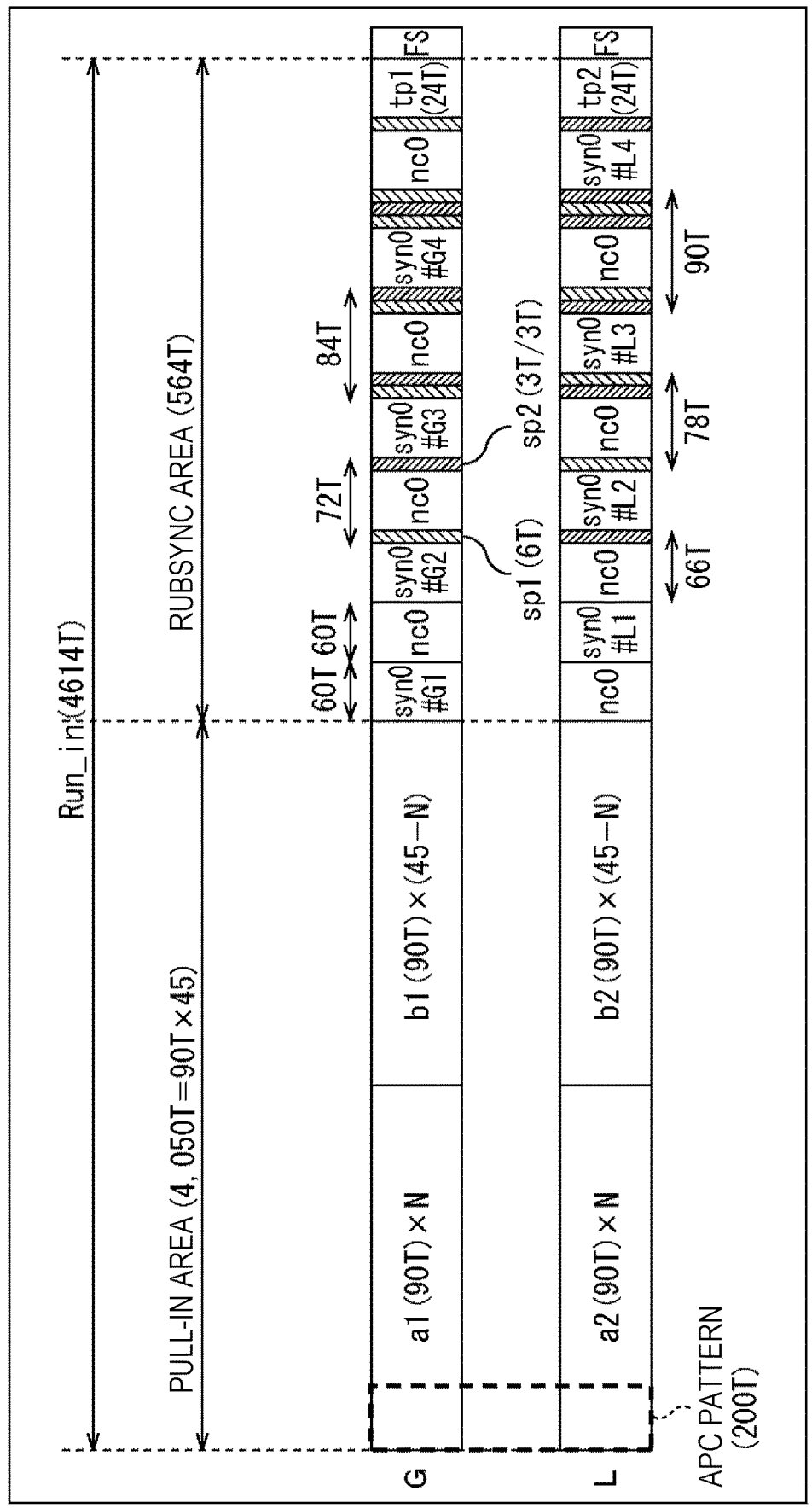
FIG. 43 is a diagram illustrating a configuration example of Run_in of 4,614 T.

FIG. 43 is a diagram illustrating a configuration example of Run_in of 4,614T in FIGS. 41 and 42.

As described above with reference to FIG. 12, since the cross correlation between the frame data of the two adjacent tracks tends to be zero or a small value close to zero, preferably, patterns having a small cross correlation (ideally, patterns with a zero cross correlation) are employed as Run_in of the two adjacent tracks, similarly to the frame data of the two adjacent tracks.

In this regard, Run_in of the optical disc 16 is configured such that the synchronization patterns syn0 are recorded in the two adjacent tracks with a shift in the track direction so that the positions in the track direction do not overlap.

FIG. 43 illustrates an example of Run_in recorded in a pair of groove G and land L serving as the two adjacent tracks of the optical disc 16.

As described with reference to FIG. 12, Run_ins (eventually, the RUBs) are recorded in a pair of groove G and land L of optical disc 16 side by side at the same positions in the track direction.

In FIG. 43, Run_in is a pattern of 4,614T, and is configured such that a pull-in area of 4,050T and a RUBSYNC area of 564T are arranged from the head thereof.

Note that, similarly to the example of FIG. 12, the configurations of the groove Run_in (Run_in recorded in the groove G) and the land Run_in (Run_in recorded in the land L) may be reversed.

In Run_in, the pull-in area is configured such that a total of 45 patterns including a1 patterns or a2 patterns of 90T and b1 patterns or b2 patterns of 90T are arranged.

In other words, the pull-in area (hereinafter also referred to as a "groove pull-in area") of the groove Run_in is configured such that N a1 patterns of 90T and (45-N) b1 patterns of 90T are arranged in the described order. The pull-in area (hereinafter also referred to as a "land pull-in area") of the land Run_in is configured such that N a2 patterns of 90T and (45-N) b2 patterns of 90T are arranged in the described order.

As each of the a1 pattern and the a2 pattern, a pattern with a small cross correlation (ideally, a pattern with a zero cross correlation) can be employed. Similarly, as each of the b1 pattern and the b2 pattern, a pattern with a small cross correlation (ideally, a pattern with a zero cross correlation) can be employed.

The (reproduction signal in) "pull-in area" is used for the XTC learning, pulling-in of the channel clock to a desired frequency in the PLL 32, adjusting of the tap coefficient of the HPF 41, adjusting of the gain in the AGC 42, and the like.

For each of the a1 pattern and the a2 pattern, in order to cause the PLL 32 to give priority to locking early, a pattern that does not include 2T and 3T, that is, a pattern including a run of 1T or 4T or more can be employed.

As each of the b1 pattern and the b2 pattern, a random pattern, that is, a pattern in which runs of various lengths appear which can be taken by the PCWA 110 code in consideration of the LMS serving as the XTC learning can be employed.

Here, the a1 pattern and the a2 pattern are collectively referred to as an a pattern. Similarly, the b1 pattern and the b2 pattern are collectively referred to as a b pattern.

The pattern to be used as the a pattern or the b pattern or the number N of a patterns (and the number (45-N) of b patterns) is set in, for example, the register group 21A. The RUB constructing unit 14 constructs Run_in in accordance with a setting value (storage value) of the register group 21A (FIG. 1).

Note that as an option, an auto power control (APC) pattern of 200T used for APC of laser light with which the recording/reproducing system 15 irradiates the optical disc 16 by can be arranged at the head of the pull-in area.

For example, it can be designated in accordance with a command input from the outside whether or not the APC pattern is arranged at the head of the pull-in area. It is possible to designate the RUB in which the APC pattern is arranged together using the command.

In a case where the APC pattern is arranged at the head of the pull-in area, the APC pattern is arranged to be overwritten on the a pattern.

Here, as described later, the APC pattern can be optionally arranged in the auxiliary control pattern APCSY as well. In a case where the APC pattern is arranged at the head of the pull-in area, the APC pattern is arranged in the auxiliary control pattern APCSY as well. On the other hand, in a case where the APC pattern is not arranged at the head of the pull-in area, no APC pattern is not arranged in the auxiliary control pattern APCSY as well.

In Run_in, the RUBSYNC area is configured such that, for example, a plurality of synchronization patterns syn0, for example, four synchronization pattern syn0 of 60T are arranged (FIG. 13).

Further, the synchronization pattern syn0 of the RUBSYNC area of the groove Run_in (hereinafter also referred to as a groove RUBSYNC area) and the synchronization pattern syn0 of the RUBSYNC area of the land Run_in (hereinafter also referred to as a land RUBSYNC area) are arranged with a shift in the track direction so that the positions in the track direction do not overlap.

To this end, in the RUBSYNC area, one nc0 pattern, zero or more spacer patterns sp1, and zero or more spacer patterns sp2 are arranged between the synchronization pattern syn0.

In other words, in FIG. 43, the groove RUBSYNC area is configured such that a synchronization pattern syn0 #G1, an nc0 pattern, a synchronization pattern syn0 #G2, a spacer pattern sp1, an nc0 pattern, a spacer pattern sp2, a synchronization pattern syn0 #G3, spacer patterns sp1 and sp2, an nc0 pattern, spacer patterns sp1 and sp2, a synchronization pattern syn0 #G4, spacer patterns sp1, sp2, and sp1, an nc0 pattern, a spacer pattern sp1, and a terminal pattern tp1 are arranged in the described order.

The land RUBSYNC area is configured such that an nc0 pattern, synchronization pattern syn0 #L1, an nc0 pattern, a spacer pattern sp2, a synchronization pattern syn0 #L2, a spacer pattern sp1, an nc0 pattern, spacer patterns sp2 and sp1, a synchronization pattern syn0 #L3, spacer patterns sp2 and sp1, an nc0 pattern, spacer patterns sp2, sp1, and sp2, a synchronization pattern syn0 #L4, a spacer pattern sp2, and a terminal pattern tp2 are arranged in the described order.

The nc0 pattern is a pattern of 60T having the same size as the synchronization pattern syn0, and a pattern with a small cross correlation with the synchronization pattern syn0 (ideally, a pattern with a zero cross correlation) can be employed as the nc0 pattern.

The spacer pattern sp1 is a pattern of (a run of) 6T, and the spacer pattern sp2 is a pattern of (a run of) 3T/3T. The spacer pattern sp2 of 3T/3T suppresses the DC component from being increased by the spacer pattern sp1 of 6T.

The spacer patterns sp1 and sp2 are arranged to set an interval of the two synchronization patterns syn0 arranged in the track direction to a unique interval.

Here, the spacer patterns sp1 and sp2 are collectively referred to as a spacer pattern sp.

The terminal patterns tp1 and tp2 are patterns of 24T arranged at the end of the RUBSYNC area.

In FIG. 43, in order to set an interval of the two synchronization patterns syn0 arranged in the track direction in Run_in and further RUB to a unique interval, an even number of spacer patterns sp (0 is regarded as an even number) are arranged between the two synchronization patterns syn0 in the groove RUBSYNC area, and an odd number of spacer patterns sp are arranged between the two synchronization patterns syn0 in the land RUBSYNC area.

In other words, 0 spacer patterns sp are arranged between a first synchronization pattern syn0 #G1 and a second synchronization pattern syn0 #G2 in the groove RUBSYNC area, so that an interval between the synchronization patterns syn0 #G1 and syn0 #G2 becomes 60T=60T+0T which is the total size of one nc0 pattern and 0 spacer pattern sp.

Two spacer patterns sp (one spacer pattern sp1 and one spacer pattern sp2) are arranged between the second synchronization pattern syn0 #G2 and a third synchronization pattern syn0 #G3 in the groove RUBSYNC area, so that an interval between the synchronization patterns syn0 #G2 and syn0 #G3 becomes 72T=60T+6T×2 which is the total size of one nc0 pattern and the two spacer patterns sp.

Four spacer patterns sp (two spacer patterns sp1 and two spacer patterns sp2) are arranged between the third synchronization pattern syn0 #G3 and a fourth synchronization pattern syn0 #G4 in the groove RUBSYNC area, so that an interval between the synchronization patterns syn0 #G3 and syn0 #G4 is 84T=60T+6T×4 which is the total size of one nc0 pattern and the four spacer patterns sp.

One spacer pattern sp (one spacer pattern sp2) is arranged between a first synchronization pattern syn0 #L1 and a second synchronization pattern syn0 #L2 in the land RUBSYNC area, so that an interval between the synchronization patterns syn0 #L1 and syn0 #L2 becomes 66T=60T+6T which is the total size of one nc0 pattern and one spacer pattern sp.

Three spacer patterns sp (two spacer patterns sp1 and one spacer pattern sp2) are arranged between the second synchronization pattern syn0 #L2 and a third synchronization pattern syn0 #L3 in the land RUBSYNC area, so that an interval between the synchronization patterns syn0 #L2 and syn0 #L3 is 78T=60T+6T×3 which is the total size of one nc0 pattern and the three spacer patterns sp.

Five spacer patterns sp (two spacer patterns sp1 and three spacer patterns sp2) are arranged between the third synchronization pattern syn0 #L3 and a fourth synchronization pattern syn0 #L4 in the land RUBSYNC area, so that an interval between the synchronization pattern syn0 #L3 and syn0 #L4 becomes 90T=60T+6T×5 which is the total size of one nc0 pattern and the five spacer patterns sp.

In Run_in of FIG. 43, as described above, since the interval between two arbitrarily adjacent synchronization patterns syn0 is unique, it is possible to detect the synchronization pattern syn0 and specify the position of the latest synchronization pattern syn0 (and the immediately synchronization pattern syn0 detected immediately before) from an interval between the latest synchronization pattern syn0 and the synchronization pattern syn0 detected immediately before it.

In FIG. 43, since the size (length) of the spacer pattern sp is 6T, the interval between the two synchronization patterns syn0 can be set to a different interval in units of 6T.

FIG. 44 is a diagram illustrating an example of the nc0 pattern and the terminal patterns tp1 and tp2 of FIG. 43.

For example, a pattern of 60T of 3T/3T/5T/7T/5T/7T/7T/5T/7T/5T/3T/3T can be employed as the nc0 pattern.

For example, a pattern of 24T of 8T/8T/4T/4T can be employed as the terminal pattern tp1, and for example, a pattern of 24T of 4T/8T/8T/4T can be employed as the terminal pattern tp2.

Here, a pattern terminating with (a run) of 4T can be employed as each of the terminal patterns tp1 and tp2 as illustrated in FIG. 44.

In the standard RUB, a new FS of 30T and an EC of 9T are arranged at the head and the end of the frame, respectively, as illustrated in FIG. 41.

For the sake of simplicity of description, if that the auxiliary control pattern APCSY is assumed to be ignored, in the standard RUB, in the frame frame #i other than the frame frame1, there is an EC of an immediately previous frame frame #i−1 immediately before the new FS at the head of the frame frame #i.

In the EC, as described with reference to FIG. 11, since the last run is a pattern of 5T or 4T, there is at least a run of 4T immediately before the new FS of the frame frame #i other than frame frame1.

As a pattern terminating with 4T is employed as each of the terminal patterns tp1 and tp2 as illustrated in FIG. 44, there is a run of 4T at the end of each of the terminal patterns tp1 and tp2 immediately before the new FS of the frame frame1, and as a result, affinity between the frame frame1 and the frame frame #i other than the frame frame1 can be improved.

Note that as a case where the synchronization pattern syn0 is shifted in the track direction so that the positions in the track direction do not overlap in (a pair of) two adjacent tracks, there is a case where the synchronization pattern syn0 is shifted in the track direction with a predetermined shift amount in the two adjacent tracks as described above with reference to FIG. 12.

In other words, as a case where the synchronization pattern syn0 is shifted in the track direction so that the positions in the track direction do not overlap in two adjacent tracks, there are a case where the synchronization pattern syn0 is shifted in the track direction so that the positions in the track direction do not overlap in each of an arbitrary track TK(n) of the optical disc 16, the track TK(n−1) on the inner circumference side adjacent to the track TK(n), and the track TK(n+1) on the outer circumference side and a case where the synchronization pattern syn0 is shifted in the track direction so that the positions in the track direction do not overlap in an odd-numbered track TK(2n'−1) of the optical disc 16 and an even-numbered track TK(2n') on the outer circumference side of the track TK(2n'−1).

In a case where the synchronization pattern syn0 is shifted in the track direction so that the positions in the track direction do not overlap in the odd-numbered track TK(2n'−1) and the even-numbered track TK(2n'), it does not matter whether or not the synchronization pattern syn0 is shifted in the track direction so that the positions in the track direction do not overlap in an even-numbered track TK(2n') and an odd-numbered track TK(2n'+1) on the outer circumference side of the track TK(2n').

<Auxiliary Control Pattern APCSY>

Figure 45:
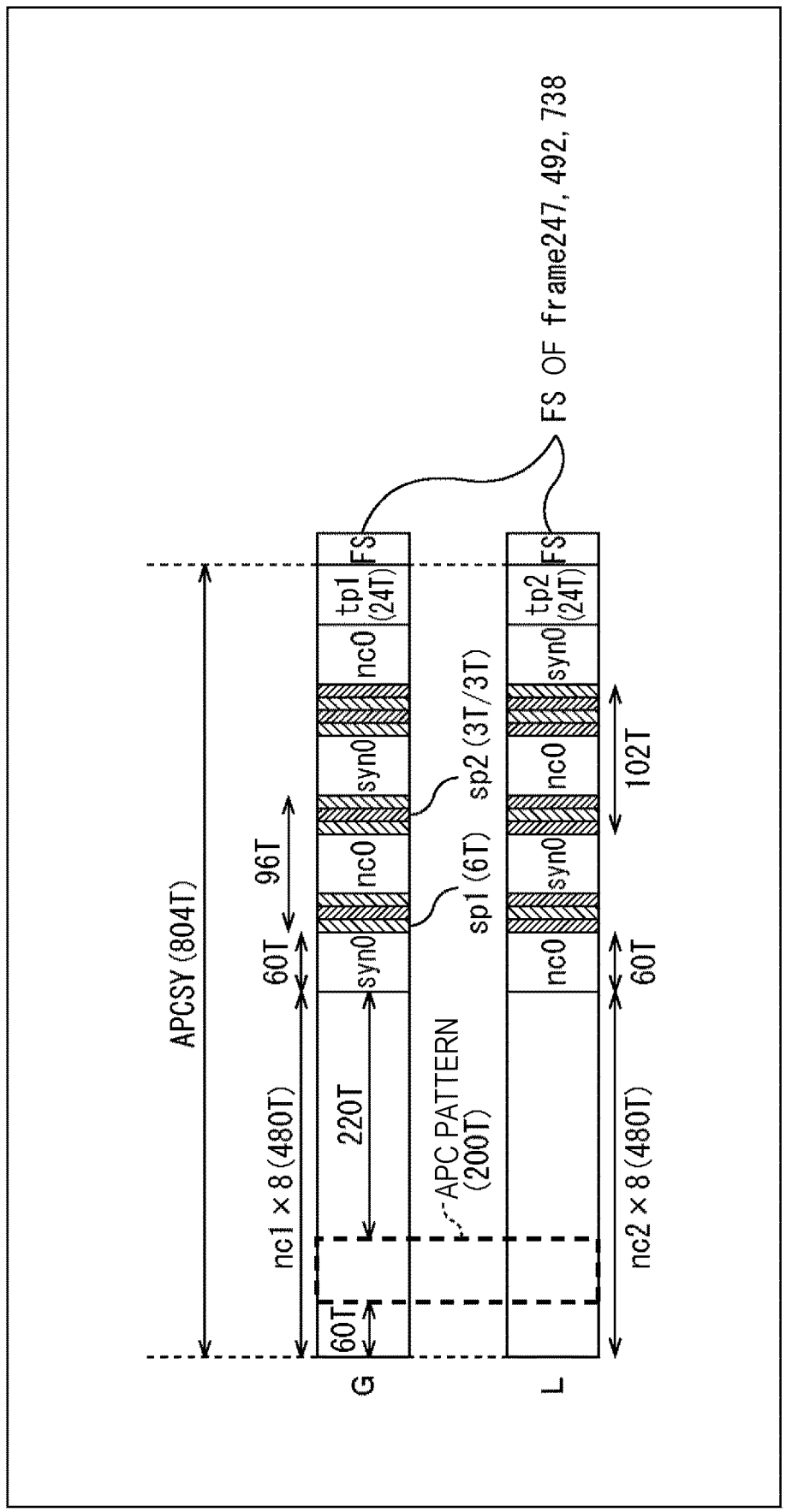
FIG. 45 is a diagram illustrating a configuration example of an auxiliary control pattern APCSY of 804T.

FIG. 45 is a diagram illustrating a configuration example of the auxiliary control pattern APCSY of 804T of FIG. 41.

In other words, an example of the auxiliary control patterns APCSY recorded in a pair of groove G and land L serving as the two adjacent tracks of the optical disc 16 is illustrated.

As described above with reference to FIG. 12, since Run_ins (and eventually the RUBs) are recorded in a pair of groove G and land L of the optical disc 16 side by side at the same position in the track direction, the auxiliary control patterns APCSY are also recorded in the groove G and the land L side by side at the same position in the track direction.

The auxiliary control pattern APCSY recorded in the groove G (hereinafter also referred to as a groove auxiliary control pattern APCSY) is configured such that 8 nc1 patterns of 60T, a synchronization pattern syn0, spacer patterns sp1, sp2, and sp1, an nc0 pattern, spacer patterns sp1, sp2, and sp1, a synchronization pattern syn0, spacer patterns sp1, sp2, sp1, and sp2, an nc0 pattern, and a terminal pattern tp1 are arranged in the described order.

The auxiliary control pattern APCSY (also called land auxiliary control pattern APCSY) recorded in land L is configured such that 8 nc2 pattern of 60T, an nc0 pattern, spacer patterns sp2, sp1, and sp2, a synchronization pattern syn0, spacer patterns sp2, sp1, and sp2, an nc0 pattern, spacer patterns sp2, sp1, sp2, and sp1, a synchronization pattern syn0, and a terminal pattern tp2 are arranged in the described order.

Note that as described with reference to FIG. 43, the APC pattern of 200T can be optionally arranged at the head of the pull-in area of Run_in.

In a case where the APC pattern is arranged at the head of the pull-in area of Run_in, the APC pattern is arranged in the auxiliary control pattern APCSY as well.

In other words, in the auxiliary control pattern APCSY, the APC pattern of 200T can be arranged at a position away from the head by 60T to be overwritten on the nc1 pattern or the nc2 pattern.

In the auxiliary control pattern APCSY, a pattern with a small cross correlation (ideally, a pattern with a zero cross correlation) can be employed as each of the nc1 pattern and the nc2 pattern.

Further, similarly to the RUBSYNC area of FIG. 43, the synchronization pattern syn0 of the groove auxiliary control pattern APCSY and the synchronization pattern syn0 of the land auxiliary control pattern APCSY are arranged with a shift in the track direction so that the positions in the track direction do not overlap.

To this end, in the auxiliary control pattern APCSY, one nc0 pattern, zero or more spacer patterns sp1, and zero or more spacer patterns sp2 are arranged between the synchronization patterns syn0, similarly to the RUBSYNC area of FIG. 43.

In FIG. 45, an even number of spacer patterns sp are arranged between the two synchronization patterns syn0 of the groove auxiliary control pattern APCSY, similarly to the groove RUBSYNC area (see FIG. 43), and an odd number of spacer patterns sp are arranged between the two synchronization patterns syn0 of the land auxiliary control pattern APCSY, similarly to the land RUBSYNC area (FIG. 43) so that an interval between the two synchronization patterns syn0 arranged in the track direction in the RUB is set to a unique interval).

In other words, six spacer patterns sp (four spacer patterns sp1 and two spacer patterns sp2) are arranged between a first synchronization pattern syn0 and a second synchronization pattern syn0 of the groove auxiliary control pattern APCSY, so that an interval between the first synchronization pattern syn0 and the second synchronization pattern syn0 becomes 96T=60T+6T×6 which is the total size of one nc0 pattern and the six spacer patterns sp.

Seven spacer patterns sp (three spacer patterns sp1 and four spacer patterns sp2) are arranged between a first synchronization pattern syn0 and a second synchronization pattern syn0 of the land auxiliary control pattern APCSY, so that an interval between the first synchronization pattern syn0 and the second synchronization pattern syn0 is 102T=60T+6T×7 which is the total size of one nc0 pattern and the seven spacer patterns sp.

Therefore, it is possible to specify the position of the latest synchronization pattern syn0 from the interval between the two synchronization patterns syn0 for the synchronization pattern syn0 of the auxiliary control pattern APCSY in addition to the synchronization pattern syn0 of Run_in.

Note that as described with reference to FIG. 41, the auxiliary control pattern APCSY is added to the head of each of the three frames frame247, frame492 and frame738, but here, since the auxiliary control patterns APCSY added to the frames frame247, frame492 and frame738 are the same pattern, it is difficult to specify which of the three frames frame247, frame492 and frame738 the auxiliary control pattern APCSY to which the detected (reproduced) synchronization pattern syn0 belongs is added to only from the interval between the two synchronization patterns syn0 of the auxiliary control pattern APCSY.

In order to specify which of the three frames frame247, frame492 and frame738 the auxiliary control pattern APCSY to which the detected synchronization pattern syn0 belongs is added to only from the interval between the two synchronization patterns syn0 of the auxiliary control pattern APCSY, it is necessary to prepare an individual auxiliary control pattern APCSY in which the interval between the two synchronization patterns syn0 is unique as each of the auxiliary control pattern APCSY added to the frame frame247, the auxiliary control pattern APCSY added to the frame frame492, and the auxiliary control pattern APCSY added to the frame frame738.

From the viewpoint of synchronization, it is preferable to prepare the auxiliary control pattern APCSY in which the interval between the two synchronization patterns syn0 is unique as each of the auxiliary control pattern APCSY added to the frame frame247, the auxiliary control pattern APCSY added to the frame frame492, and the auxiliary control pattern APCSY added to the frame frame738.

Here, in this case, it is necessary to increase the interval of the two synchronization patterns syn0 and increase the size (length) of the auxiliary control pattern APCSY to be larger than 804T of FIG. 45.

In a case where the size of the auxiliary control pattern APCSY is increased, if the total size of Run_in, Run_out, and the three auxiliary control patterns APCSY of the RUB is attempted to be kept to be the size of the two frames as described in FIG. 41, it is necessary to reduce, for example, the pull-in interval or the like of Run_in by the increase in the size of the auxiliary control pattern APCSY. If the pull-in interval of Run_in is decreased, for example, pulling-in of the channel clock in the PLL 32 or the like is influenced.

Therefore, it can be decided in accordance with which of the viewpoint of synchronization and the viewpoint of the influence on the pulling-in or the like of the channel clock in the PLL 32 a priority is given to whether or not the auxiliary control pattern APCSY in which the interval between the two synchronization patterns syn0 is unique is prepared as each of the auxiliary control pattern APCSY added to the frame frame247, the auxiliary control pattern APCSY added to the frame frame492, and the auxiliary control pattern APCSY added to the frame frame738, for example.

Further, the auxiliary control pattern APCSY terminates with the terminal pattern tp1 or tp2. Therefore, there is a run of 4T at the end of the terminal pattern tp1 or tp2 immediately before the new FS of the frames frame247, frame492, and frame frame738 subsequent to the auxiliary control pattern APCSY.

Therefore, there is at least a run of 4T immediately before the new FS in both the frames frame247, frame492, and frame738 to which the auxiliary control pattern APCSY is added and the frame to which the auxiliary control pattern APCSY is not added (the frame arranged subsequently to the EC of the immediately previous frame).

Accordingly, it is possible to improve the affinity between the frames frame247, frame492, and frame738 to which the auxiliary control pattern APCSY is added and the frame to which the auxiliary control pattern APCSY is not added.

FIG. 46 is a diagram illustrating an example of the nc1 pattern and the nc2 pattern of 60T arranged at the head of the auxiliary control pattern APCSY of FIG. 45.

For example, a pattern of 60T of 4T/4T/8T/4T/3T/7T/4T/4T/8T/4T/3T/7T can be employed as the nc1 pattern.

For example, a pattern of 60T of 8T/4T/4T/7T/3T/4T/8T/4T/4T/7T/3T/4T can be employed as the nc2 pattern.

For example, the nc1 pattern and the nc2 pattern are set in the register group 21A. The RUB constructing unit 14 constructs (the auxiliary control pattern APCSY of) Run_in in accordance with the setting value of the register group 21A (FIG. 1).

<Run_Out and Additional Run_Out>

Figure 47:
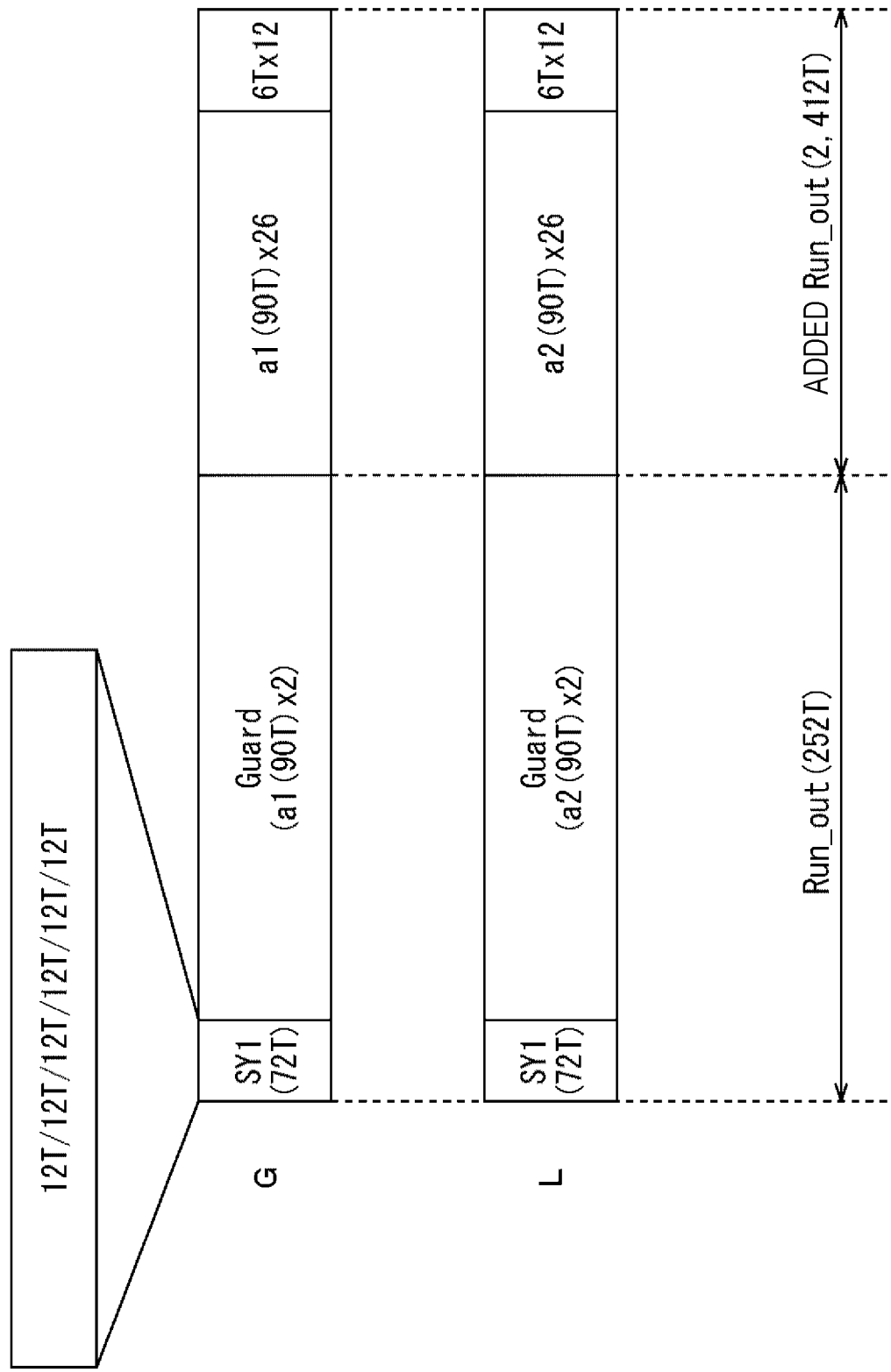
FIG. 47 is a diagram illustrating a configuration example of Run_out and additional Run_out.

FIG. 47 is a diagram illustrating a configuration example of Run_out of FIGS. 41 and 42 and additional Run_out of FIG. 42.

Run_out of 252T of the groove G (hereinafter also referred to as "groove Run_out") out of the two adjacent tracks, that is, the groove G and the land L is configured such that a SY1 pattern of 72T and two a1 patterns of 90T are arranged in the described order.

Further, Run_out of 252T of the land L (hereinafter also referred to as "land Run_out") out of the two adjacent tracks, that is, the groove G and the land L is configured such that a SY1 pattern of 72T and two a2 patterns of 90T are arranged in the described order.

For example, a pattern of 12T/12T/12T/12T/12T/12T can be employed as the SY1 pattern of 72T.

A pattern with a small cross correlation can be employed as each of the a1 pattern and the a2 pattern as described above in Run_in of FIG. 43.

For example, additional Run_out of 2,412T subsequent to the groove Run_out is configured such that 26 a1 patterns and 12 predetermined patterns of 6T are arranged in the described order.

For example, additional Run_out of 2,412T subsequent to the land Run_out is configured such that 26 a2 patterns and 12 predetermined patterns of 6T are arranged in the described order.

<Example of Process by Sync Detecting Unit 61>

Figure 48:
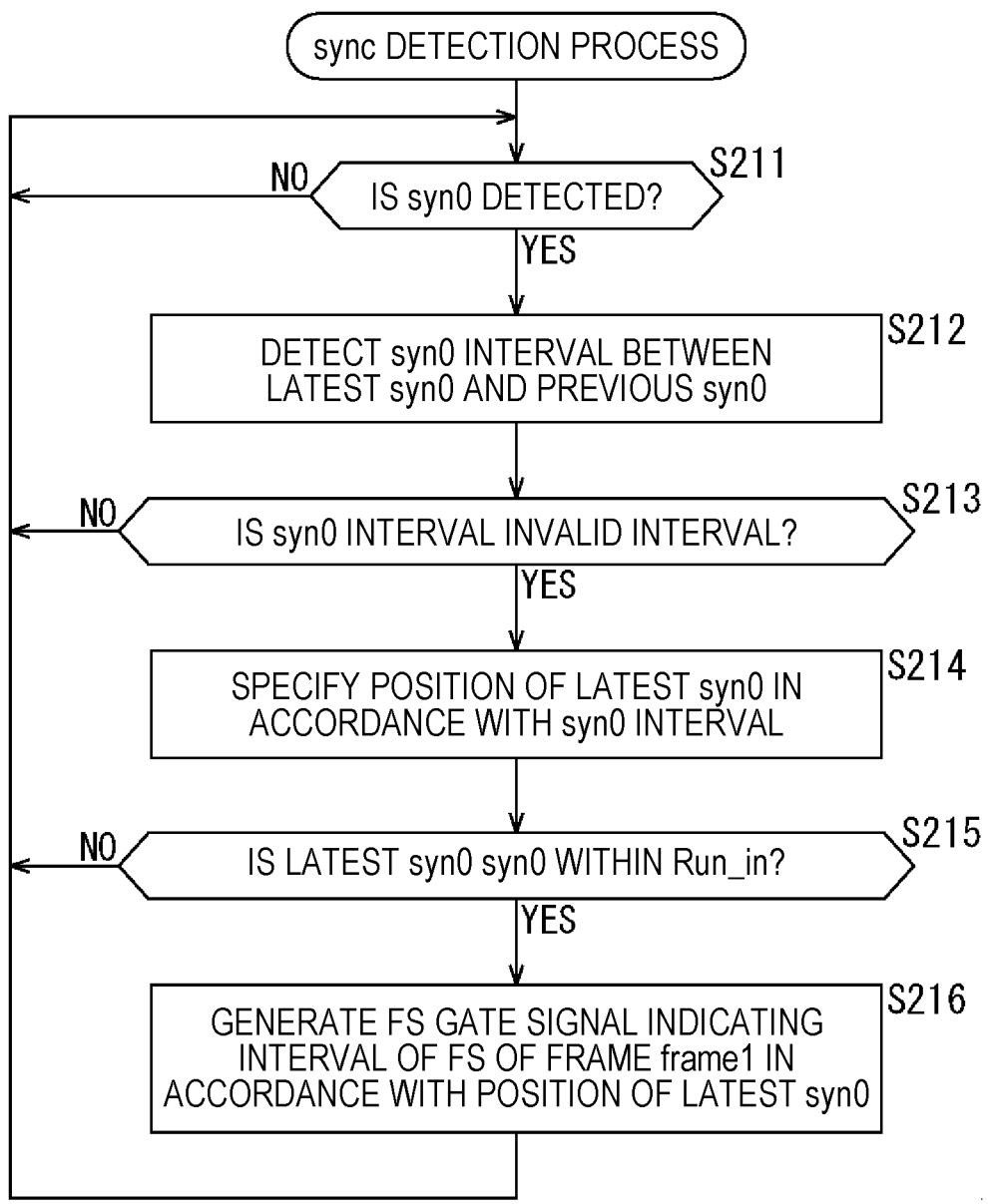
FIG. 48 is a flowchart for describing an example of a sync detection process performed by a sync detecting unit 61 in a case where a RUB constructing unit 14 constructs a standard RUB.

FIG. 48 is a flowchart for describing an example of the sync detection process performed by the sync detecting unit 61 of FIG. 6 in a case where the RUB constructing unit 14 constructs the standard RUB (FIG. 41) or the shortened RUB (FIG. 42)

In step S211, the sync detecting unit 61 determines whether or not the synchronization pattern syn0 is detected from the restoration result from the restoring unit 35 (FIG. 6), and in a case where it is determined that the synchronization pattern syn0 is not detected, the process returns to step S211.

In addition, in a case where it is determined in step S211 that the synchronization pattern syn0 is detected, the process proceeds to step S212, and the sync detecting unit 61 detects the interval between the latest synchronization pattern syn0 which is currently detected and the synchronization pattern syn0 which is previously detected (hereinafter also referred to as a previous synchronization pattern syn0) (hereinafter also referred to as a syn0 interval).

Thereafter, the process proceeds from step S212 to step S213, and the sync detecting unit 61 determines whether or not the syn0 interval is an invalid interval. Here, the invalid interval means an interval that is too short or too long to be taken as taken as the syn0 interval.

In a case where it is determined in step S213 that the syn0 interval is the invalid interval, that is, for example, in a case where the latest synchronization pattern syn0 or the previous synchronization pattern syn0 is erroneously detected, and thus the syn0 interval becomes the invalid interval, the process returns to step S211.

On the other hand, in a case where it is determined in step S213 that the syn0 interval is not the invalid interval, the process proceeds to step S214. In step S214, the sync detecting unit 61 specifies the position of the latest synchronization pattern syn0 (the position of the latest synchronization pattern syn0 included in the restoration result from the restoring unit 35) in accordance with the syn0 interval, and the process proceeds to step S215.

Since the syn0 interval is a unique interval in the RUB as described above with reference to FIGS. 43 and 45, the position of the latest synchronization pattern syn0 in the RUB can be specified in accordance with the syn0 interval (here, the frame may be unable to be specified for the synchronization pattern syn0 in the auxiliary control pattern APCSY).

In step S215, on the basis of the position of the latest synchronization pattern syn0 specified in step S214, the sync detecting unit 61 determines whether or not the latest synchronization pattern syn0 is the synchronization pattern syn0 in Run_in.

In a case where it is determined in step S215 that the latest synchronization pattern syn0 is not the synchronization pattern syn0 in Run_in, the process returns to step S211.

In addition, in a case where it is determined in step S215 that the latest synchronization pattern syn0 is the synchronization pattern syn0 in Run_in, the process proceeds to step S216.

In step S216, the sync detecting unit 61 generates the FS gate signal indicating the interval of the FS (FIGS. 41, 42, and 43) of the frame frame1 appearing immediately after the latest synchronization pattern syn0 in accordance with the position of the latest synchronization pattern syn0. Then, the sync detecting unit 61 supplies the FS gate signal to the time information generating unit 62 (FIG. 6), and the process returns from step S216 to step S211.

As described above, in the standard RUB (FIG. 41) (and the shortened RUB (FIG. 42)), since the synchronization patterns syn0 are recorded in the groove G and the land L serving as two adjacent tracks with a shift in the track direction in the optical disc 16 so that the positions in the track direction do not overlap, it is possible to suppress the interference caused by the synchronization pattern syn0 in the other track when the synchronization pattern syn0 of one of the groove G and the land L is reproduced. Therefore, data can be recorded in the optical disc 16 with high density, and data recorded with high density can be reproduced robustly.

In addition, since the synchronization pattern syn0 is recorded so that the interval between the two synchronization patterns syn0 arranged in the track direction is unique, when reproduction from the optical disc 16 is performed, it is possible to specify the position of the synchronization pattern syn0 from the interval between the two synchronization patterns syn0. In addition, in a case where the position of the synchronization pattern syn0 in Run_in is specified, it is possible to accurately detect the FS at the head of the frame immediately after Run_in including the synchronization pattern syn0, and as a result, it is possible to record data with high density to the optical disc 16 and reproduce data recorded with high density robustly.

<Description of Computer to which Present Technology is Applied>

Next, a series of processes described above can be performed by hardware or software. In a case where a series of processes is performed by software, a program constituting the software is installed in a general-purpose computer or the like.

FIG. 49 is a block diagram illustrating a configuration example of one embodiment of a computer in which a program for executing a series of processes described above is installed.

The program can be recorded in a hard disk 205 or a read only memory (ROM) 203 serving as a recording medium installed in the computer in advance.

Alternatively, the program can be stored (recorded) in a removable recording medium 211. The removable recording medium 211 can be provided as so-called packaged software. Here, examples of the removable recording medium 211 include a flexible disk, a compact disc read only memory (CD-ROM), a magneto optical (MO) disk, a digital versatile disc (DVD), a magnetic disk, a semiconductor memory, and the like.

Note that the program is installed in the computer from the removable recording medium 211 as described above, but the program can be downloaded to the computer via a communication network or a broadcast network and then installed in the internal hard disk 205. In other words, for example, the program can be transferred to the computer from a download site via an artificial satellite for digital satellite broadcasting in a wireless manner or can be transferred to the computer via a network such as a local area network (LAN) or the Internet in a wired manner.

The computer includes an internal central processing unit (CPU) 202, and an input/output interface 210 is connected to the CPU 202 via a bus 201.

If the user inputs a command by manipulating an input unit 207 or the like through the input/output interface 210, the CPU 202 executes the program stored in the read only memory (ROM) 203 accordingly. Alternatively, the CPU 202 loads the program stored in the hard disk 205 onto a random access memory (RAM) 204 and executes the program.

Accordingly, the CPU 202 performs the processes in accordance with the above-described flowchart or the processes performed by the configurations of the block diagrams described above. Then, the CPU 202 performs, for example, an output of the processing result from the output unit 206 or transmission of the processing result from the communication unit 208 via the input/output interface 210 if necessary, and further causes the hard disk 205 to store the processing result.

Note that the input unit 207 includes a keyboard, a mouse, a microphone, or the like. Further, the output unit 206 includes a liquid crystal display (LCD), a speaker, or the like.

Here, in this specification, the process which the computer performs in accordance with the program need not be necessarily performed chronologically in the order described as the flowchart. In other words, the processes which the computer performs in accordance with the program also include processes executed in parallel or individually (for example, a parallel process or an object-based process).

Further, the program may be processed by a single computer (processor) or may be shared and processed by a plurality of computers. Further, the program may be transferred to a remote computer and executed.

Further, in this specification, a system means a set of a plurality of components (apparatuses, modules (parts), or the like), and it does not matter whether or not all the components are in a single housing. Therefore, a plurality of apparatuses which are accommodated in separate housings and connected via a network and a single apparatus in which a plurality of modules are accommodated in a single housing are both systems.

Further, the embodiment of the present technology is not limited to the above-described embodiment, and various modifications can be made without departing from the gist of the present technology.

For example, the present technology can have a configuration of cloud computing in which one function is shared and jointly processed by a plurality of apparatuses via a network.

Further, the respective steps described in the flowchart described above can be executed by a single apparatus or can be shared and executed by a plurality of apparatuses.

Further, in a case where a plurality of processes are included in one step, a plurality of processes included in one step can be executed by a single apparatus or shared and executed by a plurality of apparatuses.

Further, the effects described in this specification are merely examples and not limited, and other effects may be included.

Note that the present technology can have the following configurations.

<1> A disk-type recording medium, including:
synchronization patterns for synchronization being recorded in two adjacent tracks with a shift in a track direction so that positions in the track direction do not overlap.

<2> The disk-type recording medium according to <1>, in which the two adjacent tracks are a land and a groove.

<3> The disk-type recording medium according to <1> or <2>, in which an interval of two synchronization patterns arranged in the track direction is unique.

<4> The disk-type recording medium according to <3>, in which, when a period of a channel clock of an apparatus that performs at least one of recording or reproducing of the disk-type recording medium is indicated by T,
the intervals between the synchronization patterns are different in units of 6T.

<5> The disk-type recording medium according to any of <1> to <4>, in which user data is encoded into a (d,k) RLL code and recorded, and
the synchronization patterns are patterns in which a run larger than a maximum run k of the (d,k) RLL code is repeated.

<6> The disk-type recording medium according to any of <1> to <5>, in which Run_in indicating a start of an error correction coding (ECC) block including a parity used for an ECC process is recorded,
a plurality of the synchronization patterns are included in the Run_in, and
the interval of the two synchronization patterns arranged in the track direction is unique in the Run_in.

<7> The disk-type recording medium according to <6>, in which recording for the disk-type recording medium is performed using a recording unit block (RUB) as a unit of recording,
the RUB includes
the Run_in,
a plurality of frames including data obtained by dividing the ECC block,
a control pattern used for controlling a process of the disk-type recording medium, and
Run_out indicating an end of the ECC block, and
the plurality of synchronization patterns are also included in the control pattern.

<8> The disk-type recording medium according to <7>, in which the interval of the two synchronization patterns included in the control pattern is unique in the RUB.

<9> The disk-type recording medium according to <7> or <8>, in which the interval of the two synchronization patterns included in the RUB is unique in the RUB.

<10> The disk-type recording medium according to any of <6> to <9>, in which the RUB includes a predetermined begin code (BC) and a predetermined end code (EC), the BC is arranged at a head of the frame, and the EC is arranged at an end of the frame.

<11> The disk-type recording medium according to <10>, in which the EC and the BC are patterns having a run satisfying a code rule of the (d,k) RLL code used for encoding of user data.

<12> The disk-type recording medium according to <11>, in which the (d,k) RLL code is a parity-complementary word assignment (PCWA) 110 code, the EC is a pattern that starts states which can be taken by an encoding state transitioning by PCWA encoding into the PCWA 110 code and terminates in a specific one state, and the BC is a pattern in which the encoding state starts from a predetermined one state among the states which can be taken by the encoding state.

<13> The disk-type recording medium according to <11> or <12>, in which a frame sync (FS) including a predetermined FS entity and the BC is arranged at a head of the frame, and the FS entity is a pattern in which a run larger than the maximum run k of the (d,k) RLL code is repeated.

<14> The disk-type recording medium according to any of <10> to <13>, in which a direct current control (DCC) bit for direct current (DC) control is regularly arranged in frame data of the frame arranged between the BC and the EC.

<15> A recording apparatus, including:

a recording unit that records synchronization patterns for synchronization in two adjacent tracks of a disk-type recording medium with a shift in a track direction so that positions in the track direction do not overlap.

<16> The recording apparatus according to <15>, in which the recording unit records the synchronization patterns so that an interval of two synchronization patterns arranged in the track direction is unique.

<17> A recording method, including:

recording synchronization patterns for synchronization in two adjacent tracks of a disk-type recording medium with a shift in a track direction so that positions in the track direction do not overlap.

<18> A reproducing apparatus, including:

a reproducing unit that reproduces a reproduction signal from a disk-type recording medium in which synchronization patterns for synchronization are recorded in two adjacent tracks with a shift in a track direction so that positions in the track direction do not overlap.

<19> The reproducing apparatus according to <18>, in which the synchronization patterns are recorded so that an interval of two synchronization patterns arranged in the track direction is unique, and the reproducing apparatus further includes a detecting unit that detects the synchronization patterns from the reproduction signal and specifies the positions of the synchronization patterns in accordance with the interval of the two synchronization patterns.

<20> A reproducing method, including:

reproducing a reproduction signal from a disk-type recording medium in which synchronization patterns for synchronization are recorded in two adjacent tracks with a shift in a track direction so that positions in the track direction do not overlap.

REFERENCE SIGNS LIST

11 ECC processing unit
12 DCC adding unit
13 Channel coding unit
14 RUB constructing unit
15 Recording/reproducing system
16 Optical disc
17 Signal processing unit
18 Channel decoding unit
18 DCC deleting unit
20 ECC processing unit
21 Control unit
21A Register group
31 ADC
32 PLL
33 Memory
34 Adaptive equalizing unit
35 Restoring unit
36 Convolution unit
37 Error calculating unit
38 Code processing unit
41 HPF
42 AGC
$51_0$ to $51_2$ Adaptive equalizer
52 Adding unit
61 sync detecting unit
62 Time information generating unit
63 Clock shift detecting unit
64 Data gate signal generating unit
111 Branch metric generating unit
112 Limitation signal generating unit
$113_{-2}$ to $113_{1025}$ ACS unit
114 Connection control unit
115 Decoding result output unit
$121_0$ to $121_2$ Calculating unit
122 Selection control unit
123 Selector
124 State metric memory
$131_1$ to $131_{L-1}$ Selector
$132_0$ to $132_{L-1}$ Bus memory
201 Bus
202 CPU
203 ROM
204 RAM
205 Hard disk
206 Output unit
207 Input unit
208 Communication unit
209 Drive
210 Input/output interface
211 Removable recording medium

The invention claimed is:

1. A disk-type recording medium, comprising:

synchronization patterns for synchronization being recorded in two adjacent tracks with a shift in a track direction so that positions in the track direction do not overlap, wherein the two adjacent tracks are a land and a groove, and wherein an interval of two synchronization patterns arranged in the track direction is unique.

2. The disk-type recording medium according to claim 1, wherein, when a period of a channel clock of an apparatus that performs at least one of recording or reproducing of the disk-type recording medium is indicated by T, the intervals between the synchronization patterns are different in units of 6T.

3. The disk-type recording medium according to claim 1, wherein user data is encoded into a (d,k) RLL code and recorded, and
the synchronization patterns are patterns in which a run larger than a maximum run k of the (d,k) RLL code is repeated.

4. The disk-type recording medium according to claim 1, wherein Run_in indicating a start of an error correction coding (ECC) block including a parity used for an ECC process is recorded,
a plurality of the synchronization patterns are included in the Run_in, and
the interval of the two synchronization patterns arranged in the track direction is unique in the Run_in.

5. The disk-type recording medium according to claim 4, wherein recording for the disk-type recording medium is performed using a recording unit block (RUB) as a unit of recording,
the RUB includes
the Run_in,
a plurality of frames including data obtained by dividing the ECC block,
a control pattern used for controlling a process of the disk-type recording medium, and
Run_out indicating an end of the ECC block, and
the plurality of synchronization patterns are also included in the control pattern.

6. The disk-type recording medium according to claim 5, wherein the interval of the two synchronization patterns included in the control pattern is unique in the RUB.

7. The disk-type recording medium according to claim 5, wherein the interval of the two synchronization patterns included in the RUB is unique in the RUB.

8. The disk-type recording medium according to claim 4, wherein the RUB includes a predetermined begin code (BC) and a predetermined end code (EC),
the BC is arranged at a head of the frame, and
the EC is arranged at an end of the frame.

9. The disk-type recording medium according to claim 8, wherein the EC and the BC are patterns having a run satisfying a code rule of the (d,k) RLL code used for encoding of user data.

10. The disk-type recording medium according to claim 9, wherein the (d,k) RLL code is a parity-complementary word assignment (PCWA) 110 code,
the EC is a pattern that starts states which can be taken by an encoding state transitioning by PCWA encoding into the PCWA 110 code and terminates in a specific one state, and
the BC is a pattern in which the encoding state starts from a predetermined one state among the states which can be taken by the encoding state.

11. The disk-type recording medium according to claim 9, wherein a frame sync (FS) including a predetermined FS entity and the BC is arranged at a head of the frame, and
the FS entity is a pattern in which a run larger than the maximum run k of the (d,k) RLL code is repeated.

12. The disk-type recording medium according to claim 8, wherein a direct current control (DCC) bit for direct current (DC) control is regularly arranged in frame data of the frame arranged between the BC and the EC.

13. A recording apparatus, comprising:
a recording unit that records synchronization patterns for synchronization in two adjacent tracks of a disk-type recording medium with a shift in a track direction so that positions in the track direction do not overlap,
wherein the recording unit records the synchronization patterns so that an interval of two synchronization patterns arranged in the track direction is unique.

14. A recording method, comprising:
recording synchronization patterns for synchronization in two adjacent tracks of a disk-type recording medium with a shift in a track direction so that positions in the track direction do not overlap,
wherein the recording unit records the synchronization patterns so that an interval of two synchronization patterns arranged in the track direction is unique.

15. A reproducing apparatus, comprising:
a reproducing unit that reproduces a reproduction signal from a disk-type recording medium in which synchronization patterns for synchronization are recorded in two adjacent tracks with a shift in a track direction so that positions in the track direction do not overlap, the synchronization patterns being recorded so that an interval of two synchronization patterns arranged in the track direction is unique; and
a detecting unit that detects the synchronization patterns from the reproduction signal and specifies the positions of the synchronization patterns in accordance with the interval of the two synchronization patterns.

16. A reproducing method, comprising:
reproducing a reproduction signal from a disk-type recording medium in which synchronization patterns for synchronization are recorded in two adjacent tracks with a shift in a track direction so that positions in the track direction do not overlap, the synchronization patterns being recorded so that an interval of two synchronization patterns arranged in the track direction is unique; and
detecting the synchronization patterns from the reproduction signal and specifying the positions of the synchronization patterns in accordance with the interval of the two synchronization patterns.

* * * * *